(12) United States Patent
Mori et al.

(10) Patent No.: US 7,228,061 B2
(45) Date of Patent: Jun. 5, 2007

(54) IMAGE DISPLAY SYSTEM, IMAGE REPRODUCING APPARATUS, DIGITAL TELEVISION APPARATUS, IMAGE DISPLAY METHOD, AND STORAGE MEDIUM FOR CONTROLLING IMAGE DISPLAY BASED ON ADDITIONAL INFORMATION READ FROM MULTIPLE IMAGE RECORDING APPARATUSES

(75) Inventors: Shigeki Mori, Saitama (JP); Yoshikazu Shibamiya, Kanagawa (JP); Shuntaro Aratani, Tokyo (JP); Tomoyuki Ono, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1203 days.

(21) Appl. No.: 09/993,018

(22) Filed: Nov. 19, 2001

(65) Prior Publication Data
US 2002/0080276 A1 Jun. 27, 2002

(30) Foreign Application Priority Data
Nov. 17, 2000 (JP) .............................. 2000-351989
Nov. 17, 2000 (JP) .............................. 2000-351990

(51) Int. Cl.
*H04N 5/91* (2006.01)
(52) U.S. Cl. ........................................................ 386/95

(58) Field of Classification Search ..................... None
See application file for complete search history.

(56) References Cited

U.S. PATENT DOCUMENTS
6,606,451 B2 * 8/2003 Honda et al. .................. 386/95

FOREIGN PATENT DOCUMENTS
JP 2000-222417 A 8/2000

* cited by examiner

*Primary Examiner*—James J. Groody
*Assistant Examiner*—Heather R. Jones
(74) *Attorney, Agent, or Firm*—Rossi, Kimms & McDowell LLP

(57) ABSTRACT

There is provided an image display system that can display images recorded by a plurality of image recording apparatuses in such a manner that the images are associated with each other. The image display system is comprised of a TV apparatus that captures and reproduces images recorded by the plurality of image recording apparatuses and additional information added thereto and then displays each of the reproduced images. The TV apparatus detects the presence or absence of relevancy between the images recorded by the plurality of image recording apparatuses based on the additional information captured and reproduced from the plurality of image recording apparatuses, and then displays, on a display, a related image display screen that allows a viewer to recognize the detected related images.

8 Claims, 46 Drawing Sheets

FIG. 7

| TRUCK NUMBER | INDEX | DATE AND TIME |
|---|---|---|
| 0000x0A | START | 00.10.10.09.33 |
| 0000x0B | END | 00.10.10.09.41 |
| 0000x0C | START | 00.10.10.10.20 |
| 0000x0D | END | 00.10.10.10.35 |
| 0000x0E | START | 00.10.10.12.10 |
| 0000x0F | END | 00.10.10.12.35 |
| 0000x0G | START | 00.10.10.13.03 |
| 0000x0H | END | 00.10.10.13.11 |
| 0000x0I | START | 00.10.10.14.04 |
| 0000x0J | END | 00.10.10.14.17 |
| 0000x0K | START | 00.10.10.15.40 |
| 0000x0L | END | 00.10.10.16.05 |
|  |  |  |

FIG. 13

| IMAGE NUMBER | PHOTOGRAPHING DATE AND TIME | IMAGE NUMBER | PHOTOGRAPHING DATE AND TIME |
|---|---|---|---|
| 1 | 00.10.10.09.34 | 13 | 00.10.10.12.22 |
| 2 | 00.10.10.09.36 | 14 | 00.10.10.12.26 |
| 3 | 00.10.10.09.37 | 15 | 00.10.10.13.06 |
| 4 | 00.10.10.09.39 | 16 | 00.10.10.13.08 |
| 5 | 00.10.10.09.40 | 17 | 00.10.10.13.09 |
| 6 | 00.10.10.10.00 | 18 | 00.10.10.13.10 |
| 7 | 00.10.10.10.03 | 19 | 00.10.10.13.10 |
| 8 | 00.10.10.10.22 | 20 | 00.10.10.15.45 |
| 9 | 00.10.10.10.25 | 21 | 00.10.10.15.47 |
| 10 | 00.10.10.10.29 | 22 | 00.10.10.15.53 |
| 11 | 00.10.10.12.12 | 23 | 00.10.10.15.58 |
| 12 | 00.10.10.12.16 | 24 | 00.10.10.16.02 |

FIG. 28

| TRUCK NUMBER | INDEX | DATE AND TIME |
|---|---|---|
| 0000x0G | START | 00.10.10.09.33 |
| 0000x0H | END | 00.10.10.09.41 |
| 0000x0I | START | 00.10.10.10.20 |
| 0000x0J | END | 00.10.10.10.35 |
| 0000x0K | START | 00.10.10.12.10 |
| 0000x0L | END | 00.10.10.12.35 |
| 0000x0M | START | 00.10.10.13.03 |
| 0000x0N | END | 00.10.10.13.11 |
| 0000x0O | START | 00.10.10.14.04 |
| 0000x0P | END | 00.10.10.14.17 |

FIG. 29

| IMAGE NUMBER | PHOTOGRAPHING DATE AND TIME | IMAGE NUMBER | PHOTOGRAPHING DATE AND TIME |
|---|---|---|---|
| 1 | 00.10.10.09.35 | 9 | 00.10.10.13.04 |
| 2 | 00.10.10.09.39 | 10 | 00.10.10.13.05 |
| 3 | 00.10.10.09.42 | 11 | 00.10.10.14.52 |
| 4 | 00.10.10.09.58 | 12 | 00.10.10.14.53 |
| 5 | 00.10.10.09.59 | 13 | 00.10.10.14.54 |
| 6 | 00.10.10.10.26 | 14 | 00.10.10.15.43 |
| 7 | 00.10.10.10.30 | 15 | 00.10.10.15.54 |
| 8 | 00.10.10.10.33 | 16 | 00.10.10.15.59 |

606

607

IMAGE DISPLAY SYSTEM, IMAGE REPRODUCING APPARATUS, DIGITAL TELEVISION APPARATUS, IMAGE DISPLAY METHOD, AND STORAGE MEDIUM FOR CONTROLLING IMAGE DISPLAY BASED ON ADDITIONAL INFORMATION READ FROM MULTIPLE IMAGE RECORDING APPARATUSES

BACKGROUND OF THE INVENTION

1. Field of the Invention

The present invention relates to an image display system, an image reproducing apparatus, an image display method that display each of images recorded by a plurality of image recording apparatuses, and a storage medium storing a program that executes this image display method.

The present invention also relates to a digital television apparatus and an image display method that can display images from a plurality of image sources, and a storage medium storing a program that executes this image display method.

2. Description of the Related Art

Recent photographing apparatuses such as digital cameras and video camera recording apparatuses (hereinafter referred to as "DVCs") have reduced sizes and prices and have become so popular that they are easily available. These photographing apparatuses can be used for photographing. Further, it has become more commonplace to photograph an identical scene using a plurality of photographing apparatuses.

Under these circumstances, a large number of users request that images of an identical scene photographed by several photographing apparatuses can be viewed and enjoyed on a single television receiver (hereinafter referred to as "the TV") to which these photographing apparatuses are connected. It is convenient and pleasant to be able to thus simultaneously view images of an identical scene photographed by different photographing apparatuses.

However, few systems exist that allow a plurality of apparatuses or media which are not limited to DVCs and digital cameras to be connected to a single TV so that images photographed by these apparatuses can be viewed on this TV. Further, even if there are any such systems, they only enable independent screens to be displayed, handled, and viewed.

On the other hand, there is a method in which, to detect the contents recorded in a DVC and display what are recorded in the DVC in order to assist viewers, the first frame of each recorded scene is displayed as a representative thumbnail image of the scene. However, the first frame of the recorded scene does not necessarily represent the scene.

Further, some animated image searching tools exist that search a recorded image to obtain several images as representative ones based on changes in the image. However, these tools are intended for use with computers, the use thereof may lead to increased costs, and they are not used for general applications.

Furthermore, these tools are effective in simply detecting what are recorded in the DVC, but do not allow images of an identical scene to be viewed so that the images of all the apparatuses that have photographed the identical scene can be associated with one another.

Moreover, Japanese Laid-Open Patent Publication (Kokai) No. 2001-222417 describes a system that indicates that a plurality of contents are associated with one another. However, this system imparts an originally photographed animated image in an animated image window with an icon display indicating whether or not there are any postrecorded sounds or whether or not any still images have been saved in connection with the animated image, thereby allowing viewers to realize whether or not there is any related information, but the system does not allow images of an identical scene to be viewed so that the images of all the apparatuses that have photographed the identical scene can be associated with one another.

Further, a digital television apparatus (hereinafter referred to as "DTV") can receive television broadcasting such as ordinary program broadcasting and digital broadcasting and can connect to a telephone line, a domestic intercom, an entrance intercom, the Internet, a home server, or various electric appliances via a network. The DTV is constructed to display and reproduce still and animated images and sounds on each of the apparatus using independent screens or multiscreens.

For example, image information obtained by a domestic digital video camera is recorded in various recording media such as a magnetic tape, memory card, and removable hard disk housed in the digital video camera. When the image information recorded in one of these recording media is displayed on the DTV, if the DTV has a reproducing apparatus attached thereto which can read data directly from the recording medium, then by setting this recording medium in the reproducing apparatus, a reproducing application for this recording medium can be actuated to reproduce the image information recorded therein to display it on a display screen of the DTV.

Further, if the DTV does not have the above reproducing apparatus attached thereto, the digital video camera used for recording the image information or another separate reproducing apparatus can be connected to the DTV via a wiring device such as a cable or a wireless device using as a radio communication medium electromagnetic waves, infrared rays, or the like so that image information reproduced by the digital video camera or the separate reproducing apparatus can be transmitted to the DTV as identifiable and enterable image and sound information form and then displayed on the display screen of the DTV.

In either case, operations on the reproducing application on the DTV or operations on the individual reproducing apparatuses can be preformed using remote control devices attached to the DTV or exclusively used for these reproducing apparatuses. Furthermore, if the digital video camera used for recording the image information or the separate reproducing apparatus is connected to a DTV that can transmit various command signals to the digital video camera used for recording the image information or the separate reproducing apparatus, the connected camera or apparatus can also be controlled by operating a graphical user interface (hereinafter referred to as "the GUI") displayed on the display screen of the DTV.

Such a DTV will be described below with reference to FIGS. 43 and 44. FIG. 43 schematically shows the construction of a system comprised of a conventional DTV and peripheral apparatuses connected thereto. FIG. 44 is a view showing the arrangement of buttons of a remote control device shown in FIG. 43.

A DTV 1101 is provided therein with a drive 1102 that reads data from a recording medium such as a video disk 1104, and a memory card slot 1103 that reads data from a recording medium such as a memory card 1105. The DTV 1101 allows peripheral apparatuses such as a portable digital video camera (hereinafter referred to as "the DVC") 1106, a digital camera 1107, an installed video deck 1108, or a video disk player 1109 to be connected thereto, as shown in FIG. 43. Further, the DTV 1101 can be operated from a remote control device 1110.

The remote control device 1110 has cursor buttons 1502 to 1505 for upward, leftward, downward, and rightward directions, respectively, an execution button 1506, a menu button 1507, and a channel selecting button 1508, which are all provided on a top surface of the remote control device 1110, as shown in FIG. 44.

Next, with reference to FIGS. 45 to 51, a description will be given of an example of a display screen for a still or animated image obtained when the DTV 1101 reproduces the image from the recording medium or via the peripheral apparatuses connected thereto. FIG. 45 is a view showing an example of a display screen provided when the memory card is inserted into the DTV in FIG. 43. FIG. 46 is a view showing an example of a display screen for an image recorded in the memory card, inserted into the DTV in FIG. 43. FIG. 47 is a view showing an example in which a menu screen is displayed on the display screen in FIG. 46. FIG. 48 is a view showing an example of an enlarged display of the recorded image on the display screen in FIG. 46. FIG. 49 is a view showing an example of a display screen provided when a DVC is connected to the DTV in FIG. 43. FIG. 50 is a view showing an example in which a DVC operating panel is displayed on the display screen in FIG. 49. FIG. 51 is a view showing an example of a multiscreen including an animated image from the DVC and a still image from the memory card and which is displayed on the DTV.

When the memory card 1105, storing still image data obtained by the digital camera 1107, is inserted into the memory card slot 1103 in the DTV 1101, the DTV 1101 detects the insertion of the memory card 1105 into the memory card slot 1103, and actuates an application for simultaneously displaying the still images recorded in the memory card, as thumbnail images. Thus, the DTV 1101 displays a list display screen 1301 that simultaneously displays the still images recorded in the memory card, as thumbnail images, as shown in FIG. 45. The list display screen 1301 for thumbnail images displays a digital camera icon 1302 indicating that the simultaneously displayed thumbnail images have been photographed by a digital camera. Further, any of the thumbnail images can be selected or moved on the list display screen 1301 by using the four-way cursor buttons 1502 to 1505, execution button 1506, and menu button 1507 of the remote control device 1110.

Here, a focus can be moved to, for example, a thumbnail image 1303, 1304, or 1305 on the screen shown in FIG. 45, by operating the corresponding cursor buttons 1502 to 1505 of the remote control device 1110. When the focus is moved to the thumbnail image 1305, it is enclosed by a thick frame to indicate that it is being focused on. When the execution button 1506 is operated with the thumbnail image 1305 focused on, the screen is switched to a screen 1401 displaying a still image 1403 corresponding to the thumbnail image 1305, as shown in FIG. 46. The digital camera icon 1402 is also displayed on the screen 1401.

With the screen 1401 displayed, if the menu button 1507 on the remote control device 1110 is depressed, an operation menu 1501 is displayed as shown in FIG. 47. While the operation menu 1501 is being displayed, the movements of the cursor buttons 1502 to 1506 on the remote control device 1110 are limited to those between the items in the operation menu 1501. Further, when the menu button 1507 is then depressed again, the operation menu 1501 disappears. Then, if an "enlarging" operation is selected from the operation menu 1501 and the execution button 1506 of the remote control device 1110 is depressed, an "enlarging" operation is performed. Thus, as shown in FIG. 48, an enlarged display screen 1601 of the still image 1403 in the screen 1401 is displayed. At this time, the position of the enlarged portion is indicated by vertical and horizontal scroll bars 1602 and 1603, and the displayed position is moved by operating the scroll bars 1602 and 1603 using the cursor buttons 1502 to 1505 on the remote control device 1110. Further, this enlarged display is cleared by depressing the execution button 1506 on the remote control device 1110, and then returns to the screen shown in FIG. 46.

Now, if a DVC (digital video camera) is connected to the DTV 1101, the DTV 1101 and the DVC 1106 are connected together via a serial bus such as the IEEE1394, via which the DTV 1101 and the DVC 1106 transfer and receive animated image data and various commands therebetween. Further, the DTV 1101 and the DVC 1106 can be connected together with power thereto ON, so that images from the DVC 1106 can be viewed by simply connecting the DVC 1106 and the DTV 1101 together via a single cable if it is set such that immediately after the DVC 1106 has been connected to the DTV 1101, the DTV 1101 is switched to a reproduced image screen and the DTV 1101 then transmits a reproduction executing signal to the DVC 1106. For example, when the DVC 1106 and the DTV 1101 are connected together, a reproduced image screen 1701, 1801 from the DVC 1106 is displayed on the DTV 1101 and a digital video camera icon 1702, 1802 a reproduced image 1703, 1803 (a still image), and an operation panel 1704, 1803 are displayed, as shown in FIGS. 49 and 50. FIG. 50 illustrates the play button of the operating panel displayed on the display screen in FIG. 49 being operational.

Then, when the reproduction button on the operation panel 1704 is selected to execute reproduction using the cursor buttons 1502 to 1505 and execution button 1506 on the remote control device 1110, reproduction of images from the DVC 1106 is started.

Further, as shown in FIG. 51, it is possible to display a multiscreen 1901 using a multiscreen function of the DTV 1101 and simultaneously display images from different image sources on the multiscreen 1901. For example, it is possible to display, on one screen, a still image 1906 from the memory card 1105, inserted into the slot 1103 in the DTV 1101, while displaying, on the other screen, a reproduced image 1903 from the DVC 1106, connected to the DTV 1101. In this case, a digital camera icon 1905 and a thumbnail image selection bar 1907 that allows a still image to be selected from the memory card 1105 are displayed on the side of the screen 1906, which displays the still image from the memory card 1105. On the other hand, a digital video camera icon 1902 and an operation panel 1904 are displayed on the side of the reproduced image display screen 1903 of the DVC 1106.

As described above, if a travel or an event is photographed using both a digital camera that photographs still images and a digital video camera that photographs animated images, image information recorded by the respective apparatuses can be simultaneously viewed. However, it is impossible to view these images in a predetermined or desired time sequence or in a manner associating the vide information with various information recorded as photographing information such as photographing areas or locations.

Further, if different media are stored at different locations and one of the media is to be reproduced, the user may forget even the presence of the other medium, which is associated with the one medium.

SUMMARY OF THE INVENTION

It is a first object of the present invention to provide an image display system, an image reproducing apparatus, an image display method that can display images recorded by a plurality of image recording apparatuses in such a manner that the images are associated with one another, and a storage medium storing a program for executing the image display method.

It is a second object of the present invention to provide a digital television apparatus and an image display method that can allow vides from a plurality of image sources to be viewed in such a manner that the images are associated with one another, and a storage medium storing a program for executing the image display method.

To attain the first object, a first aspect of the present invention provides an image display system comprising an image reproducing apparatus that captures and reproduces images recorded by a plurality of image recording apparatus and additional information added to the images, a display device that displays each of the reproduced images, a detecting device that detects presence or absence of relevancy between the images recorded by the plurality of image recording apparatuses based on the additional information captured by the plurality of image recording apparatuses for reproduction, and a control device that controls the display device to display a related image display screen for allowing a viewer to recognize related images which are detected to have relevancy therebetween.

In a typical embodiment of the first aspect of the present invention, the plurality of image recording apparatuses include at least one still image recording apparatus and at least one animated image recording apparatus.

In a preferred embodiment, the image reproducing apparatus, the display device, the detecting device, and the control device are incorporated in a television receiver.

In a further preferred embodiment, the additional information includes date and time information indicative of dates and times at which the images were recorded, and wherein based on the date and time information, the detecting device detects, as the related images, those of the images recorded by the plurality of image recording apparatuses for which a time difference between the date and time information is within a predetermined range.

In a preferred embodiment, wherein the animated image recording apparatus continuously records animated images while adding date and time information indicative of a time period between start and end of recording of the animated images, to the animated images as the additional information, the still image recording apparatus records still images while adding date and time information indicative of dates and times at which the still images were recorded, to the still images as the additional information, and the detecting device detects at least one of the still images having added thereto the date and time information which is contained in a time period indicated by the date and time information from the animated image recording apparatus, as at least one image having relevancy to at least one animated image recorded within the time period indicated by the date and time information from the animated image recording apparatus.

More preferably, the related image display screen displays the time period indicated by the date and time information from the animated image recording apparatus and at least one thumbnail image of the still image recorded by the still image recording apparatus within the time period indicated by the date and time information from the animated image recording apparatus, in a manner such that the time period and the thumbnail image are associated with each other.

In a preferred embodiment, the image display system according to the first aspect of the present invention comprises a connecting device connectible to the plurality of image recording apparatuses, and a selecting device that selects display of the related image display screen when the plurality of image recording apparatuses are connected to the connecting device.

More preferably, the reproducing apparatus reproduces at least one image recorded by one of the plurality of image recording apparatuses when the one image recording apparatus is connected to the connecting device.

Also preferably, the plurality of image recording apparatuses include at least one still image recording apparatus that records still images in a portable recording medium, and at least one animated image recording and reproducing apparatus that records animated images in a recording medium and reproduces the animated images recorded in the recording medium, and the connecting device includes an installing device that installs therein the portable recording medium from the at least one still image recording apparatus in a manner such that the images recorded in the portable recording medium can be read out, and an animated image recording and reproducing apparatus connecting device that connects to the at least one animated image recording and reproducing apparatus in a manner such that images reproduced from the recording medium in the animated image recording and reproducing apparatus can be captured.

To attain the first object, the first aspect of the present invention further provides an image reproducing apparatus that captures and reproduces images recorded by a plurality of image recording apparatuses and additional information added to the images and displays each of the reproduced images on a display device, comprising a detecting device that detects presence or absence of relevancy between the images recorded by the plurality of image recording apparatuses based on the additional information captured by the plurality of image recording apparatuses for reproduction, and a control device that controls the display device to display a related image display screen for allowing a viewer to recognize related images which are detected to have relevancy therebetween.

To attain the first object, the first aspect of the present invention further provides a computer readable storage medium storing a program for constructing an image display system that captures and reproduces images recorded by a plurality of image recording apparatuses and additional information added thereto and displays each of the reproduced images on a display device, the program comprising a detecting module for detecting presence or absence of relevancy between the images recorded by the plurality of image recording apparatuses based on the additional information captured by the plurality of image recording apparatuses for reproduction, and a control module for controlling the display device to display a related image display screen for allowing a viewer to recognize.

To attain the second object, a second aspect of the present invention provides a digital television apparatus comprising a connecting device that connects to a plurality of image sources including at least a first image source and a second image source, in a manner being identifiable from each other, the plurality of image sources supplying images and additional information added thereto, an obtaining device that obtains the additional information added to the images from the plurality of image sources, a detecting device that searches the additional information obtained from the second image source of the plurality of image sources using the additional information obtained from the first image source, a storage device that records results of the searching, a readout device that reads out at least one image from the second source which is associated with at least one image from the first image source based on the recorded results of the searching while the at least one image from the first image source is being displayed, and a control device that displays the at least one image read out from the second image source.

In a typical preferred embodiment of the second aspect, the additional information from the first and second image sources is photographing date and time data.

Preferably, the searching device starts the searching when the second image source is connected to the connecting device while at least one image from the first image source is being displayed.

Preferably, the additional information from the first and second image sources is photographing location data.

In a preferred embodiment of the second aspect, images from the second image source are images developed on a continuous time axis as one scene of an animated image, and wherein the readout device reads an image from the second image source which is associated with an image from the first image source, in a manner such that reading-out of the image from the second image source is started from a leading position of the one scene or a position located a particular interval before a particular intermediate point on the time axis in the one scene when the image from the second image source associated with the image from the first image source is positioned at the particular intermediate point on the time axis.

In another preferred embodiment of the second aspect, the first image source comprises a device that supplies animated images, and wherein when an image from the second image source associated with an animated image from the first image source is a still image, the control device displays the image from the second image source associated with the animated image from the first image source by synthesizing the image from the second image source associated with the animated image from the first image source on a part of a display screen in which the animated image reproduced from the first image source is displayed, for a predetermined time period.

In this case, preferably, the control device displays the image from the second image source in a manner such that with a particular direction of the display screen set as a time axis, a position in the display screen where the image from the second image source is displayed is continuously moved in unison with display of the image from the first image source, from one end to another end of the display screen.

To attain the second object, the second aspect of the present invention further provides an image display method of displaying images having additional information added thereto and supplied from a plurality of image sources including at least a first image source and a second image source, comprising steps of connecting the plurality of image sources in a manner being identifiable from each other, obtaining the additional information added to the images from the plurality of image sources, searching the additional information obtained from the second image source of the plurality of image sources using the additional information obtained from the first image source, recording results of the searching, reading out at least one image from the second source which is associated with at least one image from the first image source based on the recorded results of the searching while the at least one image from the first image source is being displayed, and displaying the at least one image read out from the second image source.

To attain the second object, the second aspect of the present invention also provides a computer readable storage medium storing a program for constructing an image display system that displays images having additional information added thereto and supplied from a plurality of image sources including at least a first image source and a second image source, the program comprising a connecting module for connecting the plurality of image sources in a manner being identifiable from each other, an obtaining module for obtaining the additional information added to the images from the plurality of image sources, a searching module for searching the additional information obtained from the second image source of the plurality of image sources using the additional information obtained from the first image source, a storage module for recording results of the searching, a readout module for reading out at least one image from the second source which is associated with at least one image from the first image source based on the recorded results of the searching while the at least one image from the first image source is being displayed, and a control module for displaying the at least one image read out from the second image source.

The above and other objects, features, and advantages of the present invention will become more apparent from the following detailed description taken in conjunction with the accompanying drawings.

BRIEF DESCRIPTION OF THE DRAWINGS

FIG. 7 is a view showing the data structure in a memory section in the video cassette in FIG. 6;

FIG. 13 is a view showing a list of the photographing dates and times of the images stored in the memory card, the list being displayed on the TV apparatus in FIG. 1;

FIG. 28 is a view showing an example of information in a memory section provided in a video cassette of one of DVCs appearing in FIG. 27;

FIG. 29 is a view showing a list of the photographing dates and times of the images stored in one of memory cards in FIG. 27;

DESCRIPTION OF THE PREFERRED EMBODIMENTS

The present invention will be described below with reference to the drawings showing embodiments thereof.

First Embodiment

Figure 1:
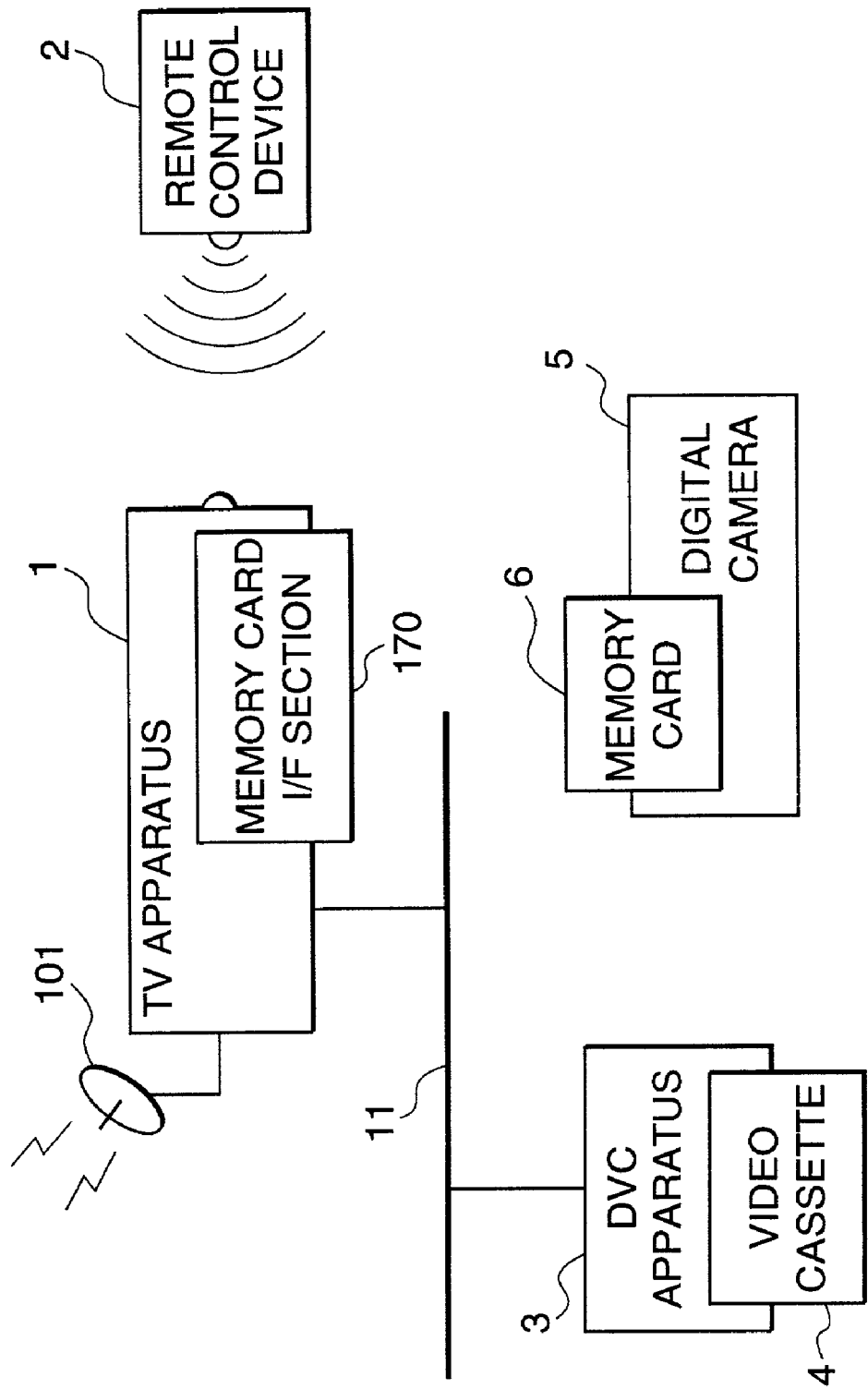
FIG. 1 is a block diagram showing the construction of an image display system according to a first embodiment of the present invention.

FIG. 1 is a block diagram showing the construction of an image display system according to a first embodiment of the present invention.

As shown in FIG. 1, the image display system includes a television receiver (hereinafter referred to as "the TV apparatus") that can receive digital broadcasting. The TV apparatus 1 performs reception of television broadcasting via an antenna 101, transmission and reception of data to and from a remote control device 2, transmission and reception of data to and from apparatuses connected to a network, control of the apparatus main body, and execution of other processes.

The TV apparatus 1 displays TV image data, apparatus image data, various icon data, control information, and other data.

The TV apparatus 1 allows an AV apparatus such as a digital video camera (hereinafter referred to as "the DVC"), a computer, and the like to be connected thereto via a 1394 I/F section, described later (and shown in FIG. 2), and allows a memory card 6 to be installed therein via a memory card I/F section 170, the memory card 6 having images photographed by a digital camera 5 recorded therein.

The remote control device 2 has a plurality of keys that can be operated by a TV broadcasting viewer, and controls the TV apparatus 1, inputs data, or executes other processes according to operations of the keys.

The DVC 3 can photograph and record animated images in a vide cassette 4 as a magnetic tape medium and reproduce images recorded in the video cassette 4. Further, the DVC 3 has an IEEE 1394 terminal (not shown) connected to the 1394 I/F section 130 of the TV apparatus 1 via a 1394 bus 11. The DVC 3 reproduces images recorded in the video cassette 4 and transmits the reproduced images to the TV apparatus via the 1394 bus 11, so that the viewer can view the images recorded in the video cassette 4, on the TV apparatus 1.

The digital camera 5 photographs and records still images in a memory card 6. The memory card 6 is a rewritable non-volatile memory in which still images photographed by the digital camera 5 can be recorded. The memory card 6 can be inserted into the memory card I/F section 170 as described above, and the TV apparatus 1 can read recorded still images out from the memory card 6, installed therein, so that the viewer can view them.

Figure 2:
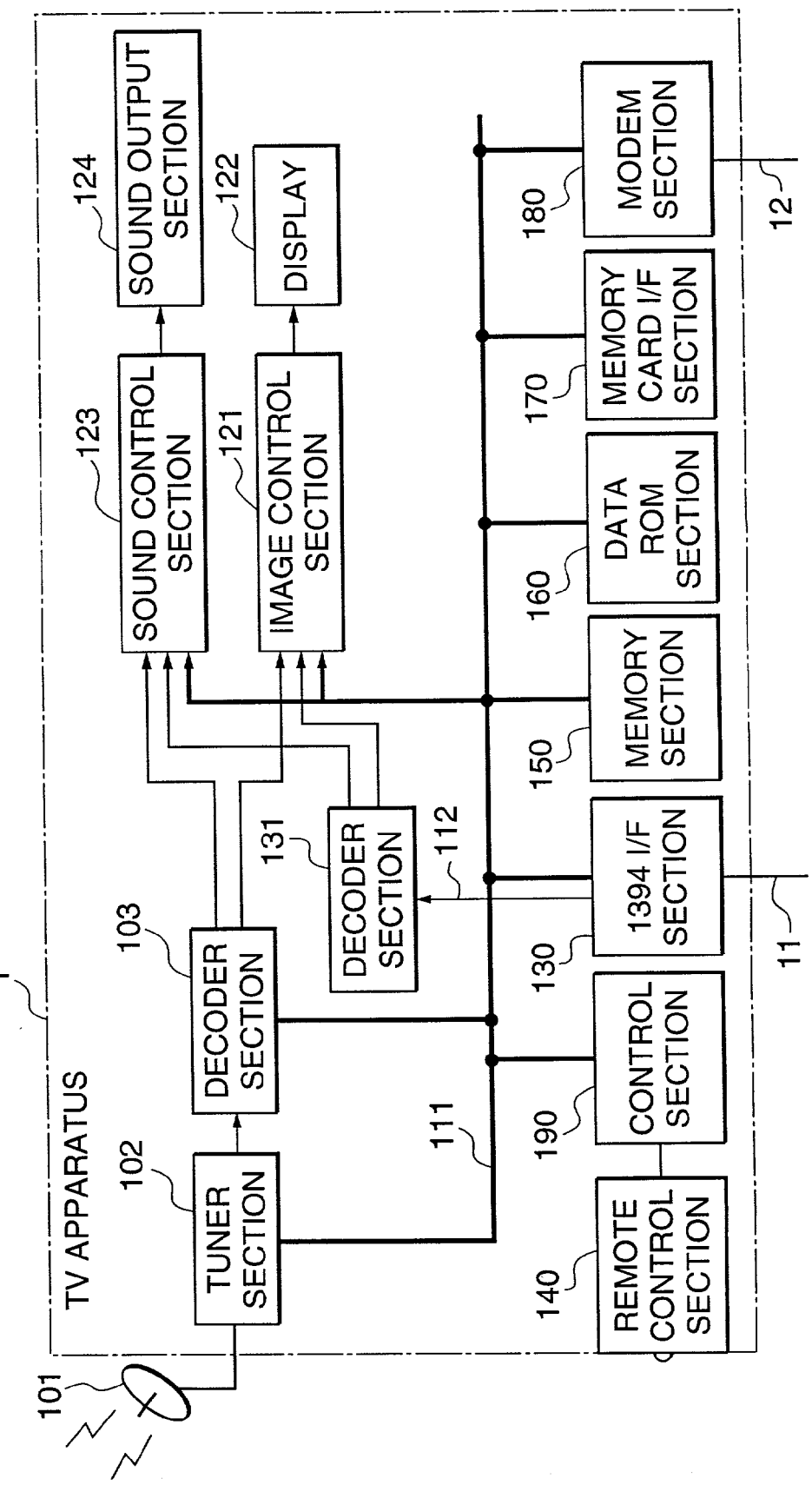
FIG. 2 is a block diagram showing the internal construction of a TV apparatus appearing in FIG. 1.

Now, the internal construction of the TV apparatus 1 will be described in detail with reference to FIG. 2. FIG. 2 is a block diagram showing the internal construction of the TV apparatus in FIG. 1.

The TV apparatus 1 is connected to the antenna 101 as shown in FIG. 2, so as to receive an external TV electric wave via the antenna 101. This TV electric wave is converted into a high-frequency TV signal, which is then guided to a tuner section 102. The tuner section 102 amplifies the high-frequency TV signal from the antenna 101, selects a channel, demodulates the high-frequency TV signal, which has been modulated by a carrier, and outputs the demodulated signal to a decoder section 103.

The decoder section 103 separates the signal obtained from the tuner section 102 into image data, sound data, and other additional data including broadcasting data and electronic program guide data, decodes these data, outputs the image data to an image control section 121, the sound data to a sound control section 123, and the other data to a bus 111.

The image control section 121 switches between the image data from the decoder section 103 and image data obtained via a decoder section 131 and image data obtained via the bus 111, or synthesizes these data, to output the thus obtained RGB image data and horizontal and vertical synchronizing signals to a display 122 comprised of a CRT or a liquid crystal display.

The display 122 receives and displays the RGB image data and horizontal and vertical synchronizing signals from the image control section 121.

The sound control section 123 switches between the sound data from the decoder section 103 and sound data from the decoder section 131 and sound data from the bus 111, or synthesizes these data, and controls the volume, the quality, the presence, and the like, to output the thus obtained sound signal to a sound output section 124.

The sound output section 124 amplifies the sound signal input by the sound control section 123 to output sound through speakers.

Connected to the bus 111 are the tuner section 102, the decoder section 103, the decoder section 131, the image control section 121, the sound control section 123, the 1394 I/F section 130, a memory section 150, a data ROM section 160, the memory card I/F section 170, a modem section 180, and a control section 190.

The 1394 I/F section 130 is an interface conforming to the IEEE 1394 standard prescribed by the IEEE (Institute of Electrical and Electronic Engineers), and which provides control based on the IEC61883 standard prescribed by the IEC (International Electrotechnical Commission) and 1394TA (1394 Trade Association), and on the subunit standard such as VCR and Panel. Specifically, the 1394 I/F section 130 controls data transmissions via the 1394 bus 11 between the TV apparatus 1 and apparatuses connected to the 1394 bus 11, for example, various AV apparatuses such as the DVC 3 or a personal computer.

The 1394 I/F section 130 separates input data into image and sound data and control data in relation to the DVC 3 connected to the TV apparatus 1. The image and sound data are output to the decoder section 131 via a data bus 112. Besides the image and sound data, the control data, information data such as indices, truck numbers, and photographing start dates, and operation data required for a DVC viewer (the viewer of images photographed by the DVC 3) to perform operations of the DVC 3 such as reproduction and fast feeding are input and output via a bus 111.

The memory section 150 stores data from the memory card I/F section 170, various data input via the 1394 I/F section 130, various data transmitted from the remote control device 2, EPG data and various TV broadcasting additional data output from the decoder section 103, and other data.

The data ROM section 160 stores TV channel information, display fonts, icons, operation panels, message texts, key codes for remote control, various tables, and others.

The memory card I/F section 170 is comprised of a connector for insertion of the memory card 6, in which still images photographed by the digital camera 5 are recorded, and a control section that reads and writes data via the bus 111.

The modem section 180 is used for the TV apparatus 1 to transmit and receive data to and from external apparatuses through a telephone line 12. For example, by connecting the TV apparatus 1 to another TV apparatus in a different house via the modem section 180 for connection with another AV apparatus through a network, transmission of image data, control of the AV apparatus, and other operations can be performed in the same manner as if the AV apparatus in the different house is connected to the viewer's TV apparatus 1. Further, the modem section 180 is also used for transmitting viewing information to a management server for charging for the viewing of pay TV broadcasting, and for connecting to a provider for connection to the Internet, as well as for other purposes.

The control section 190 individually and comprehensively controls the above-mentioned various sections connected to the bus 111. Connected to the control section 190 is a remote control section 140 which receives various data transmitted when the TV viewer operates the remote control device 2, and transfers the received data to the control section 190.

In connection with the TV reception, the control section 190 controls the tuner section 102 and the decoder section 103, and sets and controls channel switching, saving of data broadcasting data or electronic program guide data, and the like.

In connection with viewing of images photographed by the DVC 3, the control section 190 controls the 1394 I/F section 130 to detect a connection to the DVC 3, control transmission of DVC data, read in information such as index information truck numbers, and photographing start dates, generate operation panels based on the operation panel data in the DVC 3, control operations of the DVC 3, and perform other operations.

In connection with viewing of images photographed by the digital camera 5, the control section 190 detects insertion of the memory card 6, reads in photographing information data and image data from the memory card 6, decodes image data if the data has been compressed, generates thumbnail screens based on the photographing information data, compares date and time information and the like based on photographing information from the DVC 3 and the digital camera 5, and controls processes such as generation of memory card and DVC linking thumbnail screens.

The control section 190 controls the image control section 121 to set and control the display by switching among various image data such as TV broadcasting image data, data broadcasting data, and electronic program data from the decoder section 103, DVC image data from the decoder section 131, digital cameran image data from the bus 111, and operation panels, or synthesizing these data, or the like.

Further, the control section 190 similarly controls the sound control section 123 to synthesize sound data from the various sections, and controls outputs of the same. These control processes are executed based on the internal status of the TV apparatus 1, broadcasting data information, information from externally connected apparatuses, data information on operations such as remote control executed by the TV viewer, and other kinds of information.

Furthermore, the control section 190 transmits control data, display data and other data from the remote control device 140 to the remote control device 2 according to data received from the remote control section 140, changes in the internal status of the TV apparatus 1, received broadcasting data, and data from the 1394 I/F section 130 and the memory card I/F section 170.

Moreover, the control section 190 is provided with a memory such as a RAM to provide work areas required for the operations mentioned above. Further, similarly to the remote control device 2, the control section 190 has a clock function of measuring the date, day of the week, and time, and can manage and display the date and time.

Figure 3:
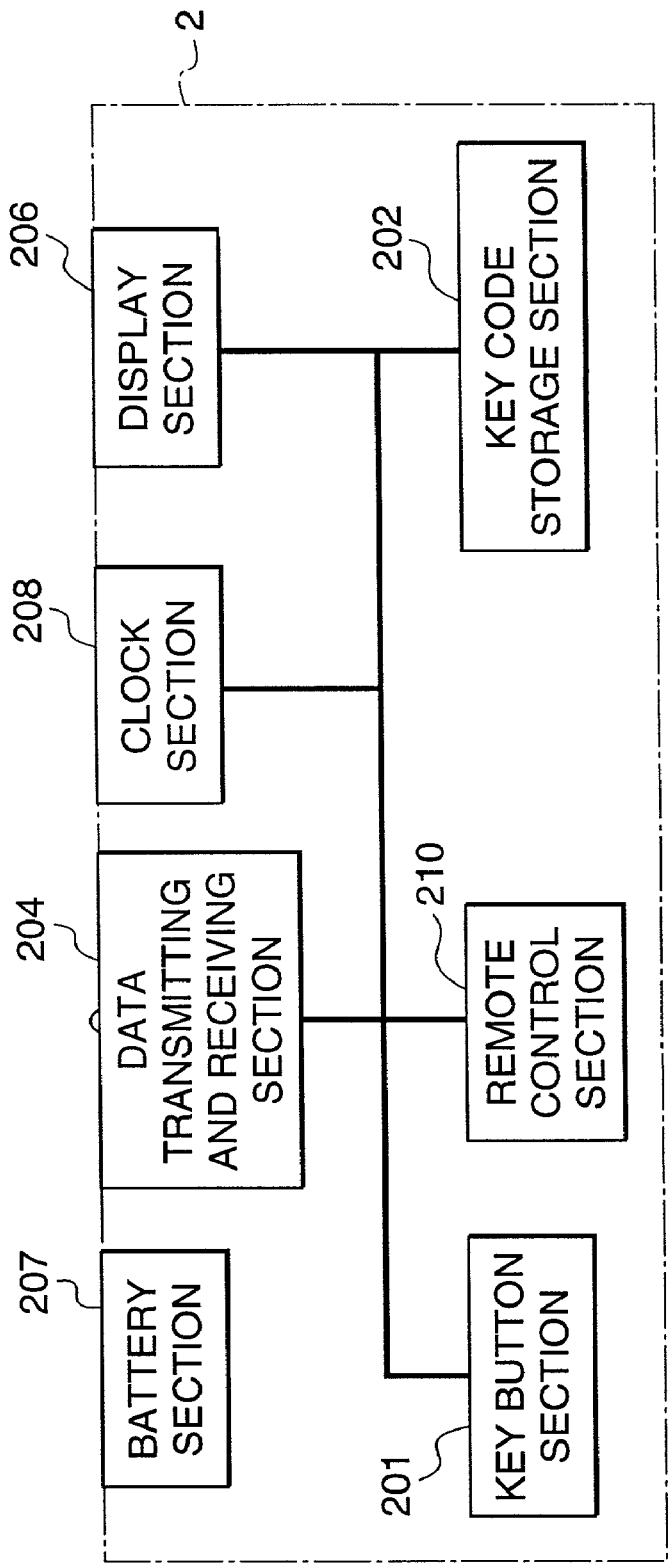
FIG. 3 is a block diagram showing the internal construction of a remote control device appearing in FIG. 1.
Figure 4:
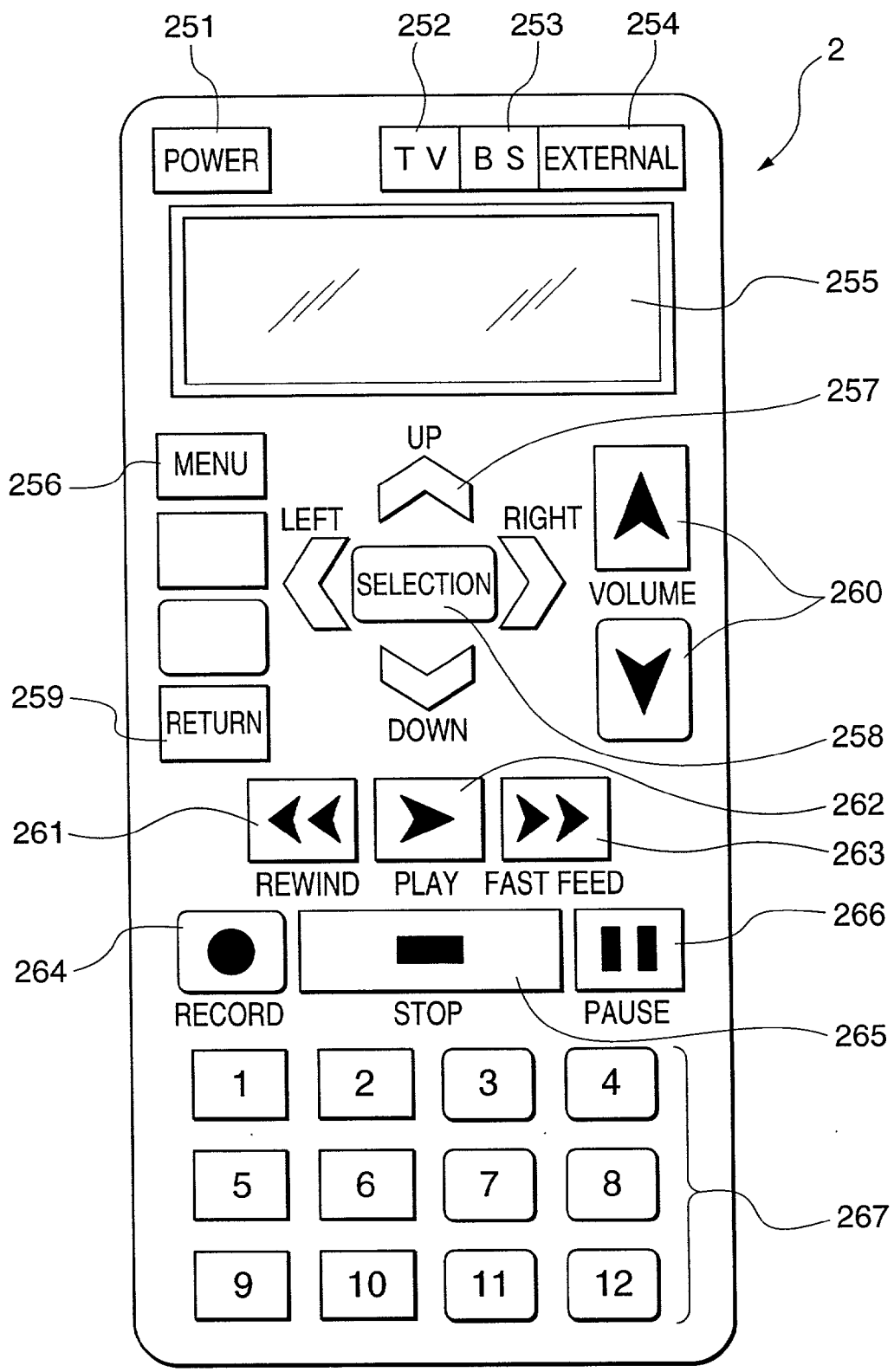
FIG. 4 is a top view showing the construction of an operation panel of the remote control device in FIG. 1, the panel including various buttons.

Next, the details of the remote control device 2 will be described with reference to FIGS. 3 and 4. FIG. 3 is a block diagram showing the internal construction of the remote control device 2. FIG. 4 is a top view showing the construction of the operation panel of the remote control device 2 in FIG. 1, which includes various buttons.

The remote control device 2 has a key button section 201, a key code storage section 202, a data transmitting and receiving section 204, a display section 206, a battery section 207, a clock section 208, and a remote control section 210, as shown in FIG. 3.

The key button section 201 determines one of a plurality of keys which has been depressed by a user, and generates a key signal corresponding the depressed key. The key code storage section 202 is a ROM storing TV operations and setting key codes.

The data transmitting and receiving section 204 transmits various data such as a key code corresponding to the depressed key, to the remote control section 140 in the TV apparatus 1, and receives various data transmitted from the remote control section 140.

The display section 206 is comprised of a liquid crystal display panel and used to provide various settings for the TV apparatus 1 and display various menus for operations, operation panels, and a clock. Further, the display section 206 displays information such as keyboard panels, operation panels, icon images, and messages which are transmitted from the TV apparatus 1.

The battery section 207 has batteries that supply power required for the remote control device 2 to operate, and supplies power to each section of the device. The clock section 208 measures and displays the date and time on the display section 206.

The remote control section 210 executes a process corresponding to a key signal from the key button section 201, and provides, as required, such control that a key code is transmitted from the transmitting and receiving section 204.

The remote control device 2 is provided with a plurality of keys as shown in FIG. 4. In the present embodiment, the device is provided on a top surface thereof with a power key 251 that turns on and off the power supply to the TV apparatus 1, a TV key 252, a BS key 253, an external-device key 254, a menu key 256, an up, down, right, and left cursor key 257, a selection key 258, a return key 259, a volume key 260, a rewind key 261, a play key 262, a fast feed key 263, a record key 264, a stop key 265, a pause key 266, and a channel selection key 267.

The TV key 252, the BS key 253, and the external key 254 are used to select input sources. When the TV key 252 is depressed, VHF, UHF, and BS broadcasting are received, and when the BS key 253 is depressed, BS digital broadcasting is selected. If an external device such as the DVC 3 or the memory card 6 is connected to the TV apparatus 1, when the external-device key 254 is depressed, a device icon for this external devices is focused on (it can be selected), and this icon is selected to determine an input source for the TV apparatus. If a plurality of device icons are displayed, the focus is moved each time the external-device key 254 is depressed, so that a desired device icon can be selected.

The menu key 256 is used to provide various settings for the TV apparatus 1 and display an operation screen. The up, down, right, and left cursor key 257, selection key 258, and return key 259 are used to provide the above described various settings, set the operation screen, and change the settings and the operation screen. Further, when an external device is selected by depressing the external-device key 254, the focus can be moved using the up, down, right, and left cursor key 257. Then, after the focus has been moved, the input source is switched using the selection key 258. The volume key 260 is used to set the volume of sound. The rewind key 261, play key 262, fast feed key 263, record key 264, stop key 265, and pause key 266 are used to operate a VTR apparatus and are function keys corresponding to VTR control functions including rewinding, reproduction, fast feeding, recording, stopping, and pausing, respectively. The channel key 267 is used to set a TV channel but is also used to input numerical values during the menu operations mentioned above.

Further, the remote control device is provided with a display section 255 (corresponding to the display section 206, shown in FIG. 3) on the top surface thereof. The display section 255 shows screens for the menu operations, the date and time, and information data transmitted from the TV apparatus 1.

Figure 5:
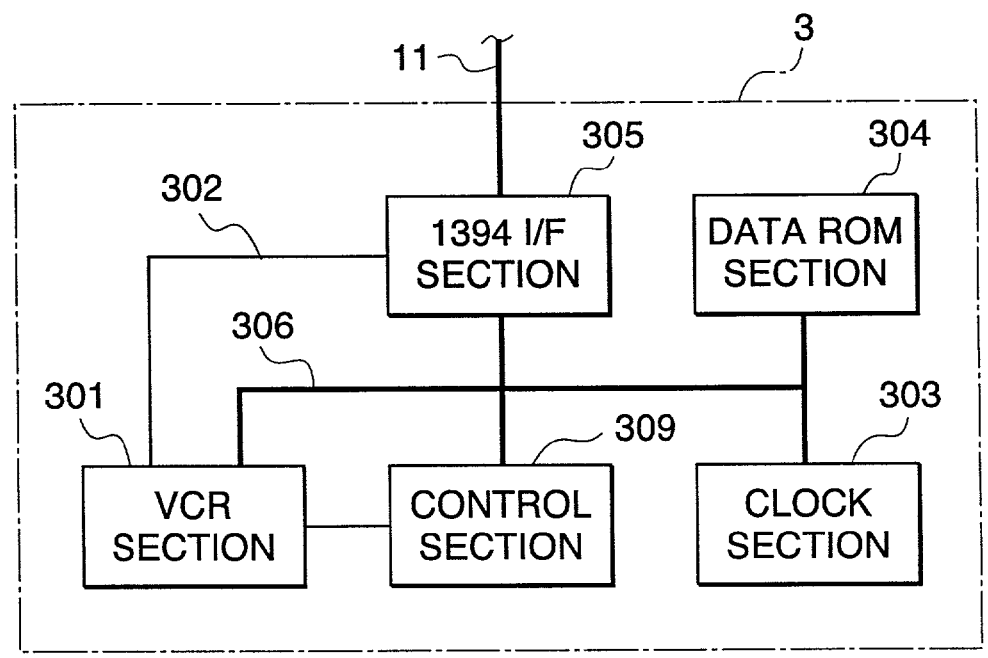
FIG. 5 is a block diagram showing the internal construction of a DVC appearing in FIG. 1.

Now, the details of the DVC 3 will be described with reference to FIG. 5. FIG. 5 is a block diagram showing the internal construction of the DVC 3.

The DVC 3 is constructed in conformity with the definition of the IEC 61884 specified by the IEC. Further, in the present embodiment, the connection interface between the DVC 3 and the TV apparatus 1 is defined by the IEC 61883.

As shown in FIG. 5, the DVC 3 has a video camera and recorder section (hereinafter referred to as "the VCR section") 301, a clock section 303, a data ROM section 304, a 1394 I/F section 305, and a control section 309, which are connected together via a control bus 306. Further, the VCR section 301 and the 1394 I/F section 305 are connected together via a data bus 302.

The VCR section 301 is comprised of a camera optical system section, an image pickup device section, a video tape feeding system mechanism section, a control section for the tape feeding system mechanism section, a recording section for image signals, a reproducing section therefor, a modulating and demodulating section therefor, a recording section for additional information, a reproducing section therefor, a finder section, and others. The additional information is called "attribute information" or "meta data", and in the case of a video recording apparatus, includes truck numbers indicative of recorded locations on a tape, recording start indices ID, recording start dates and times, recording modes, and copy right information.

The clock section 303 measures the date and time, and this clock information is written to the video cassette 4 (shown in FIG. 1) at the time of recording in the DVC 3 as one piece of the additional information so as to be used for reproduction.

The data ROM section 304 stores data such as display data (operation panels) and device icons displayed on the display 122 for remote control.

The 1394 I/F section 305 is constructed in the same manner as the 1394 I/F section 130 of the TV apparatus 1, and controls and manages transmissions and receptions of data in the DVC 3 by, for example, transferring data from the control bus 306 or from the data bus 302 to the TV apparatus 1 via the 1394 bus 11.

The control section 309 transmits various data such as information required for control, device icons, and operation panels to the TV apparatus 1 through the 1394 I/F section 305. Further, the control section 309 receives commands for reproduction, stop, pause, recording, fast feeding, rewinding, truck No. search, picture search, and the like which are transmitted from the 1394 I/F section 130, to control the VCR section 301 based on these commands. Furthermore, the control section 309 reads and writes data from and to a memory section 402 of the video cassette 4, described later, according to a memory read/write command.

The control bus 306 is used to transfer the above described various data whereby the control section 309 controls the VCR section 301 via this bus 306. Further, the data bus 302 is used to transfer images, sounds, and additional data to be recorded in and reproduced from the video cassette 4, to the 1394 I/F section 305.

Figure 6:
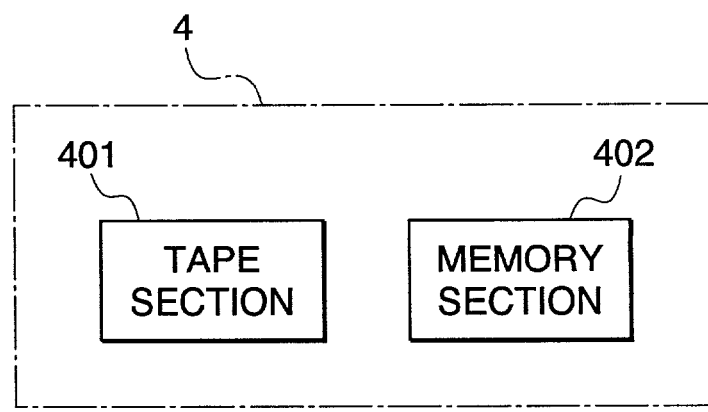
FIG. 6 is a view schematically showing the internal construction of a vide cassette used in the DVC in FIG. 1.

Now, the details of the video cassette 4 used in the DVC 3 will be described with reference to FIGS. 6 and 7. FIG. 6 is a view schematically showing the internal construction of the video cassette used in the DVC in FIG. 1. FIG. 7 is a view showing the data structure in a memory section in the video cassette in FIG. 6.

As shown in FIG. 6, the video tape cassette 4 is comprised of a tape section 401 in which images, sounds, and additional information are recorded, and the memory section 402, to which part of the additional information and other information on the recording in the tape section 401 is written. The control section 309 controls recordings in, reproductions from, writes to, and reads from the video tape cassette 4.

Photographing information such as truck numbers (locations on the tape) indicative of the start and end of photographing, index marks indicative of recording start and end and pause, and dates and times is written to the memory section 402. In this example, a total of six scenes are photographed. Writes and reads of information to and from the memory section 6 are executed by the control section 309 according to a read/write command transmitted from the 1394 I/F section 130.

Figure 8:
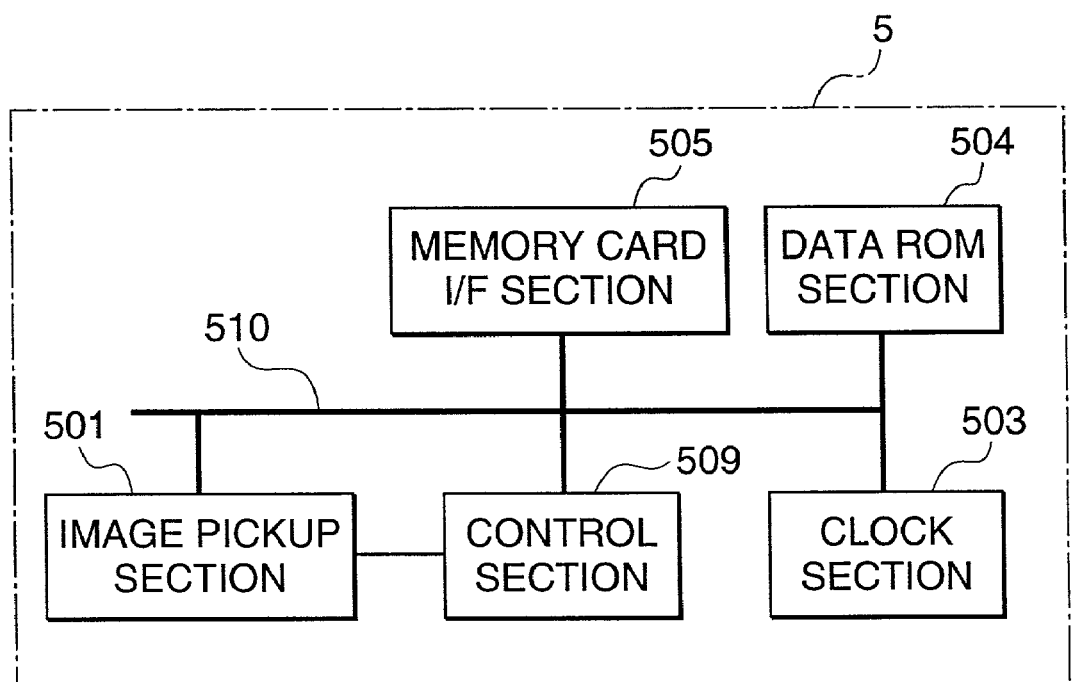
FIG. 8 is a block diagram showing the internal construction of a digital camera appearing in FIG. 1.
Figure 9:
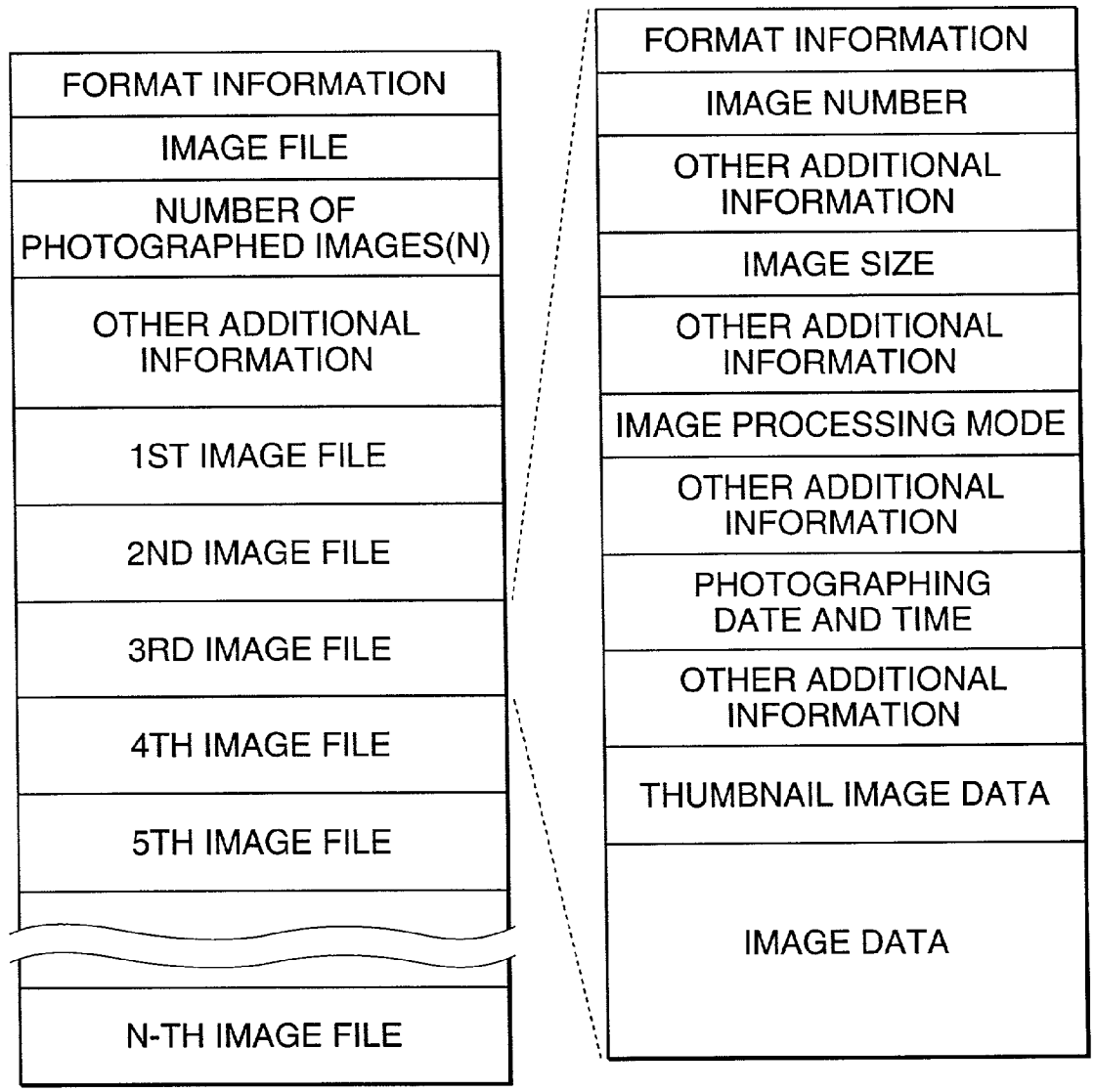
FIG. 9 is a view showing the data structure in a memory card used in the digital camera in FIG. 1.

Next, the details of the digital camera 5 will be described with reference to FIGS. 8 and 9. FIG. 8 is a block diagram showing the internal construction of the digital camera in FIG. 1. FIG. 9 is a view showing the data structure in the memory card used in the digital camera in FIG. 1.

As shown in FIG. 8, the digital camera 5 has an image pickup section 501, a clock section 503, a data ROM section 504, a memory card I/F section 505, and a control section 509, which are connected together via a control bus 510. The image pickup section 501 is comprised of a camera optical system section, an image pickup device section, an image signal processing section, a finder section, and a display section, each of which executes processing under the control of the control section 509. The clock section 503 measures the date and time, and the resulting clock information is written to the memory card 6 together with an image as one piece of additional information.

The memory card I/F section 505 is similar to the memory card I/F section 170 of the TV apparatus 1, and writes image data and additional information data from the control bus 510 to the memory card 6. The control section 509 executes control by, for example, adding information such as a photographing date and time, a photographing location, photographing conditions, an image size, an image processing mode, and format information to a full image or a thumbnail image (display image) obtained by the image pickup section 501 and processed through image processing, and transferring this information to the memory card I/F section 505.

The memory card 6, to which still images photographed by the digital camera 5 are written has a data structure containing additional information followed by image files, as shown in FIG. 9 (see the left of FIG. 9). The additional information is comprised of file format information stored at the top thereof, followed by information indicating that the files are image files. At the next location, the number of images (the number of photographed images) is stored, followed by other additional information. Then, at the next location, image files corresponding in number to the number of photographed images are stored.

Each image file also has a data structure that additional information is stored, followed by image data (the right of FIG. 9). The additional information is comprised of format information for the image file stored at the top thereof, followed by the size of the image, the image processing mode, and the photographing date and time. Other kinds of additional information are also provided, but description of the contents thereof is omitted. Next to the additional information, thumbnail image data and full-size image data are stored. The thumbnail image data is obtained by reducing full-size image data to a certain size.

Figure 10:
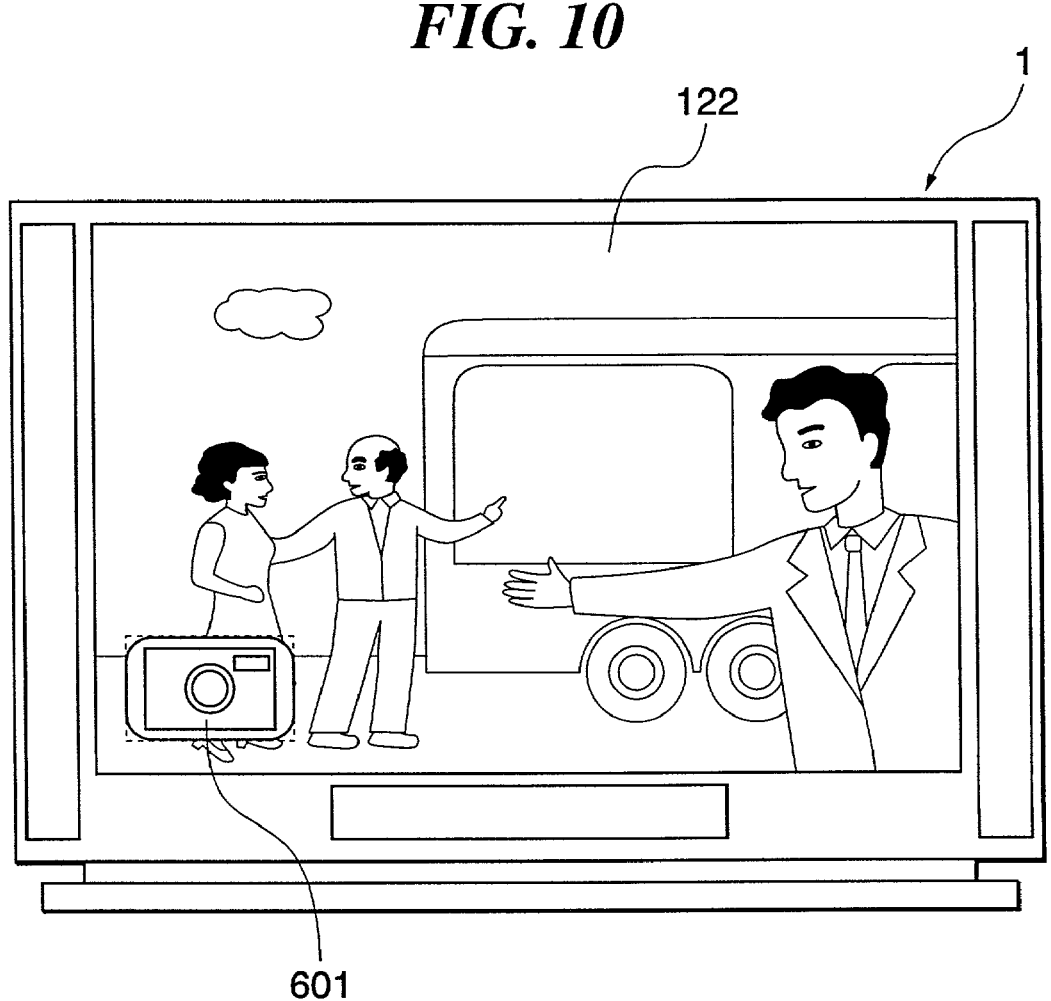
FIG. 10 is a view showing an example of a screen of the TV apparatus in FIG. 1 displayed when the memory card from the digital camera is inserted into the TV apparatus.
Figure 11:
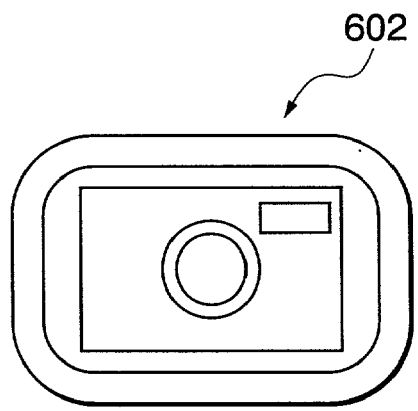
FIG. 11 is a view showing a memory card icon focused on on the screen of the TV apparatus in FIG. 1.
Figure 12:
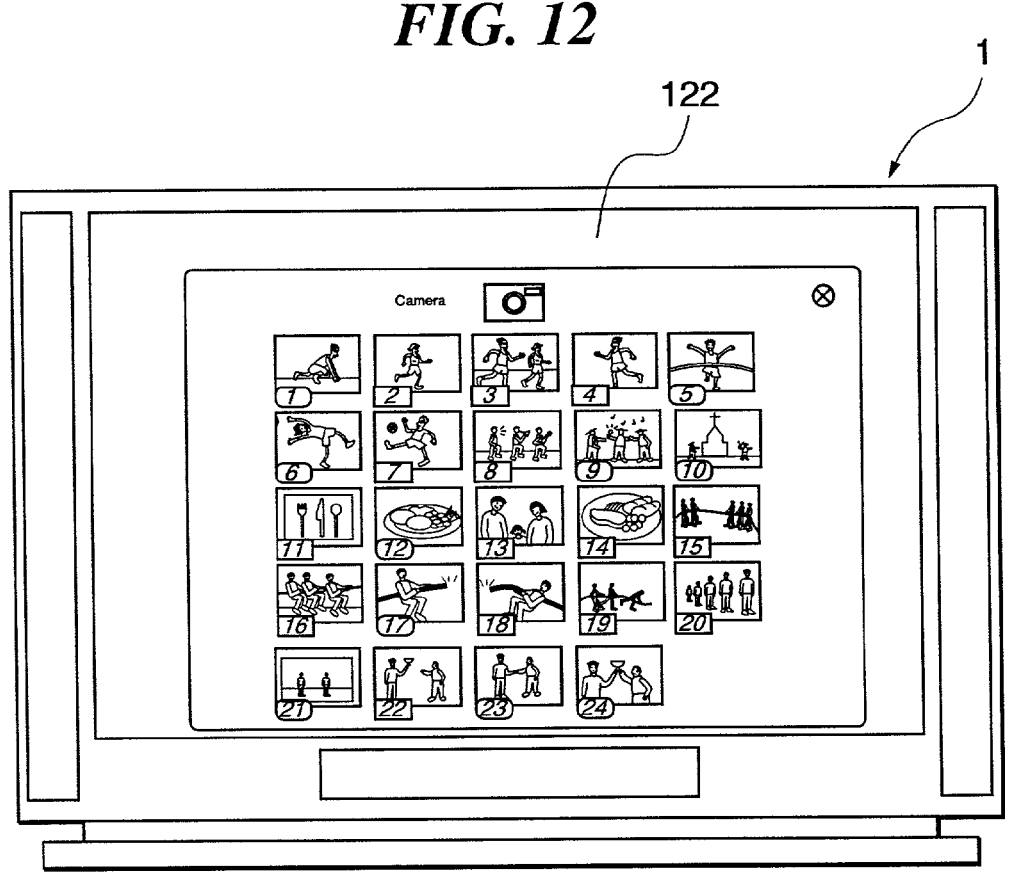
FIG. 12 is a view showing an example of a screen of the TV apparatus in FIG. 1, displaying thumbnail images from the memory card.
Figure 14:
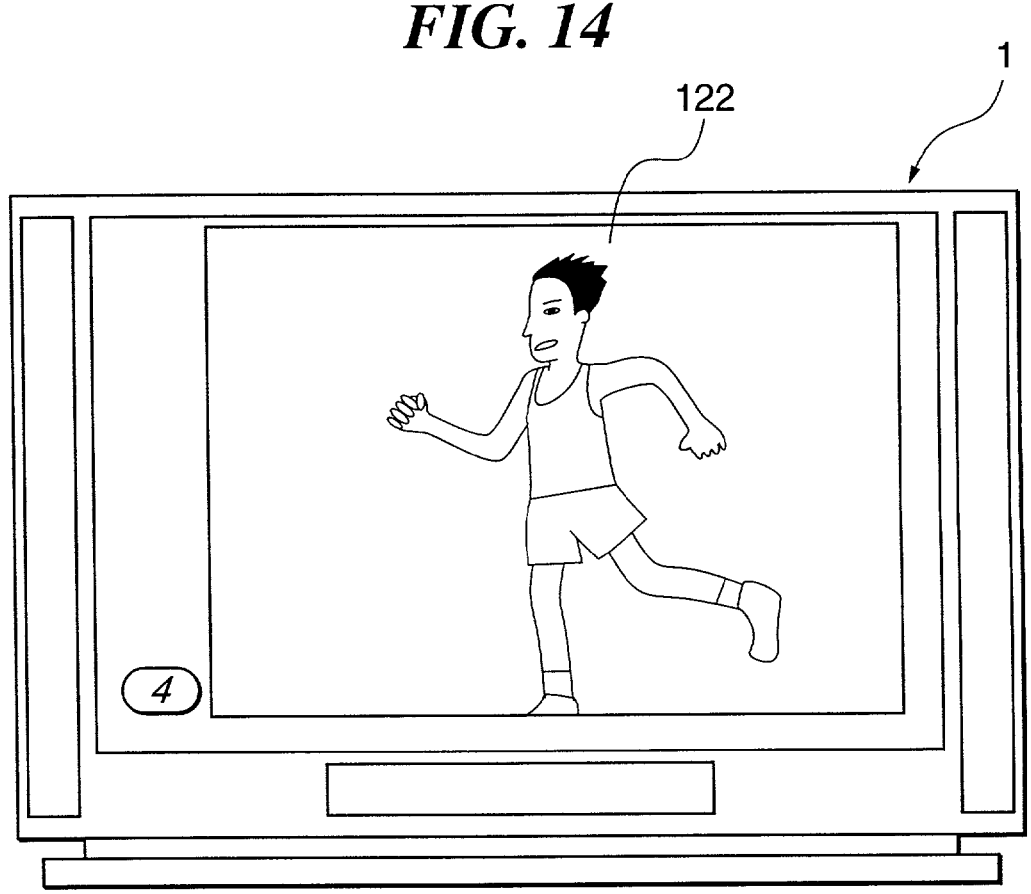
FIG. 14 is a view showing an example of a screen of the TV apparatus in FIG. 1, displaying an image from the memory card in a full size.

Now, a case in which the memory card 6 is inserted into the digital camera 5 will be described with reference to FIGS. 10 to 14. FIG. 10 is a view showing an example of a screen on the TV apparatus displayed when the memory card from the digital camera is inserted into the TV apparatus in FIG. 1. FIG. 11 is a view showing a memory card icon focused on on the screen of the TV apparatus. FIG. 12 is a view showing an example of a screen of the TV apparatus in FIG. 1, which displays thumb nail images from the memory card. FIG. 13 is a view showing a list of photographing dates and times for respective images stored in the memory cared, the list being displayed on the TV apparatus. FIG. 14 is a view showing an example of a screen on the TV apparatus in FIG. 1, which displays a full-size image from the memory card.

When the memory card 6 from the digital camera 5 is inserted into the TV apparatus 1, the TV apparatus 1 automatically displays a digital camera icon 601, which is called a device icon, at a left lower location of a screen of the display 122 in order to allow a TV viewer to realize that the memory card 6 has been inserted, as shown in FIG. 10. Data on this device icon is stored in the data ROM section 160 and is used to display the device icon. If any device icon is present in the memory card 6, it may be used.

Here, when the next process for the memory card 6 is selected on this screen, the digital camera icon 601 is focused on on the screen, and the focused-on icon 602 is displayed. The focusing refers to the indication of a target of the next process using the selection key, and the frame and color of the device icon is changed to allow the user to realize the selection. This focus display is executed by depressing the external-display key 254 (shown in FIG. 4) of the remote control device 2. When the selection key 258 (FIG. 4) of the remote control device 2 is depressed, the next process for this icon is executed. For the digital camera icon, the next process is the display of thumbnail images.

In the thumbnail image display, all the thumbnail images stored in the inserted memory card 6 are displayed on the screen of the display 122 in the form of a list, as shown in FIG. 12. In this example, the contents of the memory card 6 are photographed scenes of an athletic meet, and 24 images are contained in the memory card 6. Here, as shown in FIG. 13, information indicative of a photographing date and time is stored for each of the images stored in the memory card 6, as additional information, as described above (see FIG. 9). Further, images Nos. 1 to 5 show scenes of a footrace, images Nos. 6 and 7, scenes of a ball game, images Nos. 8 to 10, scenes of a dance, images Nos. 11 to 14, scenes of lunch, images Nos. 15 to 24, scenes of a tug-of-war, and images Nos. 20 to 24, scenes of a closing ceremony. When a thumbnail image display screen for these images is displayed, the focus is first displayed on the thumbnail image No. 1. This focus display can be moved by using the up, down, right, and left cursor key 257 (FIG. 4) of the remote control device 2. When the selection key 258 is depressed, the screen shifts to a full-size image display, described later.

When the screen shifts to the full-size image display, a full-size image of an image selected from the memory card 6 is displayed, as shown in FIG. 14. In this example, the full size-image of the image No. 4 from the memory card 6 is displayed on the screen. On this screen, the display is shifted by operating the up, down, right, and left cursor key 257 and the return key 259.

Figure 15:
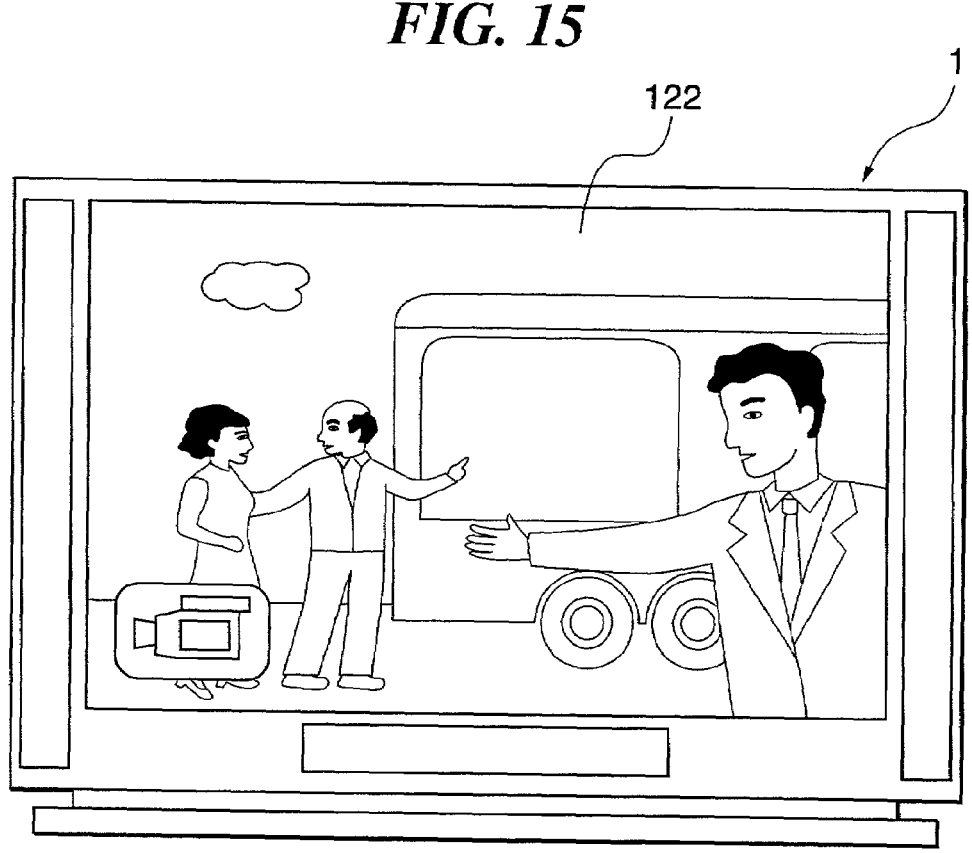
FIG. 15 is a view showing an example of a screen of the TV apparatus in FIG. 1 displayed when the DVC is connected to the TV apparatus.
Figure 16:
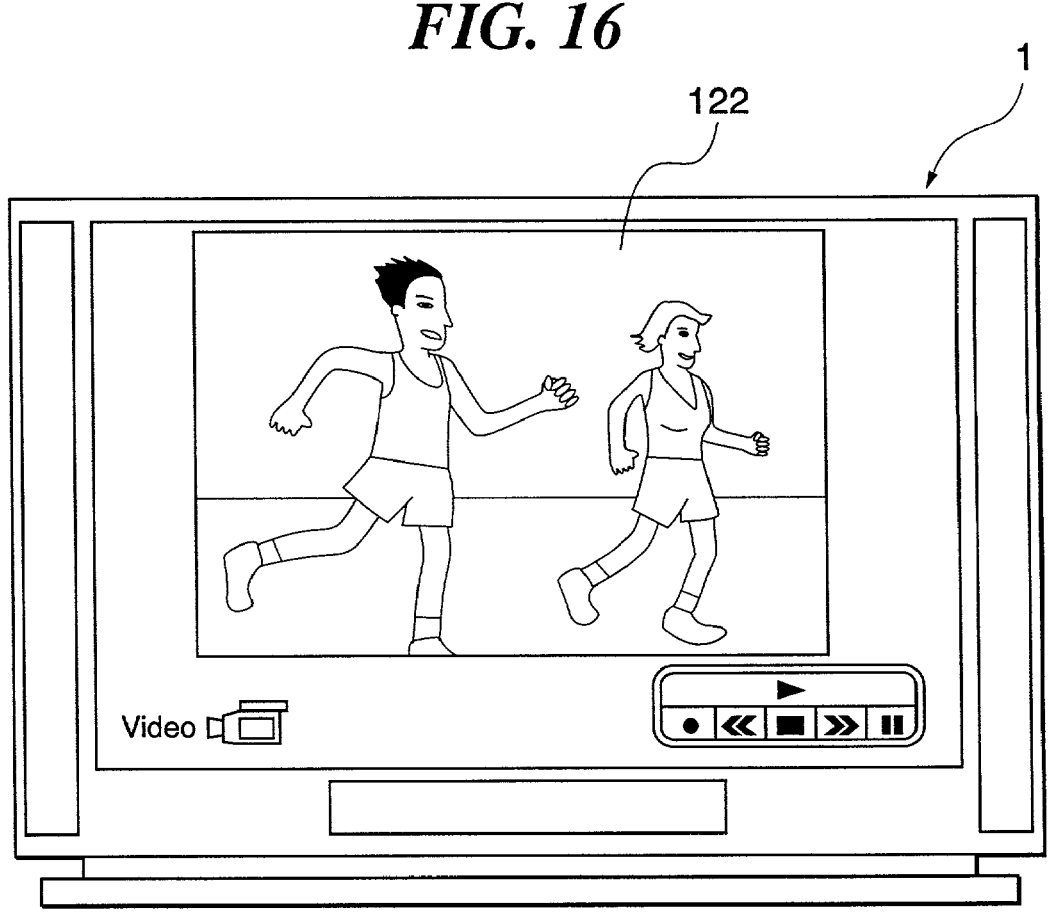
FIG. 16 is a view showing an example of a screen of the TV apparatus in FIG. 1, showing an image reproduced by the DVC.

Then, a case in which the DVC 3 is connected to the TV apparatus 1 will be described with reference to FIGS. 15 and 16. FIG. 15 is a view showing an example of a screen on the TV apparatus in FIG. 1 displayed when the DVC is connected to the TV apparatus. FIG. 16 is a view of an example of a reproducing screen of an image reproduced by the DVC on the screen of the TV apparatus in FIG. 1.

When the DVC 3 is connected to the TV apparatus 1, the connection of the DVC 3 is detected, and a video camera icon is displayed on the screen of the display 122 of the TV apparatus 1, as shown in FIG. 15. This video camera icon is transferred from the DVC 3 to the TV apparatus 1 when the connection of the DVC 3 is detected. Then, when the external-device key 254 of the remote control device 2 is depressed, the digital video camera icon is focused on as in the case with the memory card. When the selection key 258 is depressed, the next process for the digital video icon is executed. The next process is the display of a reproducing screen of an image reproduced by the DVC 3.

When the reproducing screen is displayed, an operation panel is displayed at a right lower location of the screen of the display 122 of the TV apparatus 1, as shown in FIG. 16. Then, the TV viewer can perform operations such as reproduction, stop, or fast-feeding on the DVC 3 by using the up, down, right, and left cursor 257 and selection key 258 of the remote control device 2 to operate the operation panel (moving the focus to perform the operation). Further, the operations such as reproduction, stop, or fast-feeding can also be performed by operating the operation keys (keys 261 to 266 in FIG. 4) of the remote control device 2 intended for the DVC 3. In FIG. 16, an icon and a character displayed at a left lower location of the screen indicate that the input source for the screen is the DVC 3.

Figure 17:
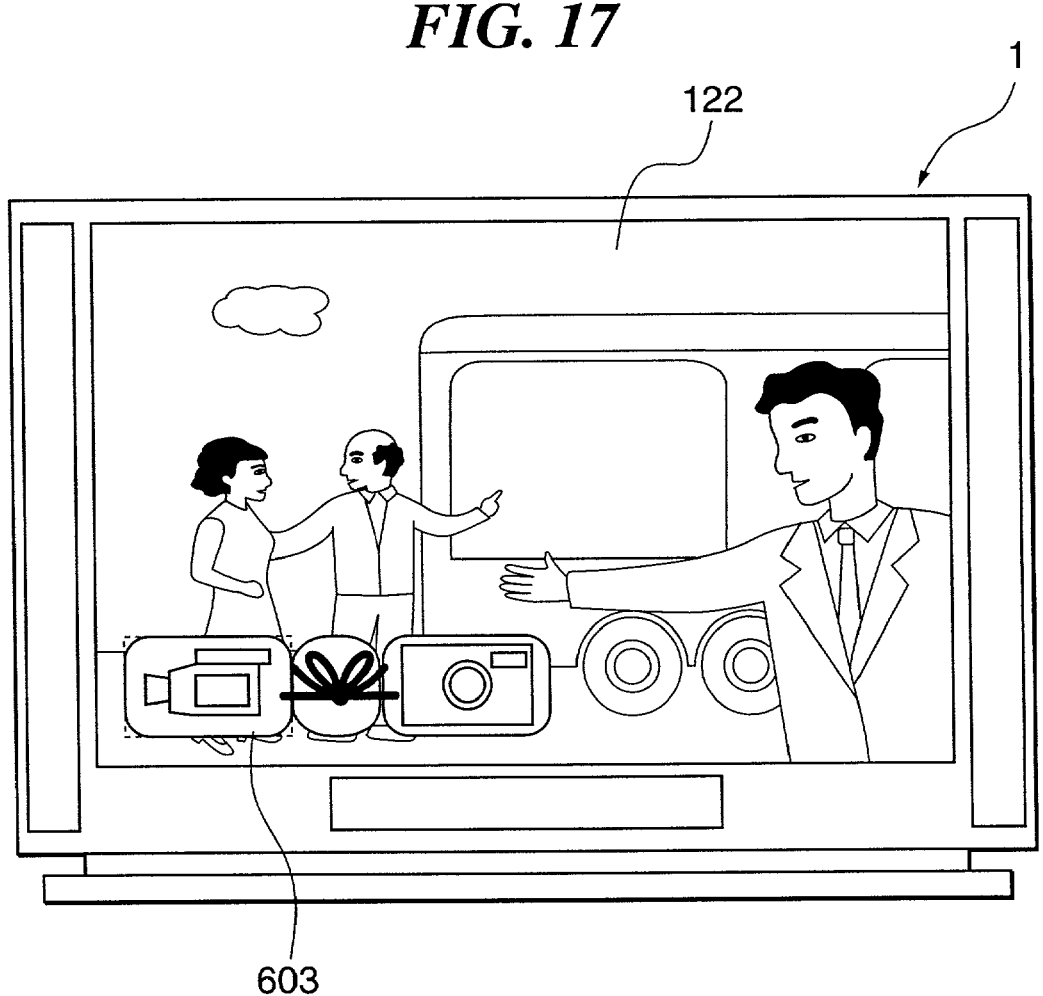
FIG. 17 is a view showing an example of a screen of the TV apparatus in FIG. 1 displayed when the memory card from the digital camera and the DVC are connected to the TV apparatus.
Figure 18:
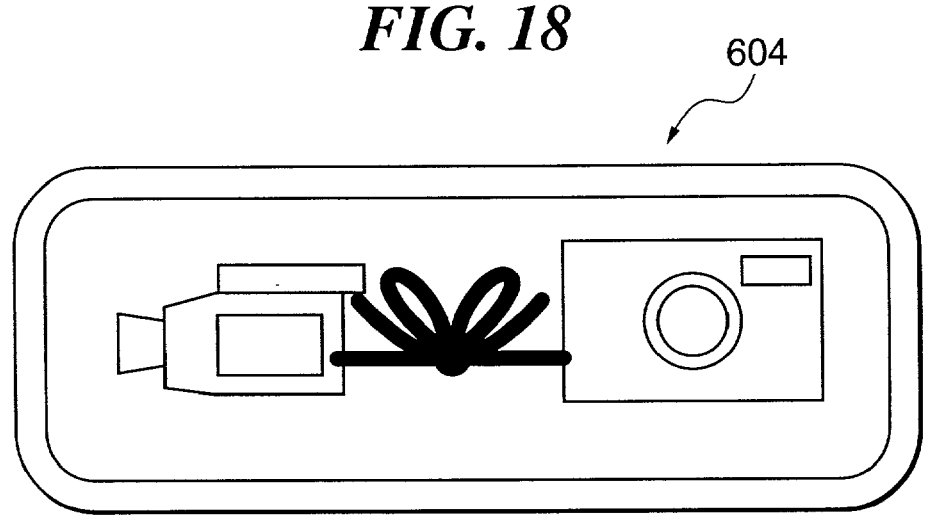
FIG. 18 is a view showing an icon focused on on the screen of the TV apparatus in FIG. 1 and containing the digital camera and a digital video camera.
Figure 19:
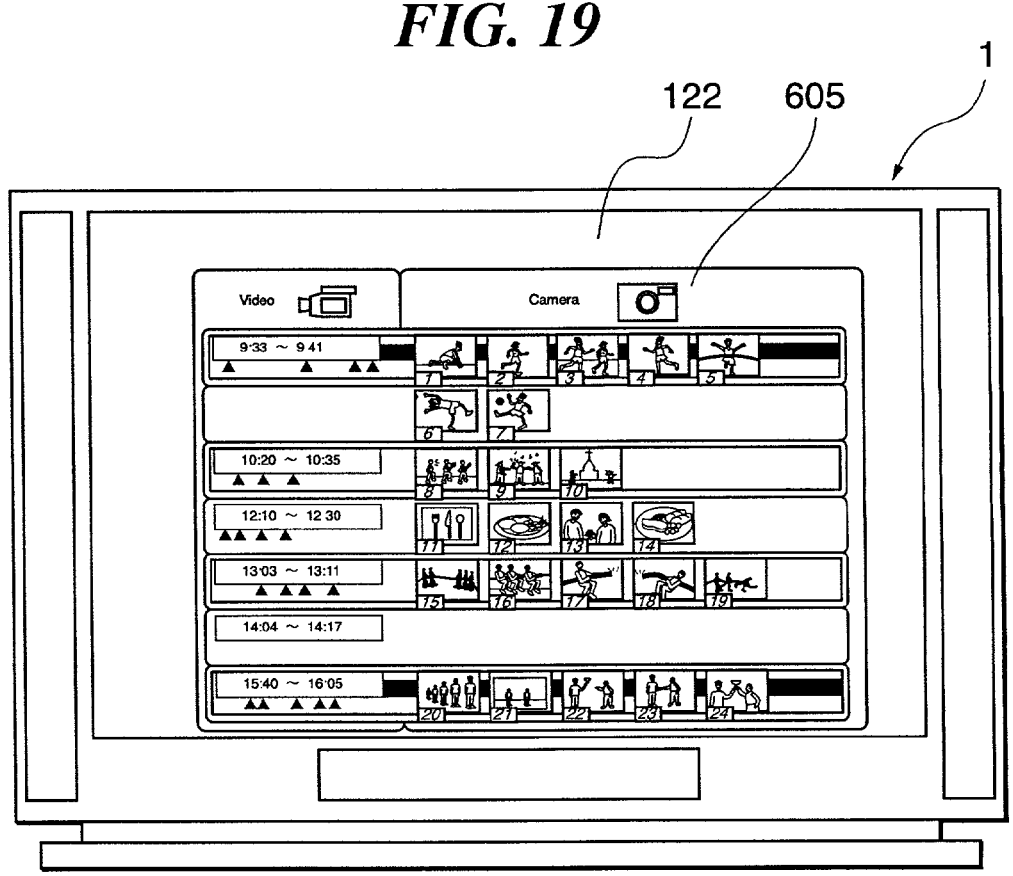
FIG. 19 is a view showing an example of a screen displayed on the TV apparatus in FIG. 1 when the memory card and the DVC are simultaneously selected.
Figure 20:
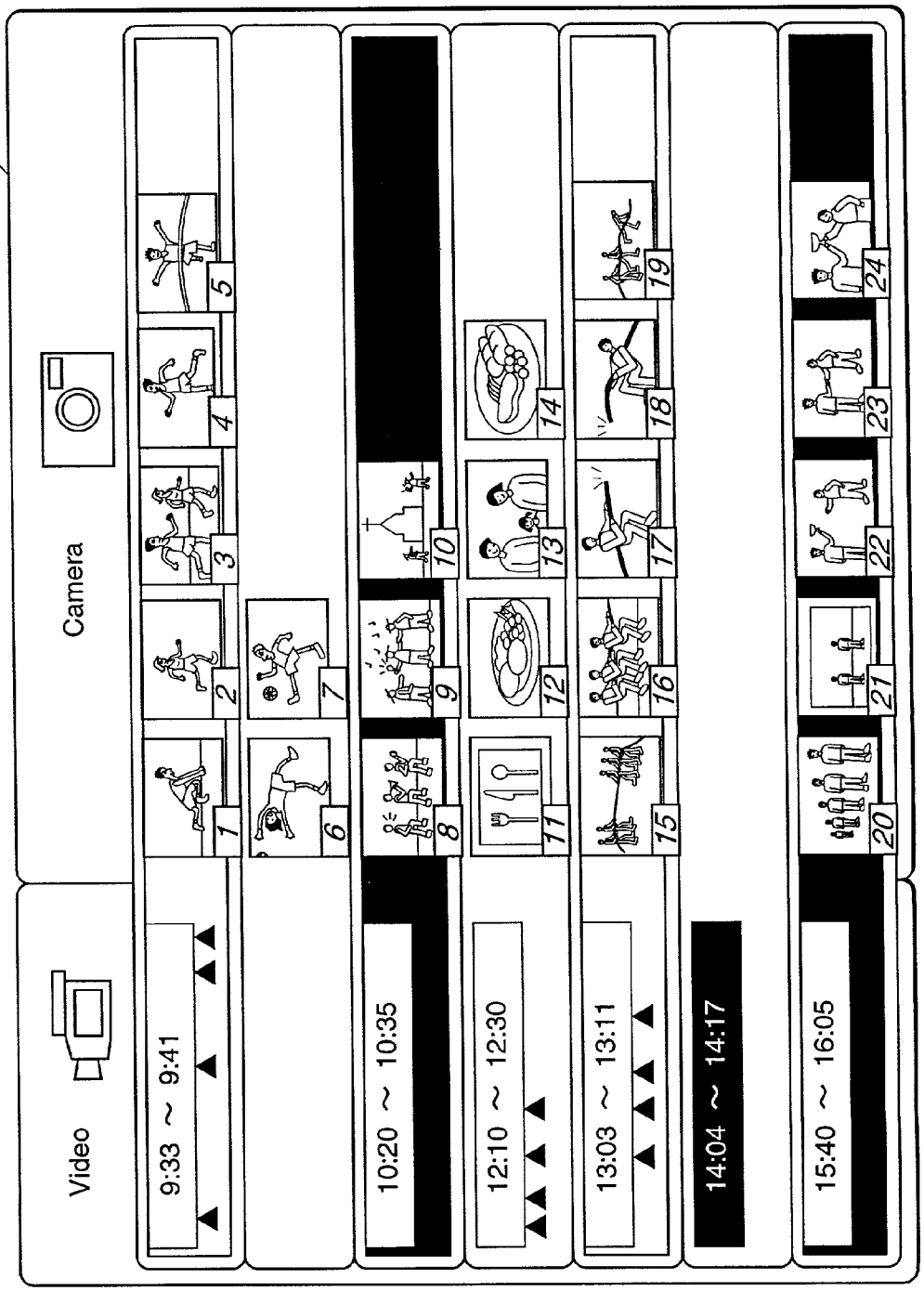
FIG. 20 is an enlarged view of the screen example in FIG. 19.

Now, a case in which the memory card 6 from the digital camera 5 and the DVC 3 are connected to the TV apparatus 1 will be described with reference to FIGS. 17 to 20. FIG. 17 is a view showing an example of a screen on the TV apparatus in FIG. 1 displayed if the memory card from the digital camera and the DVC 3 are connected to the TV apparatus. FIG. 18 is a view showing an icon focused on on the screen of the TV apparatus and containing the digital camera and the digital video camera. FIG. 19 is a view showing an example of a screen displayed on the TV apparatus in FIG. 1 when the memory card and the DVC are simultaneously selected. FIG. 20 is a view showing an enlarged version of the screen example.

When the two devices, the DVC 3 and the memory card 6 from the digital camera 5 are connected to the TV apparatus 1, the connection of these two devices is detected, and an icon 603 containing a digital camera icon and a video camera icon is displayed on the screen of the display 122, as shown in FIG. 17. In this case, it is assumed that images photographed at the same athletic meet are recorded in the memory card 6 and the DVC 3 and that some of the images show scenes photographed during the same time period. If there are thus any scenes photographed within the same time period and associated with one another, then as a device icon, the device icons for the digital camera and the digital video camera are displayed with a "tied string icon" displayed between these two device icons and indicating that these two device icons are associated with each other. Thus, the TV viewer can realize that the contents recorded in the two connected apparatuses are associated with each other. If the contents recorded in the memory card 6 and in the DVC 3 are not associated with each other, the "tied string icon" is not displayed.

Any of these three icons, that is, the digital camera icon, the digital video camera icon, and the digital camera and digital video camera connecting icon ("tied string icon") can be focused on using the external-device key 254 of the remote control device 2 for selection. When the digital camera and digital video camera connecting icon is selected, it is focused on and the icon 603 is changed to an icon 604 as shown in FIG. 18.

Here, if the digital camera icon is selected, the process of shifting to the thumbnail image display screen, shown in FIG. 12, is executed as described above. If the digital video camera icon is selected, the process of shifting to the reproducing screen for the DVC3, shown in FIG. 16, is executed as described above. When the digital camera and digital video camera connecting icon is selected, the display shifts to a linked thumbnail screen 605 for the memory card 6 and the DVC 3, as shown in FIGS. 19 and 20.

The linked thumbnail screen 605 for the memory card 6 and the DVC 3 displays linked thumbnails if the DVC 3 and the memory card 6 are temporally associated with each other. In this case, the screen displays linked thumbnail images of those images from the DVC 3 and from the memory card 6 which are mutually temporally associated based on the photographing dates and times thereof recorded in the memory section 402 of the DVC 3 and in the memory card 6.

In this linked thumbnail screen, number-displaying icons located below an image mark (at a left upper location of the screen) are image scene icons for the DVC 3 showing continuously photographed scenes and photographing times thereof. "black triangle" marks located below the image scene icons for the DVC 3 indicate that images photographed by the digital camera at the times corresponding to these image scenes are present in the memory card 6.

A display located below a camera mark at a right upper location of the screen shows thumbnail images from the memory card 6 such that they are temporally associated with the scenes from the image. The absence of thumbnail images on the right side of the image scene icon for the DVC 3 indicates that no image was photographed by the digital camera 5 while the corresponding scene was being photographed. In contrast, the absence of the image scene icon on the left of thumbnail images indicates that no image was photographed when the digital camera 5 was used to photograph the images.

Figure 21:
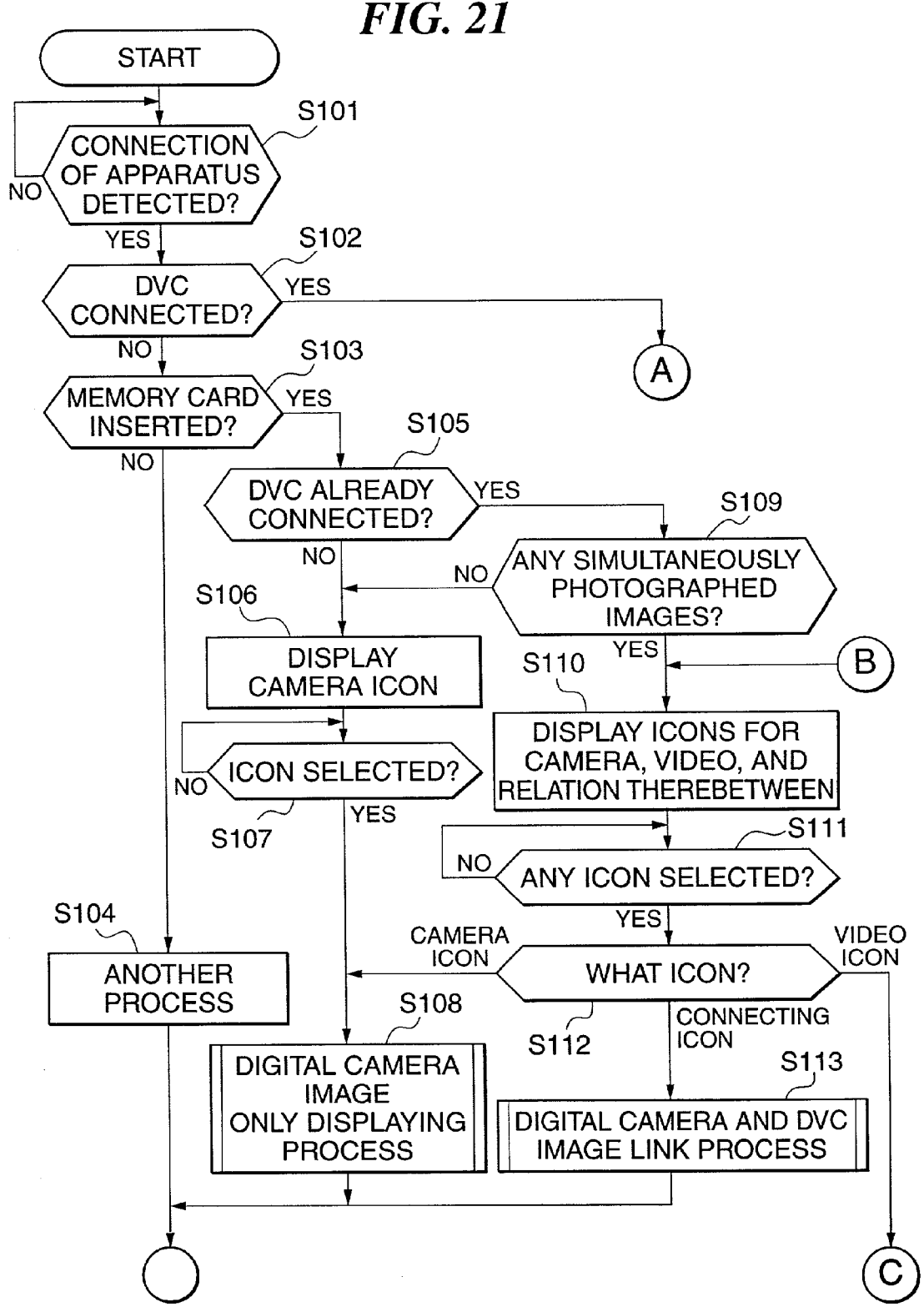
FIG. 21 is a flow chart showing an operation procedure of the TV apparatus in FIG. 1.
Figure 22:
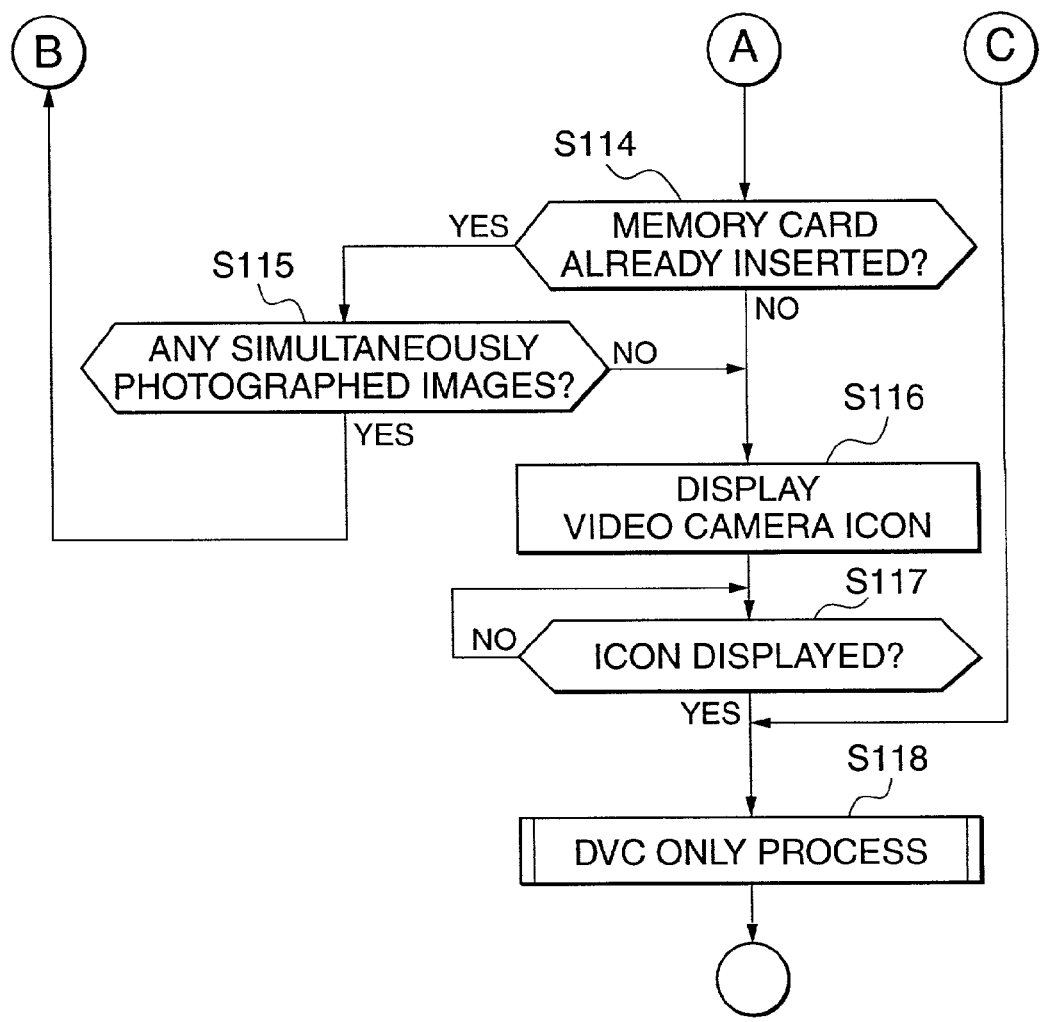
FIG. 22 is a continued part of the flow chart showing the operation procedure of the TV apparatus in FIG. 1.
Figure 23:
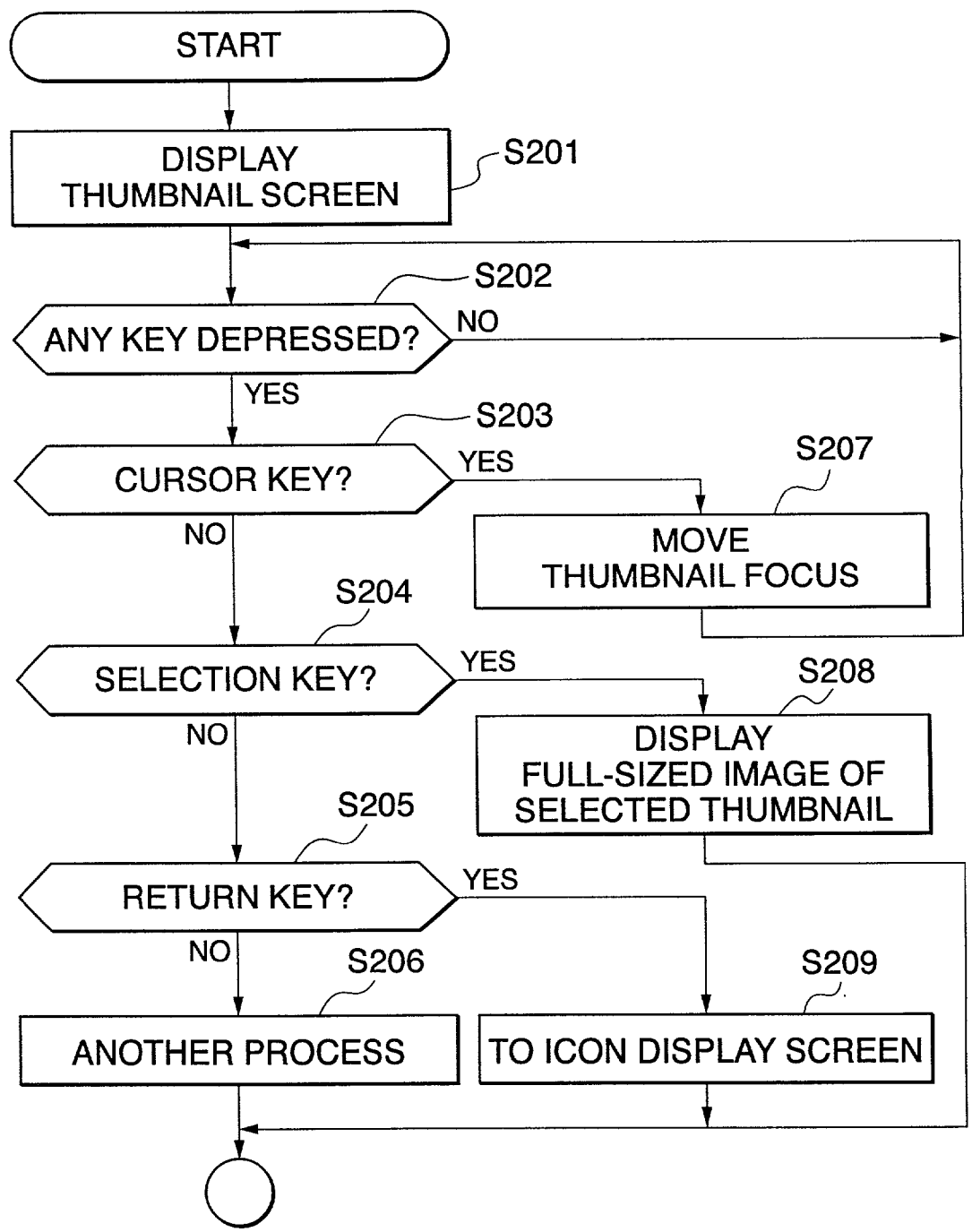
FIG. 23 is a flow chart showing an operation procedure for displaying only an image from the memory card from the digital camera on the TV apparatus in FIG. 1.
Figure 24:
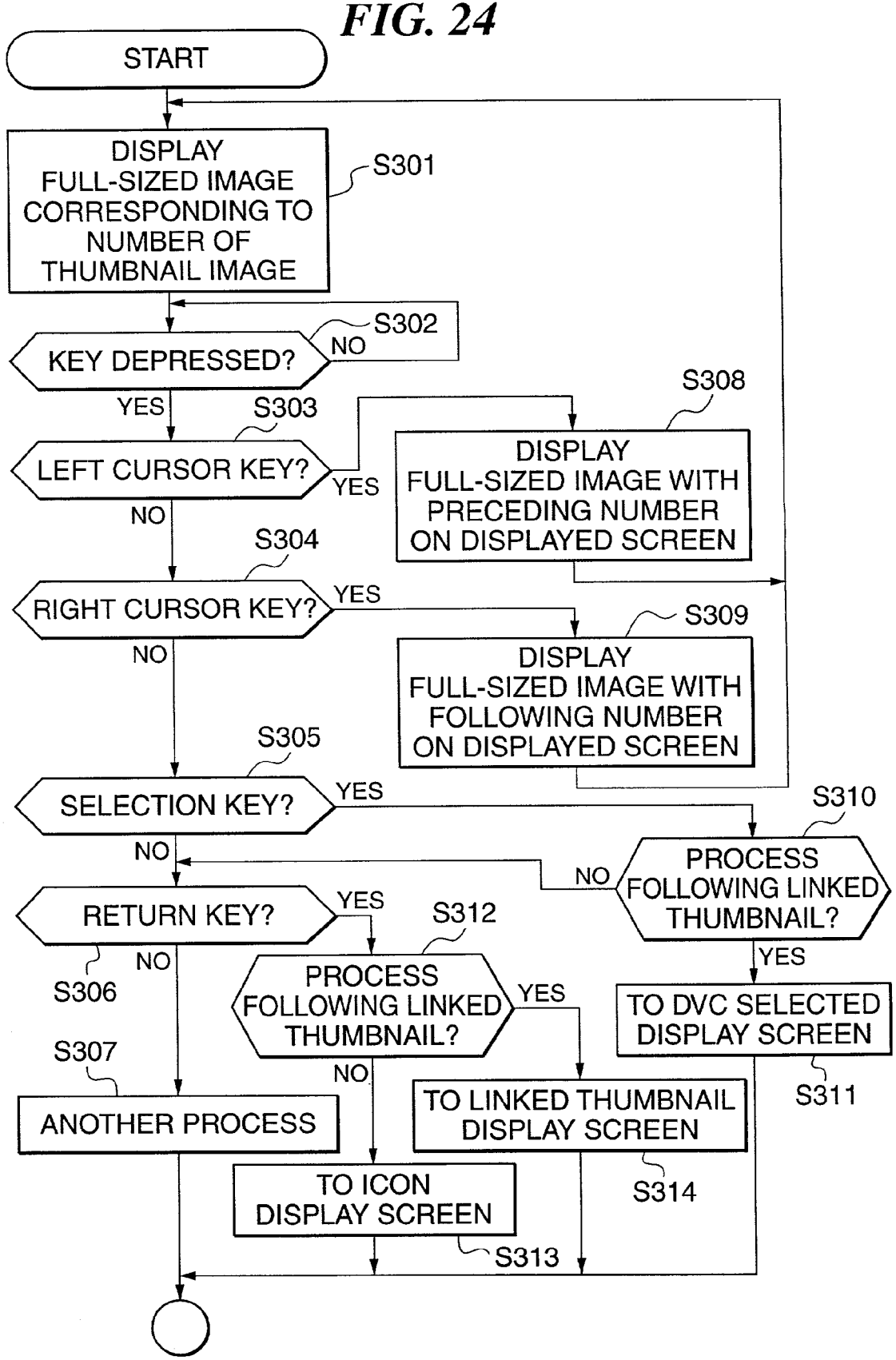
FIG. 24 is a flow chart showing an operation procedure procedure for displaying a full-size image from the memory card from the digital camera on the TV apparatus in FIG. 1.
Figure 25:
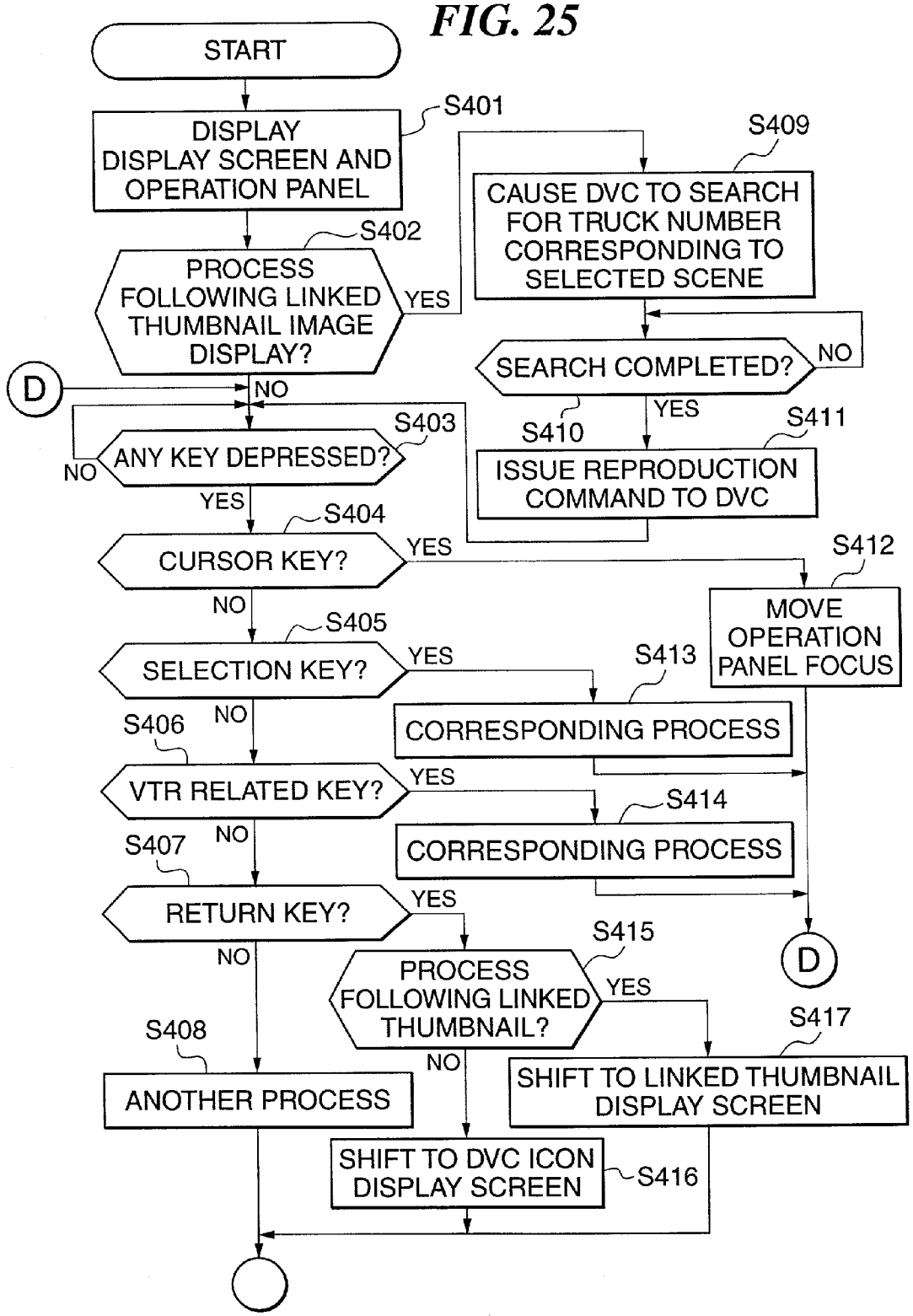
FIG. 25 is a flow chart showing an operation for displaying only an image from the DVC on the TV apparatus in FIG. 1.
Figure 26:
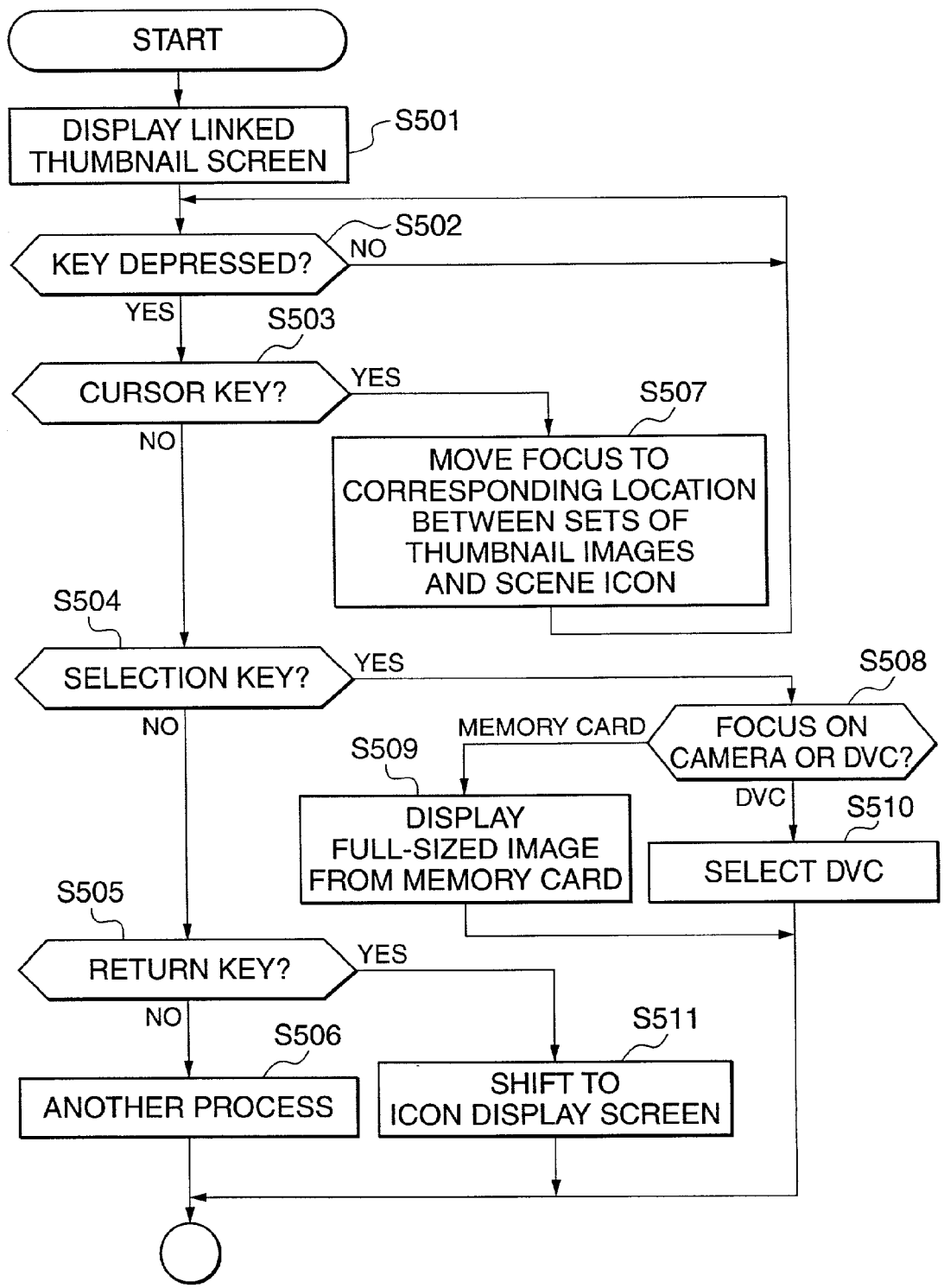
FIG. 26 is a flow chart showing an operation procedure for displaying images from the memory card and from the DVC on the TV apparatus in FIG. 1 in such a manner that these images are linked with each other.

Next, the operation of this image display system will be described with reference to FIGS. 21 to 26. FIGS. 21 and 22 are flow charts showing an operation procedure of the TV apparatus in FIG. 1. FIG. 23 is a flow chart showing an operation procedure for displaying only an image from the memory card from the digital camera on the TV apparatus in FIG. 1. FIG. 24 is a flow chart showing an operation procedure for displaying a full-size image from the memory card from the digital camera on the TV apparatus in FIG. 1. FIG. 25 is a flow chart showing an operation procedure for displaying only an image from the DVC on the TV apparatus in FIG. 1. FIG. 26 is a flow chart showing an operation procedure for displaying images from the memory card and from the DVC on the TV apparatus in FIG. 1 in such a manner that they are linked with each other. The operations shown in these figures are executed by the control section 190 of the TV apparatus 1.

If the TV viewer wishes to view images photographed by the DVC 3 and by the digital camera 5 on the TV apparatus 1, he connects the DVC 3 to the 1394 I/F section 130 and the memory card 6 to the memory card I/F section 130.

As shown in FIG. 21, first, at a step S101, the TV apparatus 1 first monitors whether or not any external device is connected thereto. Here, when a certain external device is already connected to the TV apparatus, the TV apparatus monitors whether or not one or more other external devices are connected thereto. If the TV apparatus detects that an external device is connected thereto, the process proceeds to a step S102, where the TV apparatus determines whether or not the connected external device is the DVC 3. On the other hand, if the connected external device is not the DVC 3, the process proceeds to a step S103, where the TV apparatus 1 determines whether or not the connected external device is the memory card 6 from the digital camera 5. If the connected external device is not the memory card 6, the process proceeds to a step S104, where the TV apparatus 1 executes another process corresponding to the connected external device (which is different from DVC 3 and the memory card 6).

At a step S102, if it is determined that the connected external device is the DVC 3, the process proceeds to a step S114 to determine whether or not the memory card 6 has already been connected to the TV apparatus 1. If the memory card 6 has not been connected to the TV apparatus 1 yet, then it is determined that only the DVC 3 is connected to the TV apparatus 1, and the process proceeds to a step S116 to display the digital video camera icon (see FIG. 15). Then, at a step S117, the process waits for the viewer to select the digital video camera icon. When this icon is selected using the external-device key 254 and selection key 258 of the remote control device 2, the process proceeds to a step S118 to execute a process of displaying only an image from the DVC 3. The details of this process will be described later.

At the above step S114, if it is determined that the memory card 6 has already been connected to the TV apparatus 1, then the process proceeds to a step S115 to determine whether or not the DVC 3 and the memory card 6 contain any images photographed at the same time. More specifically, recording start and end dates and times in the memory card 6 from the video camera 5 are compared with photographing dates and times in the image files are compared with each other to determine whether or not the digital camera 5 photographed any images during the recording time of the DVC 3. If the DVC 3 and the memory card 6 do not contain any images photographed at the same time, the process proceeds to the step S116, followed by executing a process similar to one executed if only the DVC 3 is connected to the TV apparatus 1.

If the DVC 3 and the memory card 6 contain images photographed at the same time, the process proceeds to a step S110, shown in FIG. 21, to display the two icons for the digital camera and digital video camera and the "tied string icon" indicating that the two icons for the digital camera and digital video camera are associated with each other. Then, at a step S111, the process waits for the viewer to select any icon. When a desired icon is selected using the external-device key 254 and selection key 258 of the remote control device 2, the selected icon is identified at the next step S112. If the digital camera icon has been selected, the process proceeds to a step S108 to execute a process of displaying only an image from the digital camera 5. The details of this process will be described later. If the digital video icon is selected, the process proceeds to the step S118 to execute the process of displaying only an image from the DVC 3. If the connecting icon is selected, the process proceeds to a step S113 to execute a process of displaying images from the memory card and from the DVC in such a manner they are linked with each other. The details of this process will be described later.

At the above step S103, if the connected external device is determined to be the memory card 6 from the digital camera 5, then the process proceeds to a step S105 to determine whether or nor the DVC 3 has already been connected to the TV apparatus 1. If the DVC 3 has not been connected to the TV apparatus 1 yet, then it is determined that only the memory card 6 is connected to the TV apparatus 1, and the process proceeds to a step S106 to display the digital camera icon (see FIG. 10). Then, at a step S107, the process waits for the viewer to select the digital camera icon. When this icon is selected using the external-device key 254 and selection key 258 of the remote control device 2, the process proceeds to the step S108 to execute the process of displaying only an image from the memory card 6.

At the above step S105, if it is determined that the DVC 3 has already been connected to the TV apparatus 1, then the process proceeds to a step S109 to determine whether or not the DVC 3 and the memory card 6 contain any images photographed at the same time. More specifically, recording start and end dates and times in the memory card 6 from the video camera 5 are compared with photographing dates and times in the image files to determine whether or not the memory card 6 contains any images photographed by the digital camera 5 during the recording time of the DVC 3. If the DVC 3 and the memory card 6 do not contain any images photographed at the same time, the process proceeds to a step S106, followed by executing a process similar to one executed if only the memory card 6 is connected to the TV apparatus 1.

If the DVC 3 and the memory card 6 contain images photographed at the same time, the process proceeds to the step S110, shown in FIG. 21, to display the two icons for the digital camera and digital video camera and the "tied string icon" indicating that the two icons for the digital camera and digital video camera are associated with each other. Then, at the step S111, the process waits for the viewer to select any icon, and then identifies the selected icon at the next step S112. If the digital camera icon has been selected, the process proceeds to the step S108 to execute the process of displaying only an image from the memory card 6. If the digital video icon is selected, then at the step S118, the process executes the process of displaying only an image from the DVC 3. If the connecting icon is selected, then at the step S113, the process executes the process of displaying images from the memory card and from the DVC in such a manner they are linked with each other.

Next, the process of displaying only an image from the digital camera 5 at the above step S108 will be described in detail with reference to FIG. 23.

In this process, first, at a step S201, a list of thumbnail images of the images contained in the memory card 6 is displayed, as shown in FIG. 23. In the list of the thumbnail images, a thumbnail image No. 1 is focused on. Then, at a step S202, the process waits for the viewer to depress any key of the remote control device 2. When any key is depressed, the process proceeds to a step S203.

At the step S203, it is determined whether or not the depressed key is any of the up, down, right, and left cursor keys 257. If any of the up, down, right, and left cursor keys 257 has been depressed, the process proceeds to a step S207 to move the focus on the thumbnail image upward, downward, rightward, or leftward depending on the depressed cursor key 257. Then, the process returns to the above step S202.

If the up, down, right, and left key 257 has not been depressed at the step S203, the process proceeds to a step S204 to determine whether or not the selection key 256 has been depressed. If this key has been depressed, the process proceeds to a step S208 to display a full-size image of the focused-on thumbnail image number.

If the selection key 256 has not been depressed at the step S204, the process proceeds to a step S205 to determine whether or not the return key 259 has been depressed. If this key has been depressed, the process proceeds to a step S209 to return to the camera icon display screen.

If the return key 259 has not been depressed at the step S205, then it is determined that another key has been depressed. The process then proceeds to a step S206 to shift to a process corresponding to this key.

Then, the process of displaying a full-size image of the selected thumbnail image at the above step S208 will be described with reference to FIG. 24.

In this process, as shown in FIG. 24, first, at a step S301, a full-sized image corresponding to the thumbnail image with the number focused on and selected in the thumbnail image display is displayed, and at the next step S302, the process waits for the viewer to depress any key of the remote control device 2. When any key is depressed, the process proceeds to a step S303.

At the step S303, it is determined whether or not the depressed key is the left cursor key 257. If this key has been depressed, the process proceeds to a step S308 to display a full-sized image corresponding to the thumbnail image with the number preceding the presently displayed number. Then, the process returns to the above step S301. If the left cursor key 257 has not been depressed, the process proceeds to a step S304 to determine whether or not the right cursor key 257 has been depressed. If this key has been depressed, the process proceeds to a step S309 to display a full-sized image corresponding to the thumbnail image with the number following the presently displayed number. Then, the process returns to the above step S301.

If the right cursor key 257 has not been depressed, the process proceeds to a step S305 to determine whether or not the selection cursor key 256 has been depressed. If this key has been depressed, the process proceeds to a step S310 to determine whether or not the present full-sized image display has followed a linked thumbnail image display. If the present full-sized image display has followed a linked thumbnail image display, the process proceeds to a step S311 to shift to a screen that displays only an image from the DVC 3. In contrast, if the present full-sized image display has not followed a linked thumbnail image display, then it is determined that the present full-sized image display has followed a display of only thumbnail images from the memory card 6. Then, the process proceeds to a step S306 without executing any process. Further, if it is determined at the step S305 that the selection key 256 has not been depressed, the process proceeds to the step S306.

At the step S306, it is determined whether or not the return key 259 has been depressed. If this key has been depressed, the process proceeds to a step S312 to determine whether or not the present full-sized image display has followed a linked thumbnail image display. If the present full-sized image display has followed a linked thumbnail image display, the process proceeds to a step S314 to return to the linked thumbnail image display screen. In contrast, if the present full-sized image display has not followed a linked thumbnail image display, then it is determined that the present full-sized image display has followed a display of only thumbnail images from the memory card 6. Then, the process proceeds to a step S313 to return to the icon display screen for the memory card 6. Further, if it is determined at the step S306 that the return key 259 has not been depressed, the process proceeds to a step S307 to determine that another key has been depressed. The process proceeds to the step S206 to shift to a process corresponding to this key.

Then, the process of displaying only an image from the DVC 3 at the above step 118 will be described with reference to FIG. 25.

In this process, as shown in FIG. 25, first, at a step S401, a display screen and an operation panel for operation of the DVC 3 are displayed. At this time, the focus is on the reproduction button on the operation panel. Then, the process proceeds to a step S402 to determine whether or not this operation has followed a linked thumbnail image display. If this operation has followed a linked thumbnail image display, the process proceeds to a step S409, a recording start truck number corresponding to a scene photographed by the DVC 3, that is focused on and selected on the linked thumbnail image display screen, is searched from the memory section 402 of the video cassette 4. The TV apparatus 1 issues a truck number search command to the DVC 3 to move to this truck number.

Then, the process proceeds to a step S410 to wait for the truck number search to be completed. Once the truck number search is completed, the process proceeds to a step S411, where the TV apparatus 1 issues a reproduction command to the DVC 3 to start reproduction of the selected scene. Then, the process proceeds to a step S403. On the other hand, if it is determined at the above step S402 that the above operation has not followed a linked thumbnail image display, then it is determined that the operation has followed a display of only thumbnail images from the memory card 6. The process then proceeds to the step S403.

At the step S403, the process waits for the viewer to depress any key. When any key is depressed, the process proceeds to a step S404.

At the step S404, it is determined whether or not any of the up, down, right, and left cursor keys 257 has been depressed. If any of the up, down, right, and left cursor keys 257 has been depressed, the process proceeds to a step S412 to move the focus on the operation button on the operation panel upward, downward, rightward, or leftward depending upon the depressed cursor key 257.

At the step S404, if none of the up, down, right, and left keys 257 have been depressed, the process proceeds to a step S405 to determine whether or not the selection key 256 has been depressed. If this key has been depressed, the process proceeds to a step S413 to execute a DVC operation (reproduction, rewind, fast feeding, or pause) corresponding to the focused-on operation button. Then, the process returns to the above step S403.

At the step S405, if the selection key 256 has not been depressed, the process proceeds to a step S406 to determine whether or not any of the VTR-related keys (261 to 266) has been depressed. If any of these keys (261 to 266) has been depressed, the process proceeds to a step S414 to execute a DVC operation (reproduction, rewind, fast feeding, or pause) corresponding to the depressed key. Then, the process returns to the above step S403.

At the step S406, if none of the VTR-related keys have been depressed, then the process proceeds to a step S407 to determine whether or not the return key 259 has been depressed. If this key has been depressed, the process proceeds to a step S415 to determine whether or not the present DVC selected image display has followed a linked thumbnail image display. If the present DVC selected image display has followed a linked thumbnail image display, the process proceeds to a step S417 to return to the linked thumbnail image display screen. In contrast, if the present DVC selected image display has not followed a linked thumbnail image display, then it is determined that the present DVC selected image display has followed a display of digital video camera icon display screen. Then, the process proceeds to a step S416 to return to the digital video camera icon display screen. Further, if it is determined at the step S407 that the return key 259 has not been depressed, the process proceeds to a step S408 to determine that another key has been depressed. The process then shifts to a process corresponding to this key.

Then, the process of displaying images from the DVC 3 and from the memory card 6 in such a manner that they are linked with each other will be described with reference to FIG. 26.

This process is started by selecting the connecting icon for the digital camera and digital video camera (FIG. 18). In this process, as shown in FIG. 26, first, at a step S501, linked thumbnail images are displayed. At this time, the focus is on the first DVC scene. Then, at a step S502, the process waits for the viewer to depress any key. When any key is depressed, the process proceeds to a step S503 to determine whether or not any of the up, down, right, and left cursor keys 257 has been depressed. If any of the up, down, right, and left cursor keys 257 has been depressed, the process proceeds to a step S507 to move the focus to a corresponding location between thumnail images from the memory card 6 and DVC scene icons depending on the depressed cursor key 257. The process then returns to the above step S502.

At the above step S503, if it is determined that none of the cursor keys 257 have been depressed, then the process proceeds to a step S504 to determine whether or not the selection key 258 has been depressed. If this key has been depressed, the process proceeds to a step S508, where it is determined whether or not the focus location is on a thumbnail image from the memory card 6 or a DVC scene icon. If the focus location is on a thumbnail image from the memory card 6, the process proceeds to a step S509. At the step S509, a full-sized image corresponding to the thumbnail image at the focus location is displayed. In contrast, if the focus location is on a DVC scene icon, the process proceeds to a step S510 to shift to a display of a screen for selection of images from the DVC 3.

At the above step S504, if the selection key 258 has not been depressed, the process proceeds to a step S505 to determine whether or not the return key 259 has been depressed. If the return key 259 has been depressed, the process proceeds to a step S511 to shift to a linked thumbnail image display screen. In contrast, if it is determined that the return key 259 has not been depressed, then it is determined that another key has been depressed. Then, the process proceeds to a step S506 to execute a process corresponding to this key.

Thus, in the present embodiment, photographing dates and times from the digital camera as shown in FIG. 13 are compared with photographing information from the memory section 402 of the video cassette 4. If there are any images photographed at the same time, the linked thumbnail image display screen shown in FIG. 19 is displayed. Then, if, for example, the digital camera icon or the digital video camera icon is focused on and selected and the selection key 258 is then depressed, the process shifts to the process of displaying only an image from the memory card 6 as shown in FIG. 23 or the process of displaying only an image from the DVC 3 as shown in FIG. 25, thereby enabling thumbnail images to be displayed or the DVC 3 can be operated.

On the other hand, if the selection key 258 is depressed after focusing on the connecting icon in FIG. 18, the linked thumbnail image display screen shown in FIG. 19 is displayed. In this state, the focus is on a DVC scene icon at a left upper location of the screen, which is indicative of a recording time between 9:33 and 9:41. Then, when the selection key 258 is depressed, the process shifts to the process of displaying only an image from the DVC 3 as shown in FIG. 25. The control section 190 of the TV apparatus 1 issues a search command to the DVC 3 to move to a truck number corresponding to the above recording start time based on the information in the memory section 402 of the video cassette 4, shown in FIG. 7. Once the search is completed, the control section 190 issues a reproduction command. This reproduction command automatically changes the display to an image reproducing screen as shown in FIG. 16. Subsequently, the DVC 3 can be operated using the remote control device and the operation panel on the screen. Then, when the return key 259 is depressed, the display returns to the linked thumbnail image display screen in FIG. 19.

On this linked thumbnail image display screen, if the left cursor key 257 is consecutively depressed four times so that the focus is subsequently moved to the thumbnail image No. 4 from the memory card, and the selection key 258 is then depressed, the process shifts to the process of displaying a full-sized image as shown in FIG. 24. Accordingly, a full-sized image such as the one shown in FIG. 14 can be displayed. It is possible to view the preceding or following image by depressing the cursor key 257, to shift to the process of displaying only an image from the DVC 3 by pressing the selection key 258, and to return to the linked thumbnail image display screen in FIG. 19 by depressing the return key 259.

Thus, in the present embodiment, images recorded in the memory card 6 from the digital camera 5 and in the DVC 3 can be easily viewed so as to be associated with each other.

Second Embodiment

Figure 27:
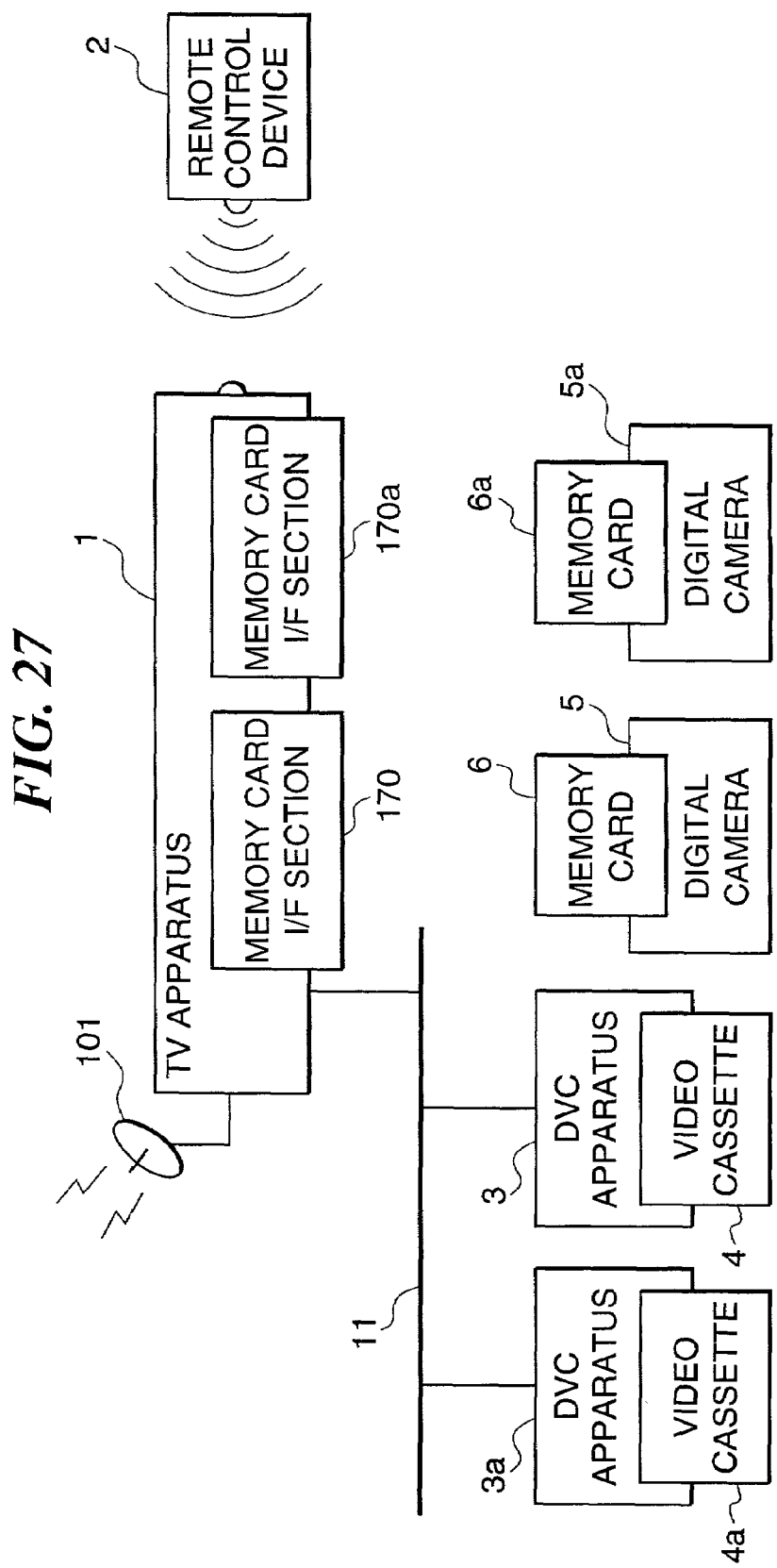
FIG. 27 is a block diagram showing the construction of an image display system according to a second embodiment of the present invention.
Figure 30:
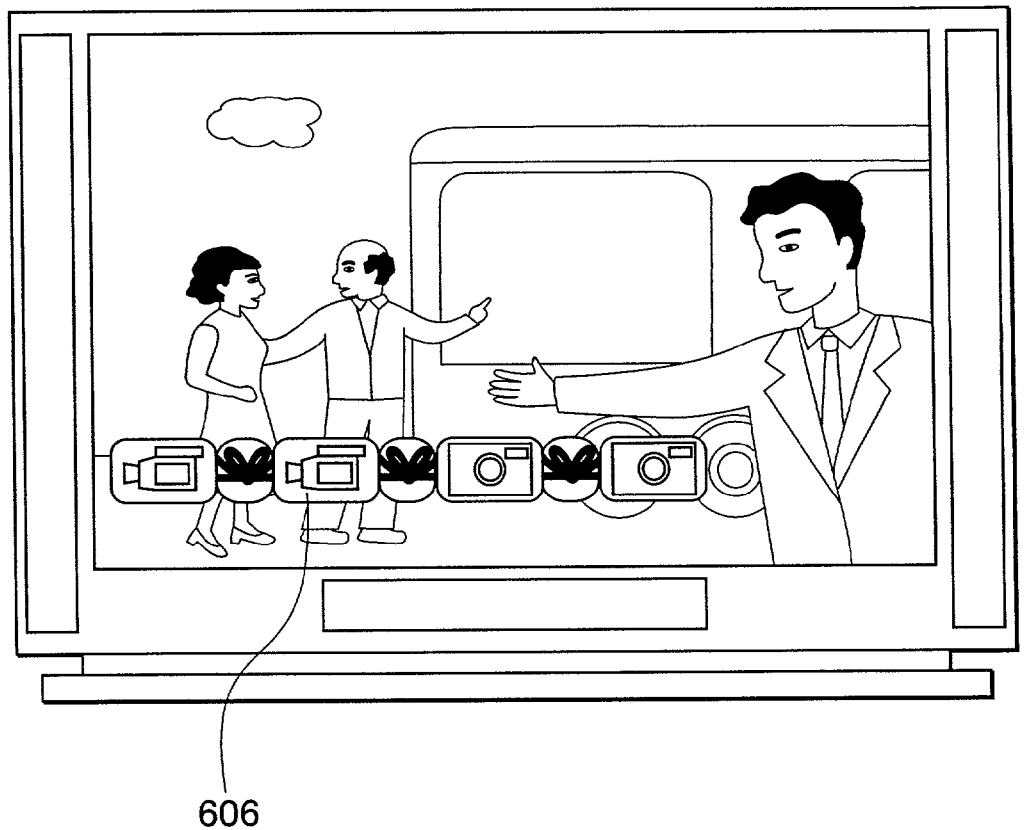
FIG. 30 is a view showing an example of a screen of the TV apparatus in FIG. 27 displayed when two memory cards and two DVCs are connected to the TV apparatus.
Figure 31:
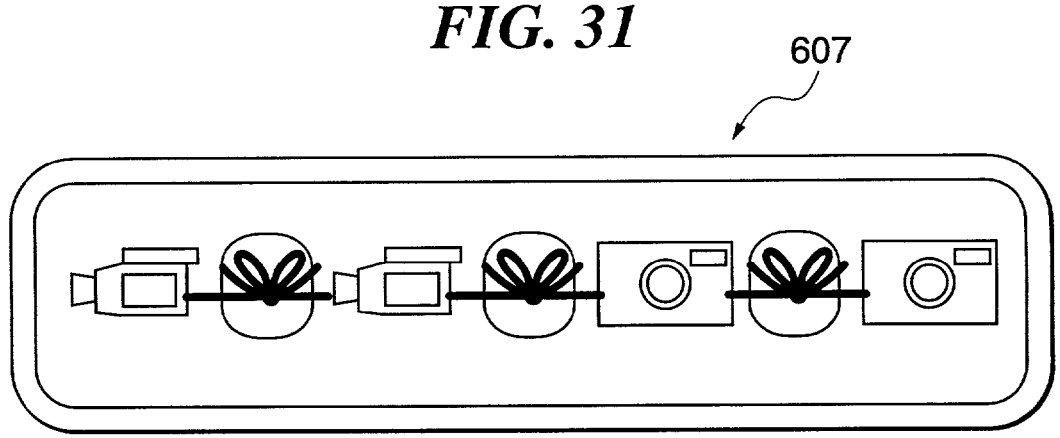
FIG. 31 is a view showing an icon focused on on the screen of the TV apparatus in FIG. 27 and including a digital camera and a digital video camera.
Figure 32:
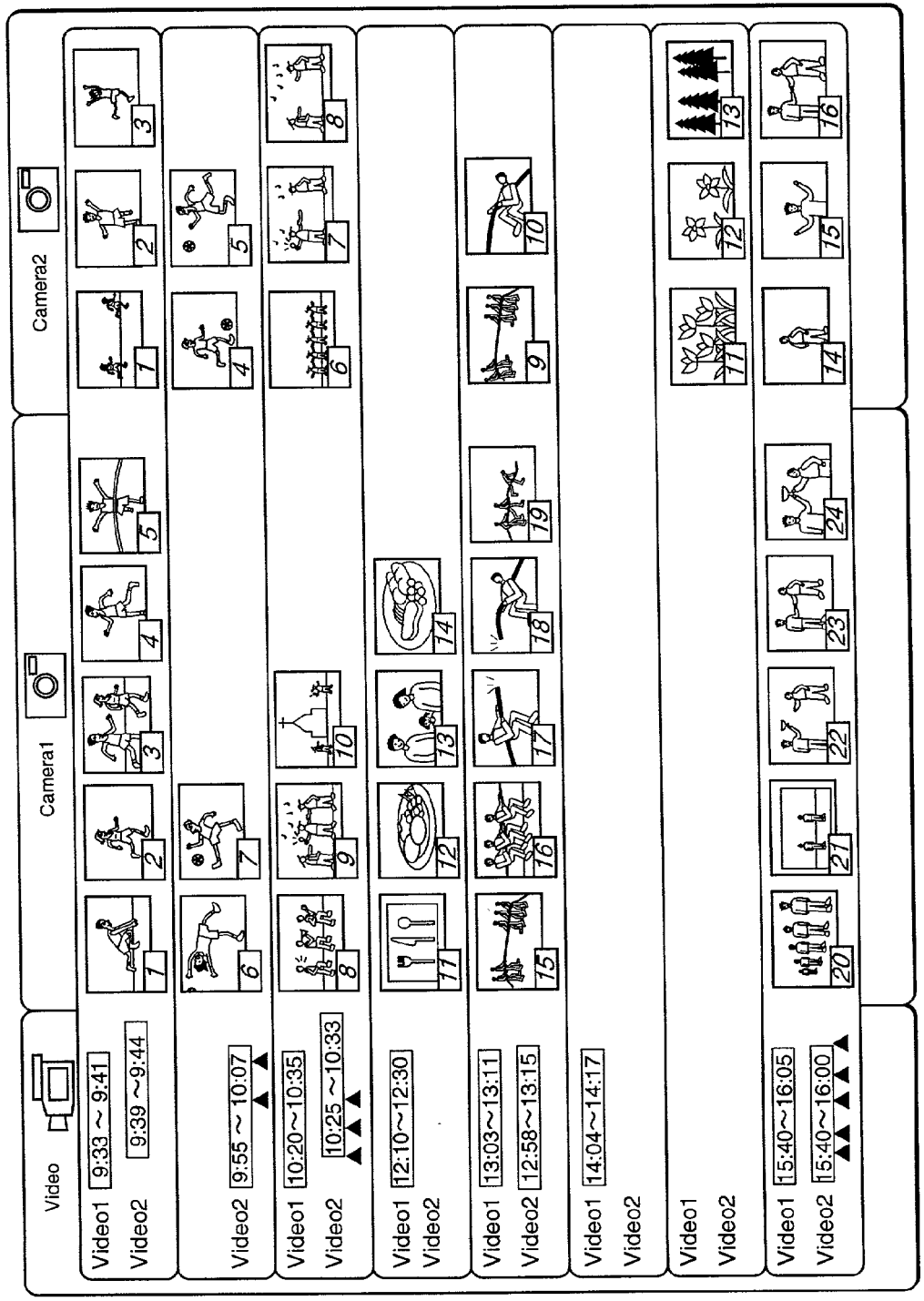
FIG. 32 is a view showing an example of a linked thumbnail image display screen displayed on the TV apparatus in FIG. 27.

Next, a second embodiment of the present invention will be described with reference to FIGS. 27 to 32. FIG. 27 is a block diagram showing the construction of an image display system according to the second embodiment of the present invention. FIG. 28 is a view showing an example of information in a memory section provided in a video cassette of one of DVCs in FIG. 27. FIG. 29 is a view showing a list of the photographing dates and times of the images stored in one of memory cards in FIG. 27. FIG. 30 is a view showing an example of a screen of a TV apparatus in FIG. 27 which is displayed if two memory cards and two DVCs are connected to the TV apparatus. FIG. 31 is a view showing icons focused on on the screen of the TV apparatus in FIG. 27 and including ones for a digital camera and a digital video camera. FIG. 32 is a view showing an example of a linked thumbnail image display screen displayed on the TV apparatus in FIG. 27.

The present embodiment differs from the above described first embodiment in that the TV apparatus can connect to two memory cards and two DVCs.

Specifically, as shown in FIG. 27, this image display system is comprised of the TV apparatus 1 and the remote control device 2, and the TV apparatus 1 has two DVCs 3 and 3a connected thereto via the 1394 I/F section 130 (shown in FIG. 2) and two memory card I/F sections 170 and 170a in which memory cards 6 and 6a from digital cameras 5 and 5a can be installed.

In this case, as described above, photographing information such as truck numbers corresponding to recording starts and ends, index marks for a recording start and end and a pause, and dates and times is written to a memory section of a video cassette 4a of the DVC 3a, as shown in FIG. 28. In this example, the video cassette 4a has a total of five scenes recorded therein.

Further, the photographing dates and times of images photographed and recorded by the digital camera 5a are recorded in the memory card 6a of the digital camera 5a, as shown in FIG. 29.

In the present embodiment, when the two DVCs 3 and 3a and the two memory cards 6 and 6a are connected to the TV apparatus 1, the control section 190 detects temporal relevancy between images from the DVCs 3 and 3a and images from the memory cards 6 and 6a, as is the case with the first embodiment. If such temporal relevancy is detected, then as shown in FIG. 30, a group of icons 606 including two digital camera icons, two digital video camera icons, and "tied string icons" indicative of the presence of relevancy therebetween are displayed to allow the TV viewer to recognize the presence of temporal relevancy between images from the DVCs 3 and 3a and images from the memory cards 6 and 6a.

When the four simultaneously selected icons 607, shown in FIG. 31, are focused on using the external-device key 254 of the remote control device 2 and are then selected using the selection key 258, a linked thumbnail image display screen shown in FIG. 32 is displayed based on the date and time information in the video cassettes 4 and 4a and in the memory cards 6 and 6a. Then, images from the memory card 6 or 6a or the DVC 3 or 3a alone can be viewed.

In the above described embodiments, the TV apparatus 1 having the 1394 I/F section 130 and the DVC3 or 3a are connected together, by way of example. In this case, if the present invention is applied to a conventional analog video camera, the analog video camera may be controlled using a method of providing a dedicated control line, a method of superposing a control signal upon an image/audio signal line or a like method, so as to display images recorded in the analog vide camera and images recorded in the memory card in a manner being associated with each other.

Further, if an interface such as the IEEE 1394 interface is mounted in the digital camera, then by connecting the digital camera to the TV apparatus 1 via this interface for control, images recorded in the digital camera and images recorded in the video camera apparatus may be displayed in a manner being associated with each other, without the need to insert the memory card into the TV apparatus 1.

Further, in the above described embodiments, the video cassette 4 incorporating the memory section 402 is used to retrieve recorded contents from the DVC 3. However, if such a memory section is not provided, the recorded contents may also be searched by fast feeding the cassette tape to directly detect an index ID to thereby retrieve a recording start date and time and a truck number.

Furthermore, in the above described embodiments, the tape recording apparatus such as a DVC or VCM is used to record animated images, but a recording apparatus using a disk such as a hard disk or a DVD as a recording medium or an apparatus using a memory as a recording medium may also be used.

Moreover, in the above described embodiments, the DVC and memory card are directly connected to the TV apparatus, but they may be connected to another apparatus installed at another location, and transmission and reception of image data and operation of the DVC may be carried out via the modem 180.

Third Embodiment

Figure 33:
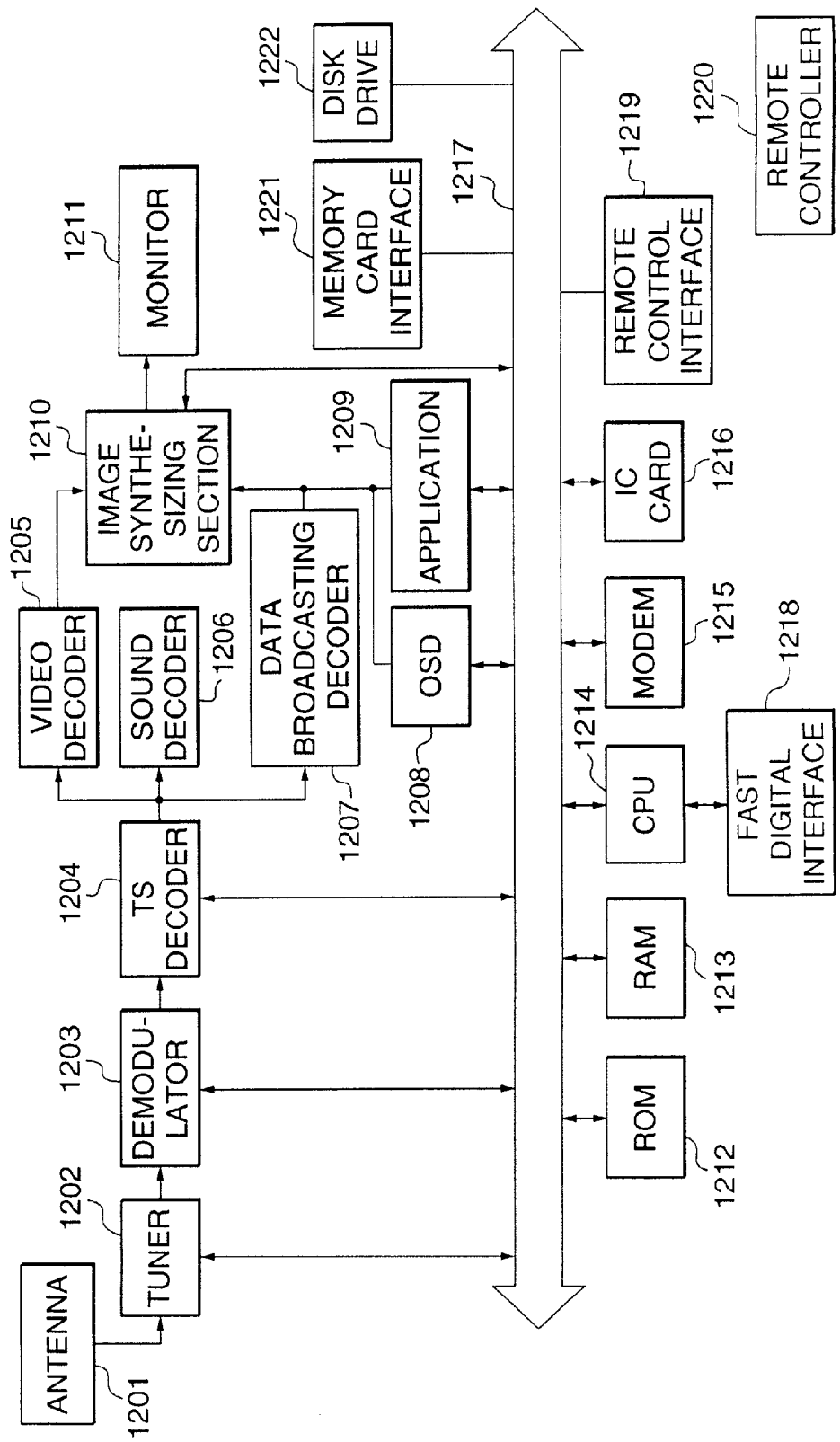
FIG. 33 is a block diagram showing the construction of a DTV according to a third embodiment of the present invention.

Next, a third embodiment of the present invention will be described with reference to FIGS. 33 to 42. FIG. 33 is a block diagram showing the construction of a DTV according to the third embodiment of the present invention.

As shown in FIG. 33, the DTV is comprised of a tuner device 1202 for tuning in to an electric wave received by an antenna 1201 that receives digital broadcasting electric waves, a demodulating circuit 1203 that demodulates the received electric wave into a signal, a TS decoder 1204 that separates a TS signal from the demodulated signal, a video decoder 1205 that decodes the obtained TS signal into images, a sound decoder 1206 that decodes the TS signal into sound, a data broadcasting decoder 1207 that decodes the TS signal into data broadcasting, an OSD circuit 1208 that displays information from various blocks of the DTV main body, an application 1209 for executing various processes, an image synthesizing section 1210 that synthesizes and outputs various pieces of internally created image information, and a monitor 1211 that displays images and various pieces of setting information.

The above-mentioned blocks are connected to a CPU 1214 via a bus 1217, and the CPU 1214 controls the entire apparatus and individually controls the above-mentioned blocks based on various control programs and data stored in a ROM 1212. Further, a RAM 1213 is used as a work area for the CPU 1214.

In addition to the above-mentioned blocks, further connected to the bus 1217 are a modem 1215, an IC card 1216, a remote control interface 1219, a memory card interface 1221, and a disk drive 1222. The modem 1215 is connected to a public telephone line to communicate with external devices via this line. The IC card 1216 is used to perform an authenticating operation for a limited receiving operation and to transmit and receive various pieces of information to and from external apparatuses. The remote control interface 1219 is used to transmit and receive information to and from a remote controller 1220. The memory card interface 1221 has a memory card slot in which is installed a memory card having images photographed by a digital camera or the like recorded therein, in order to read image data out from the memory card installed in the memory card slot. The disk drive 1222 is used to read information such as images recorded in a recording medium such as a video disk.

Further, the CPU 1214 has a fast digital interface 1218 connected thereto. The fast digital interface 1218 has external apparatuses such as a DVC (Digital Video Camera) connected thereto to transmit and receive image and other data to and from the apparatuses at high speed.

Figure 34:
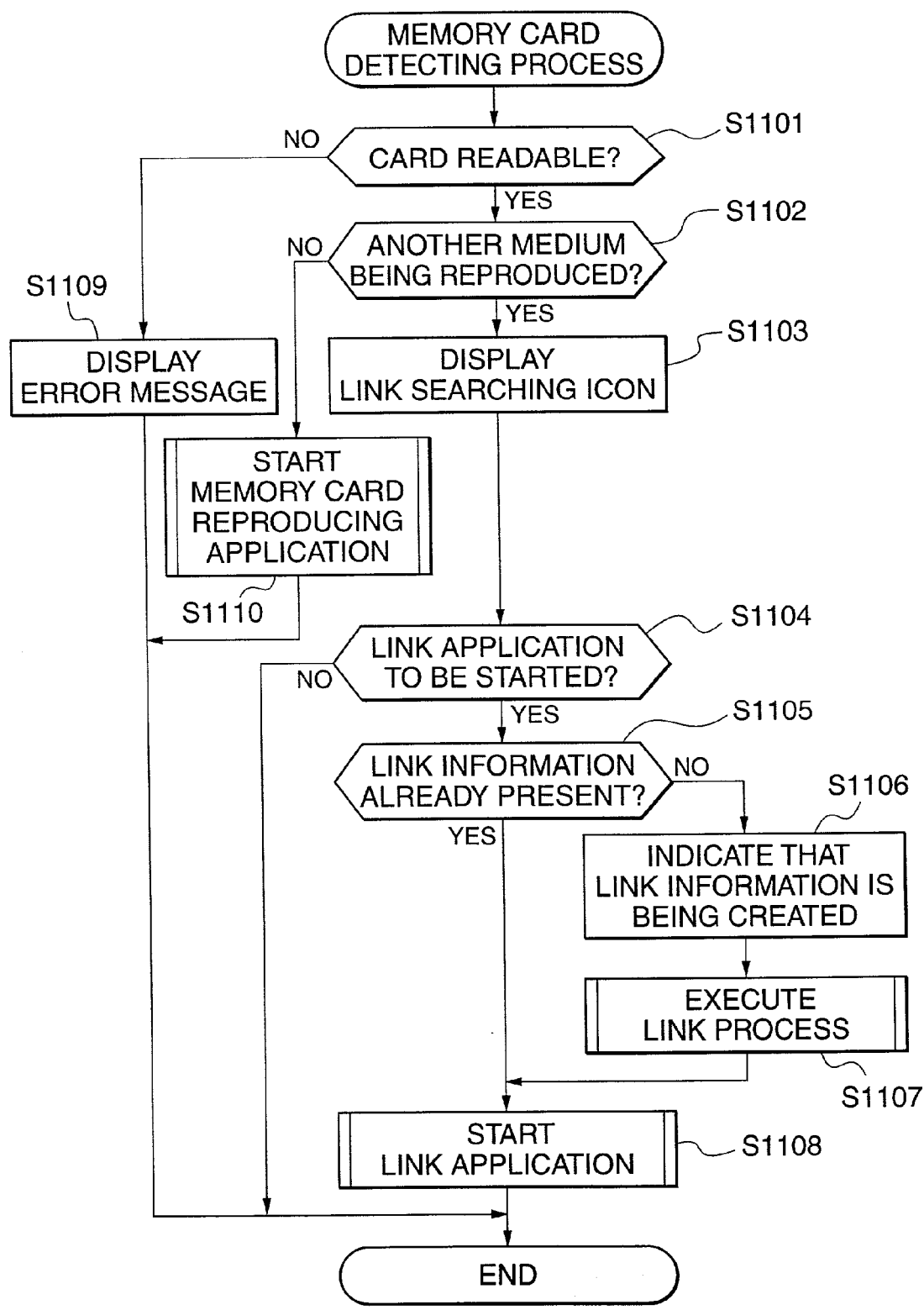
FIG. 34 is a flow chart showing the procedure of a process of detecting a memory card in the DTV in FIG. 33.
Figure 35:
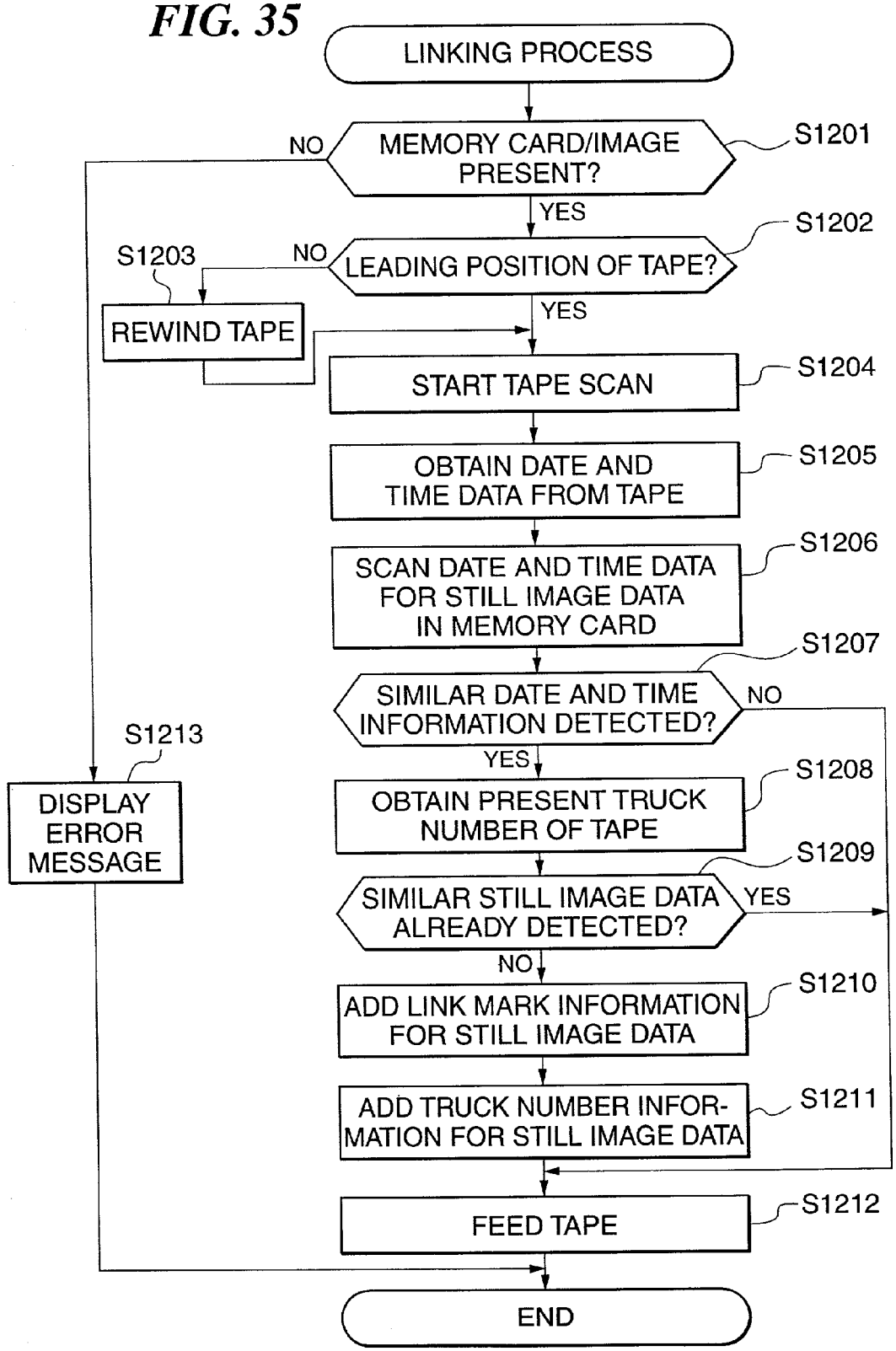
FIG. 35 is a flow chart showing the procedure of a linking process executed at a step S107, shown in FIG. 34.
Figure 36:
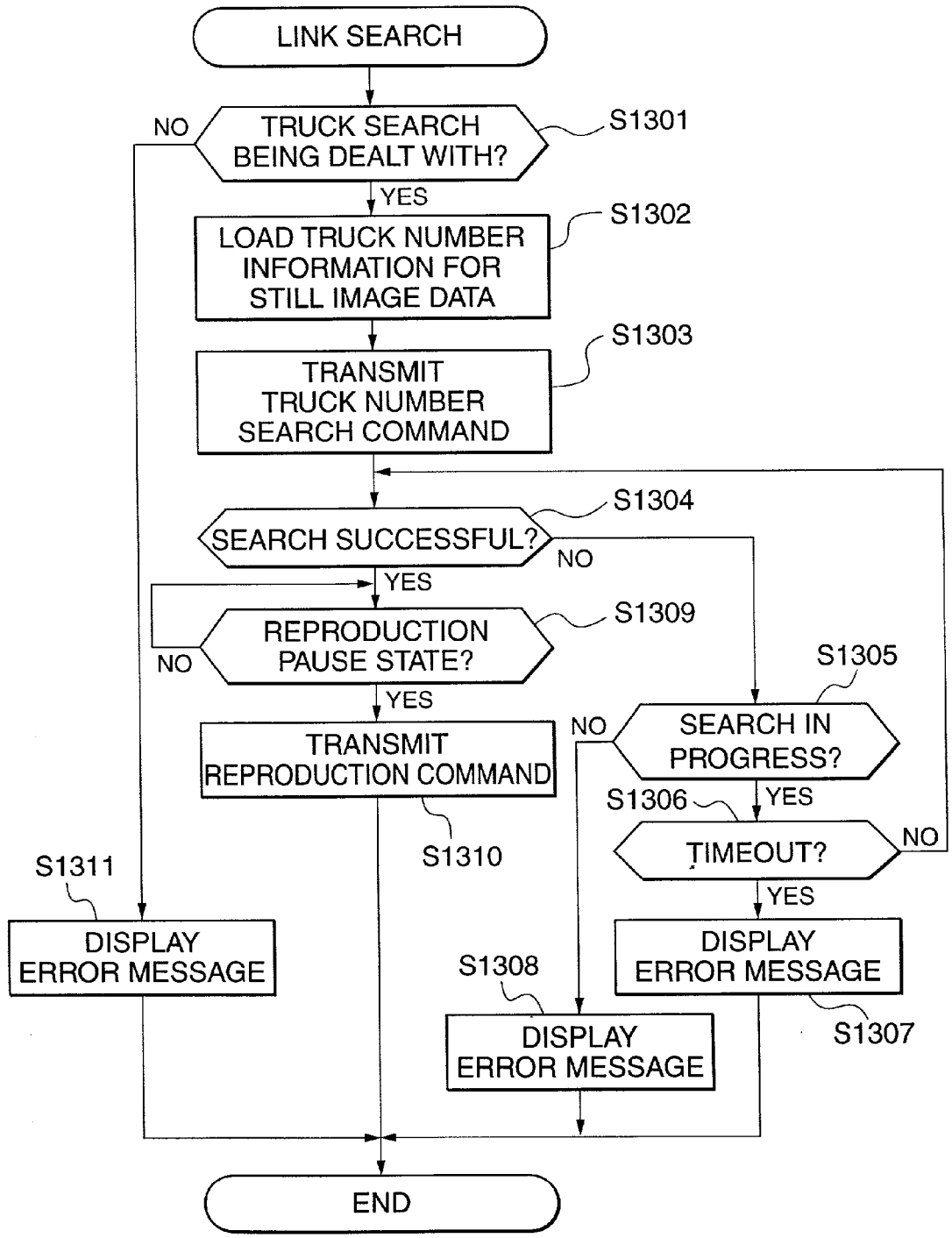
FIG. 36 is a flow chart showing the procedure of a link search executed in the DTV in FIG. 33.
Figure 37:
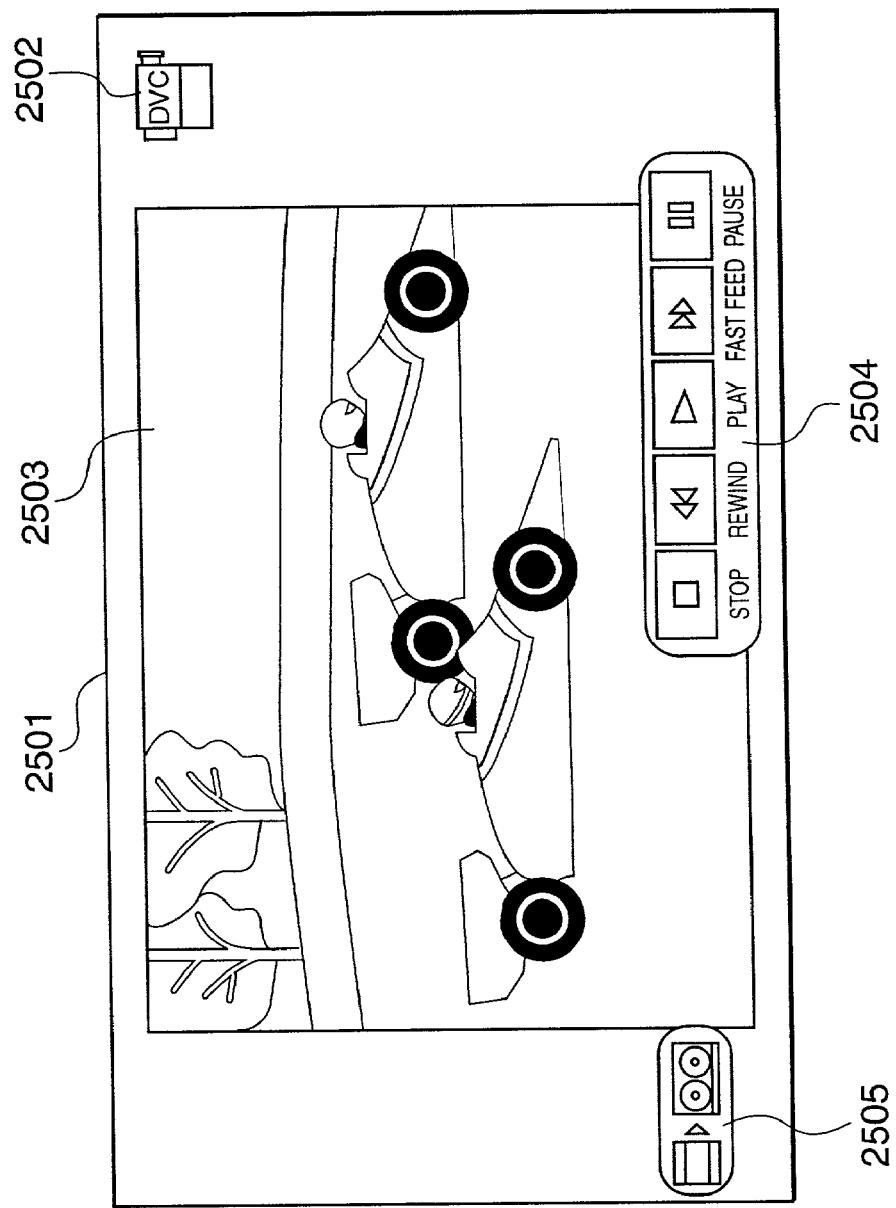
FIG. 37 is a view showing an example of a display screen displayed when a memory card is inserted into the DTV in FIG. 33.
Figure 38:
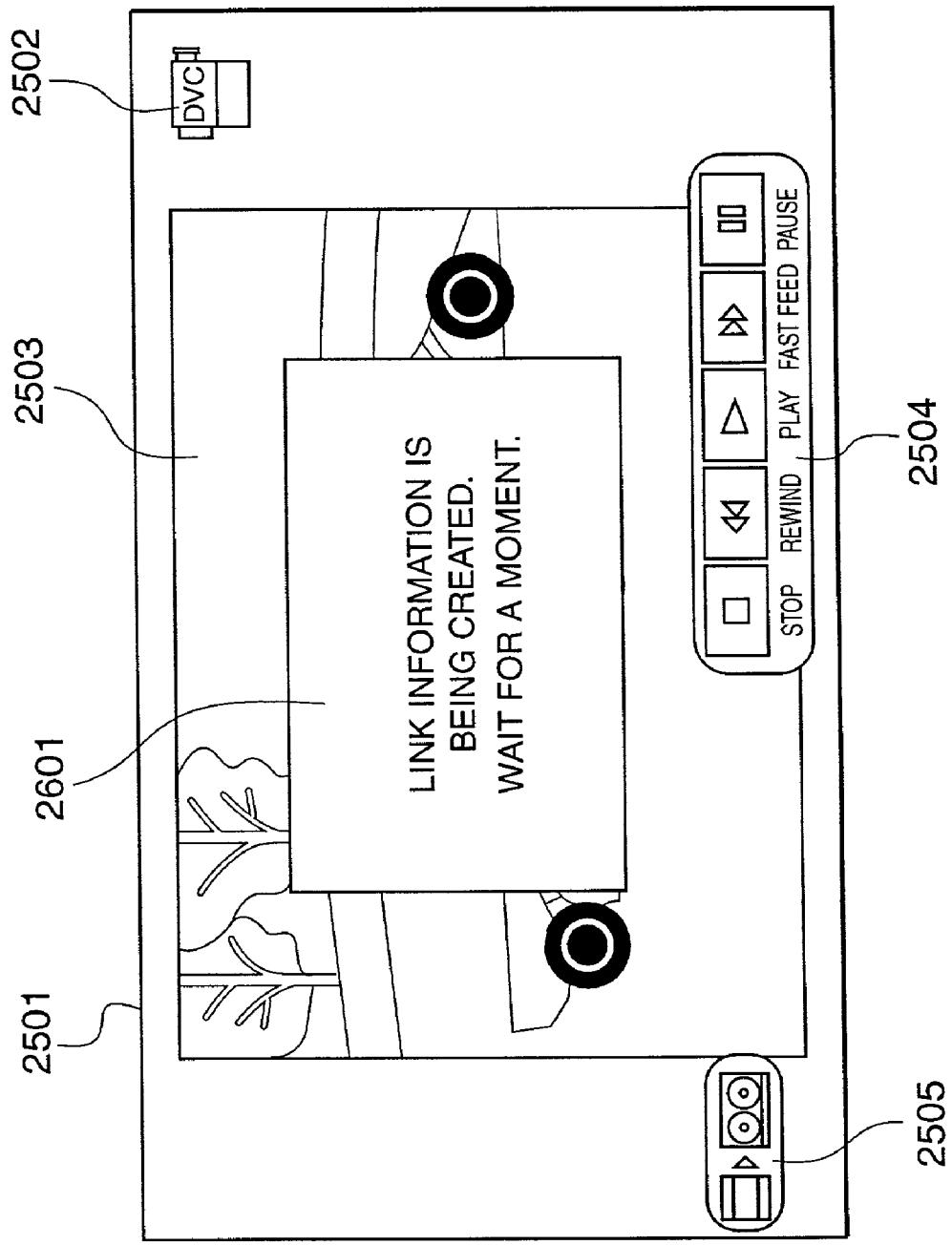
FIG. 38 is a view showing an example of a displayed message indicating that link information is being searched from the DTV in FIG. 33 and created.
Figure 39:
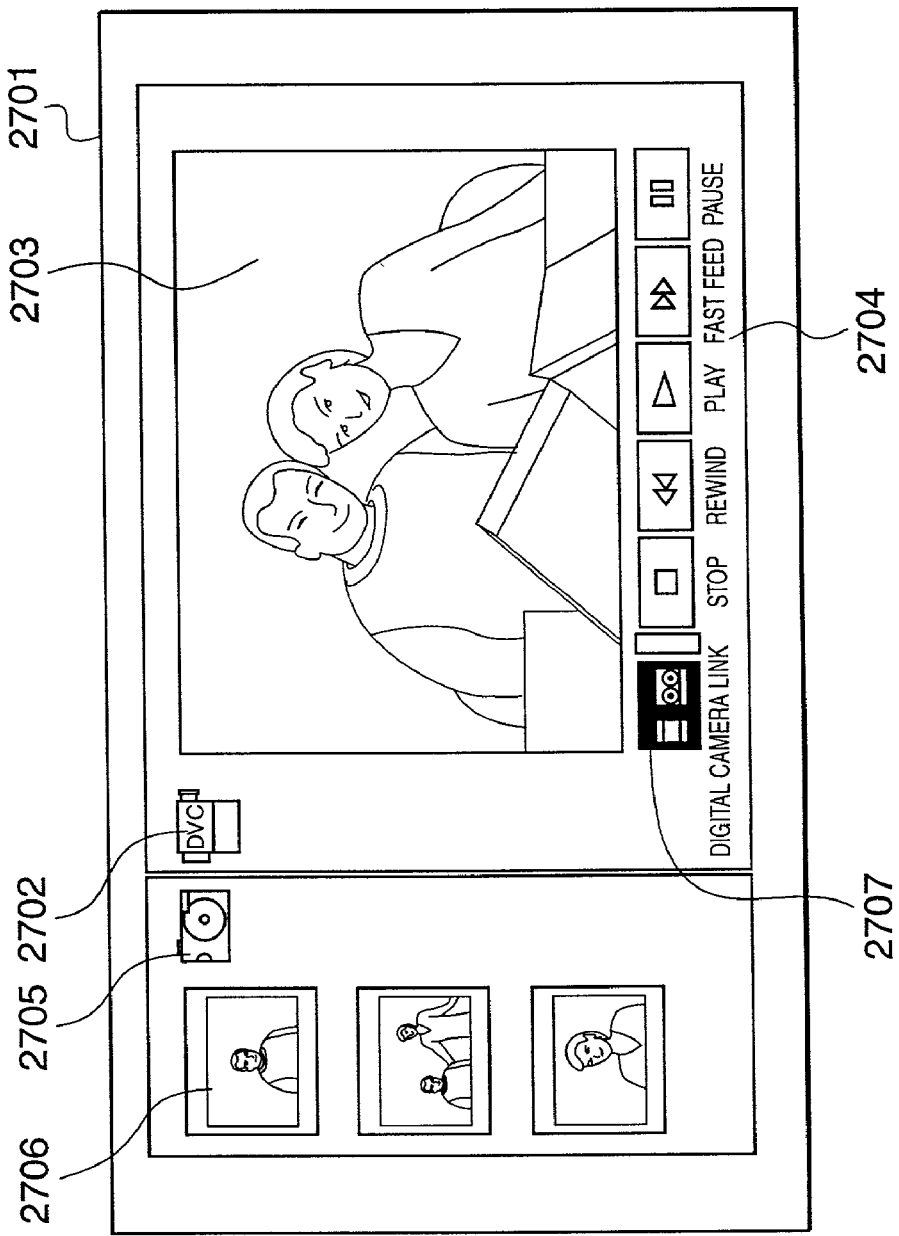
FIG. 39 is a view showing an example of a screen displayed when an image from a DVC is reproduced using a link application in the DTV in FIG. 33.
Figure 40:
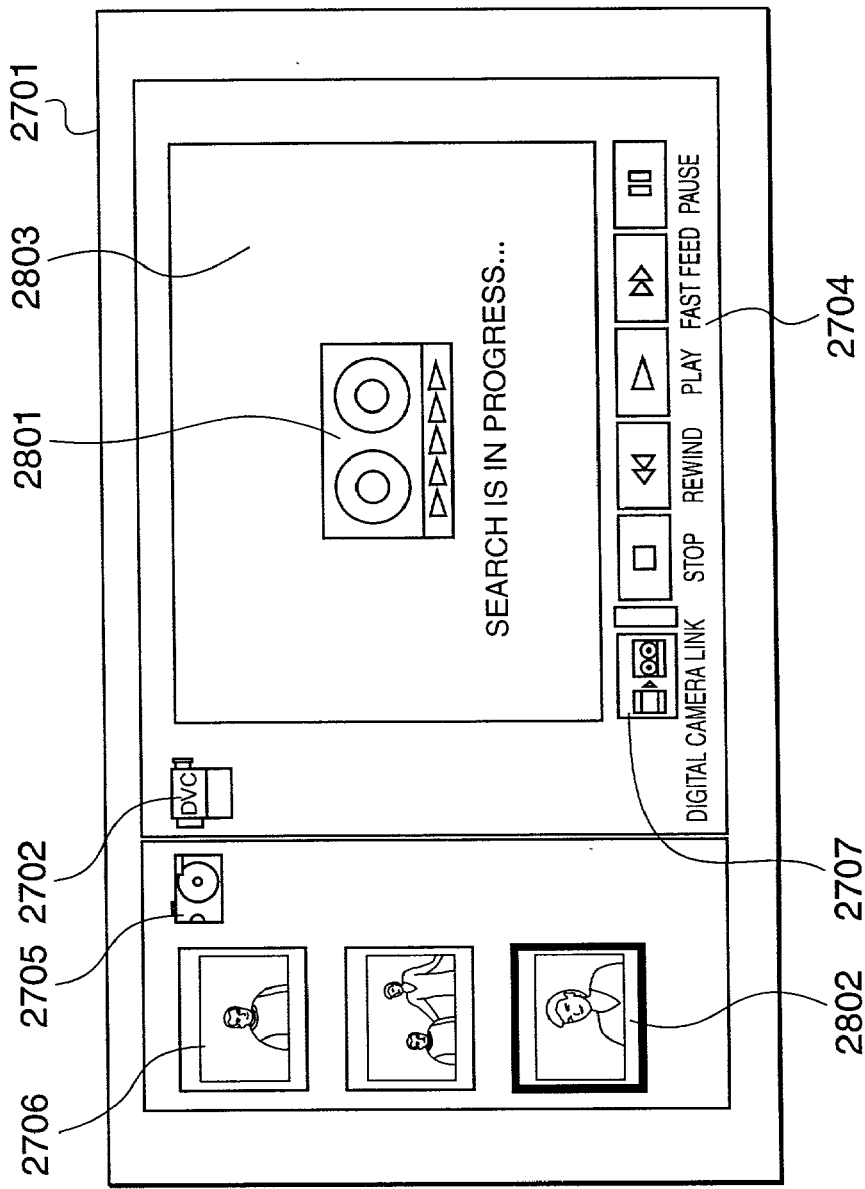
FIG. 40 is a view showing an example of a screen indicating that the DTV in FIG. 33 is searching for an image from the DVC associated with an image recorded in the memory card thereof.
Figure 41:
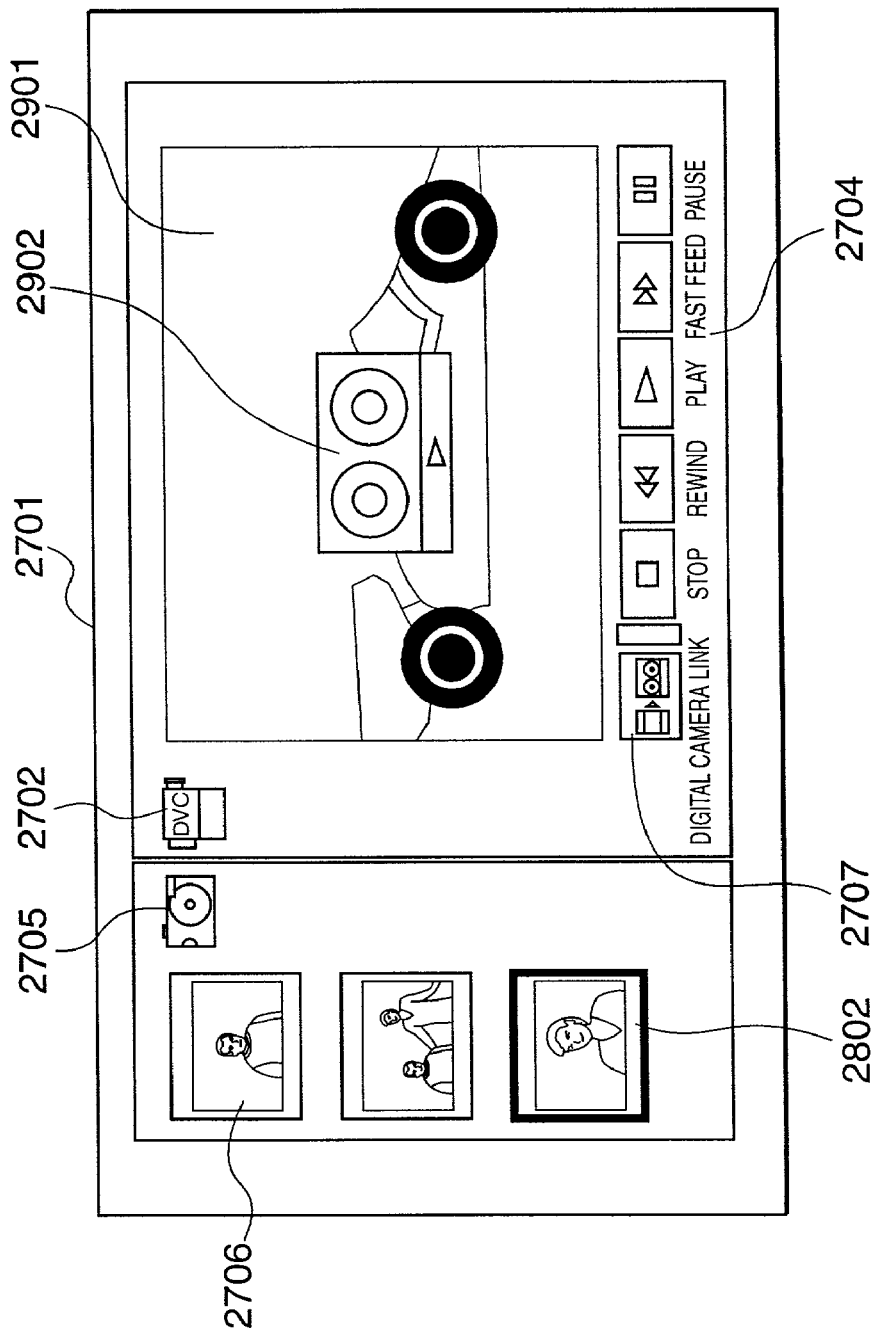
FIG. 41 is a view showing an example of a screen displayed when reproduction of an image from the DVC is in pause on the DTV in FIG. 33.
Figure 42:
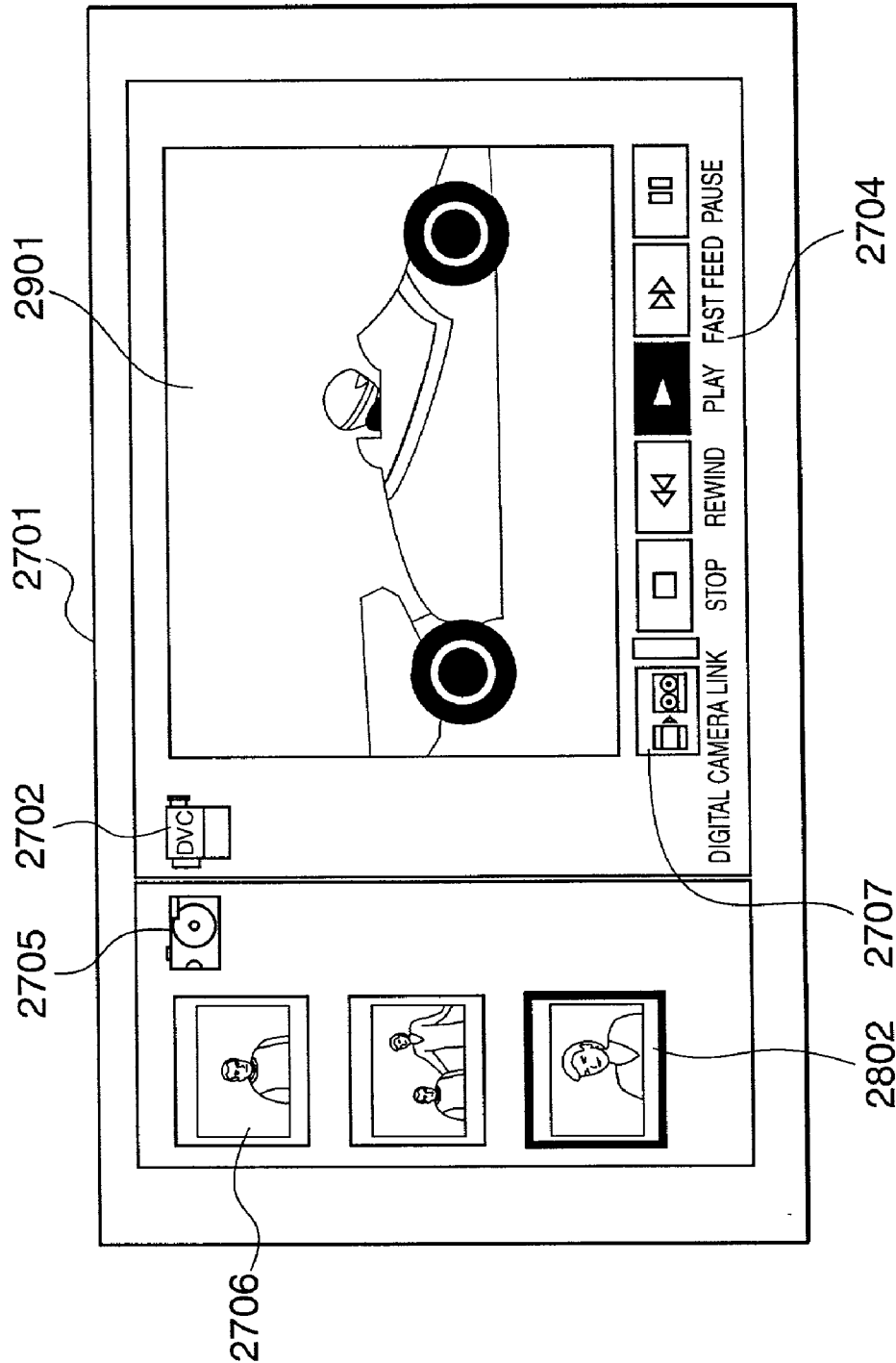
FIG. 42 is a view showing an example of a screen displayed after the DTV in FIG. 33 has completed the search for an image from the DVC.
Figure 43:
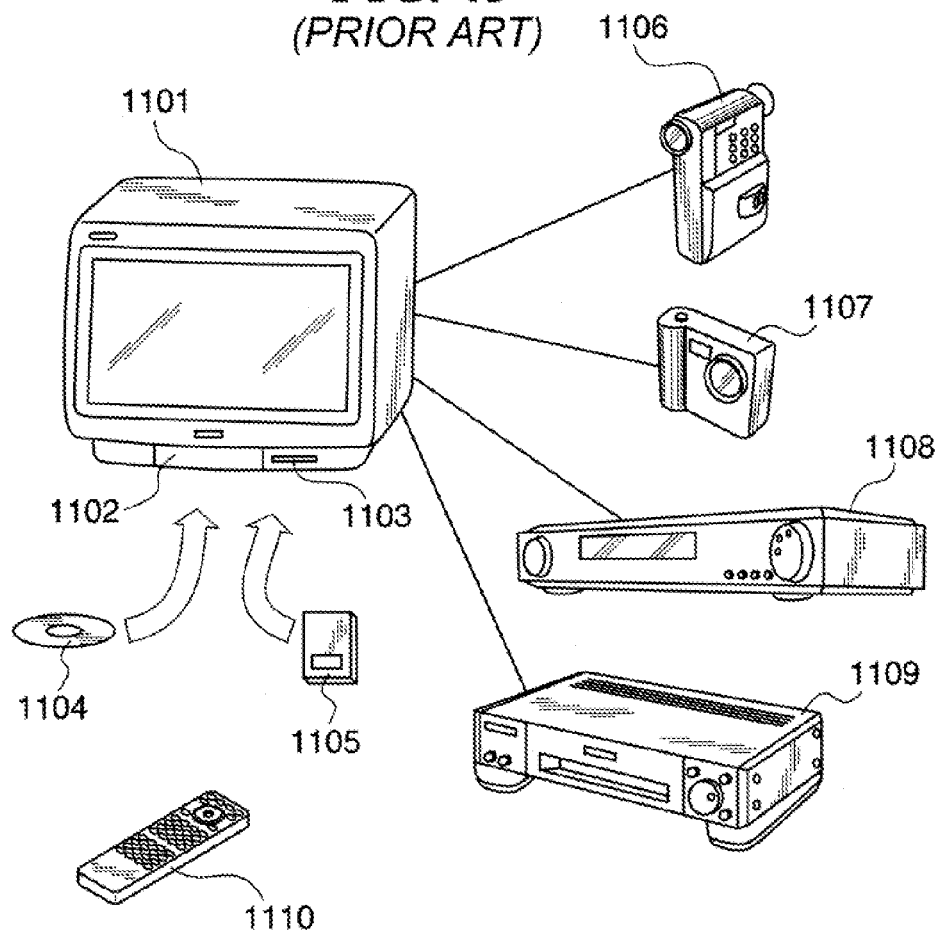
FIG. 43 is a view schematically showing the construction of a system comprised of a conventional DTV and peripheral apparatuses connected thereto.
Figure 44:
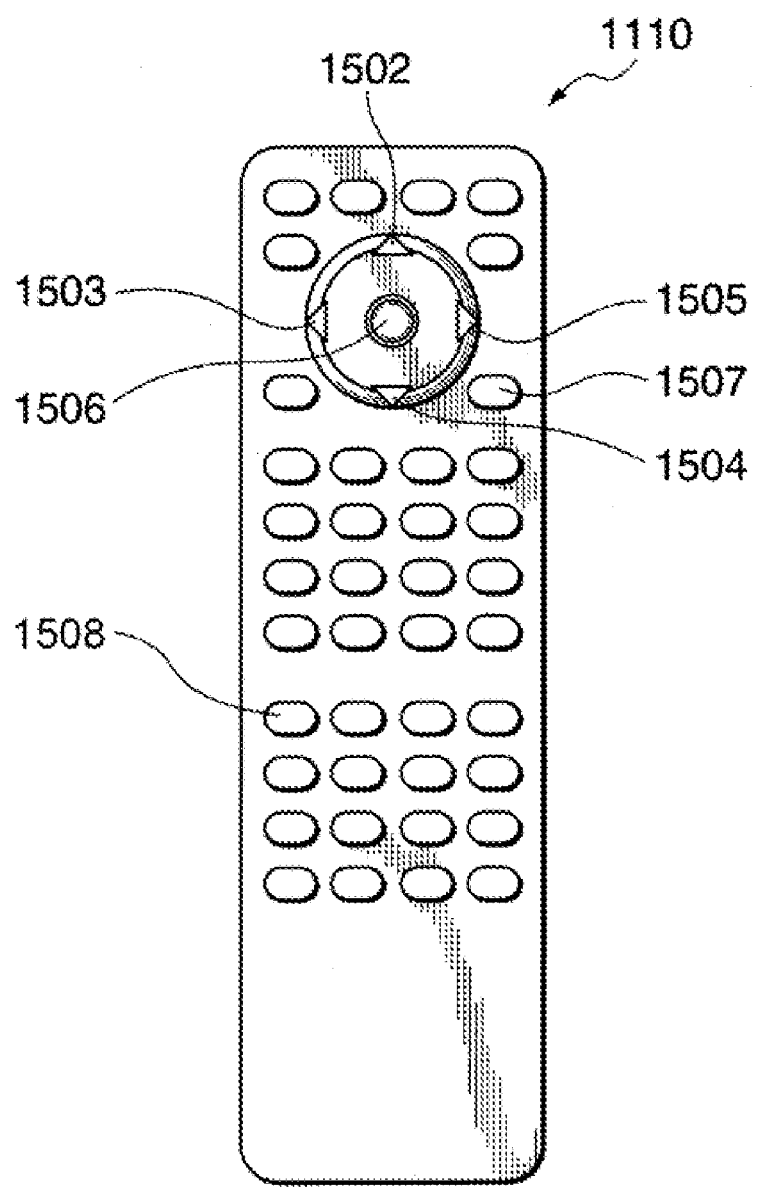
FIG. 44 is a view showing the arrangement of buttons on a remote control device appearing in FIG. 43.
Figure 45:
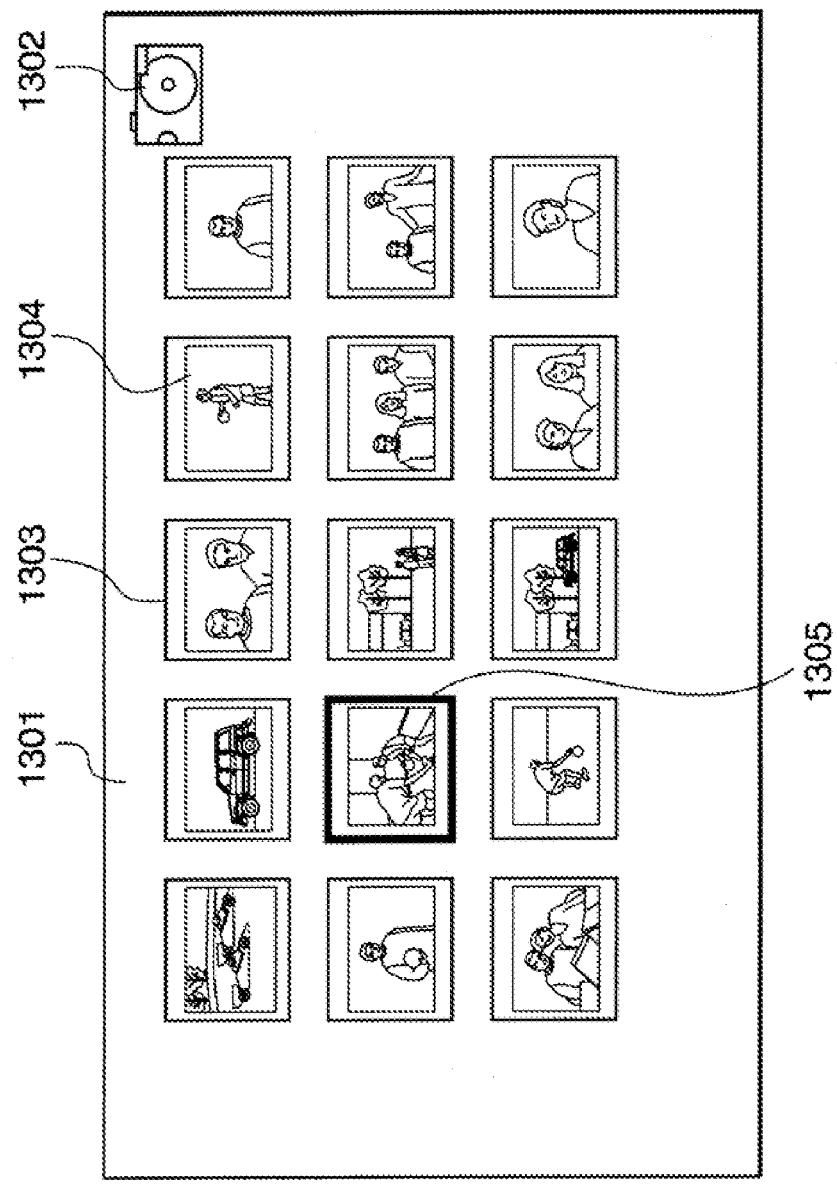
FIG. 45 is a view showing an example of a display screen displayed when a memory card is inserted into the DTV in FIG. 43.
Figure 46:
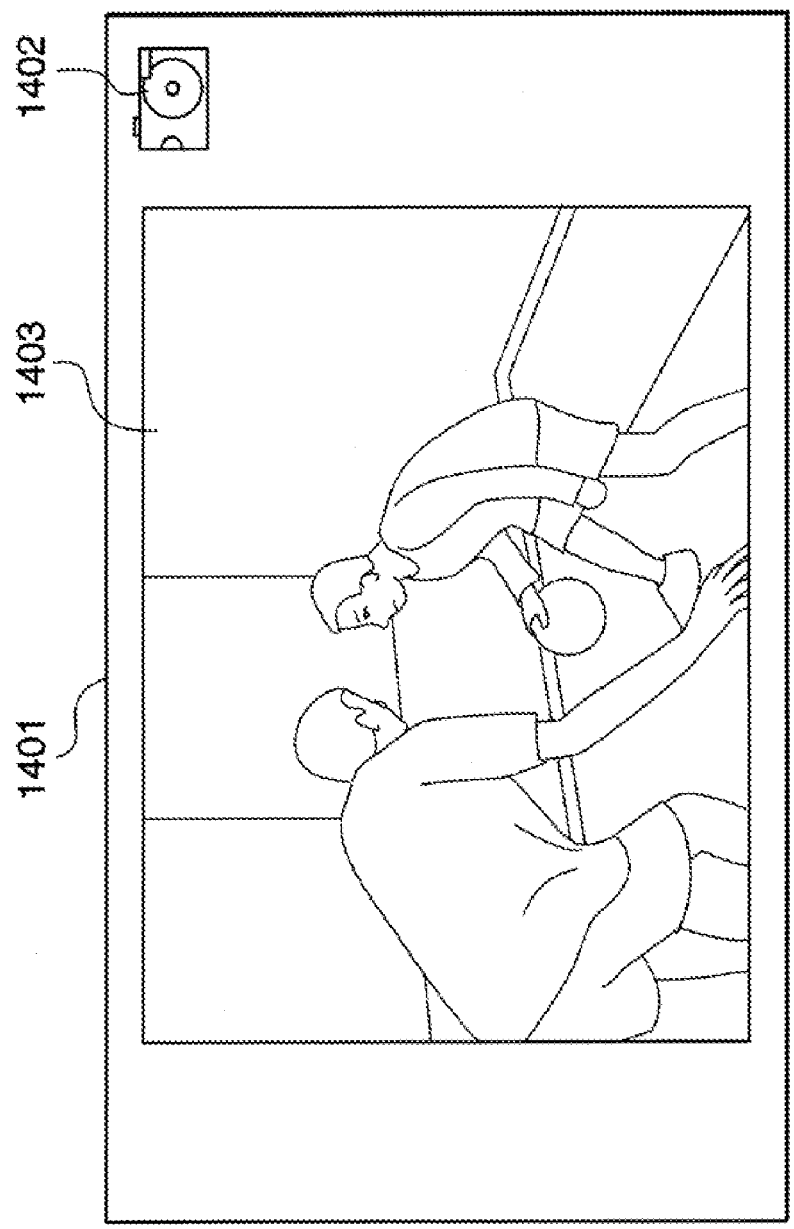
FIG. 46 is a view showing an example of a display screen indicating an image recorded in the memory card inserted into the DTV in FIG. 43.
Figure 47:
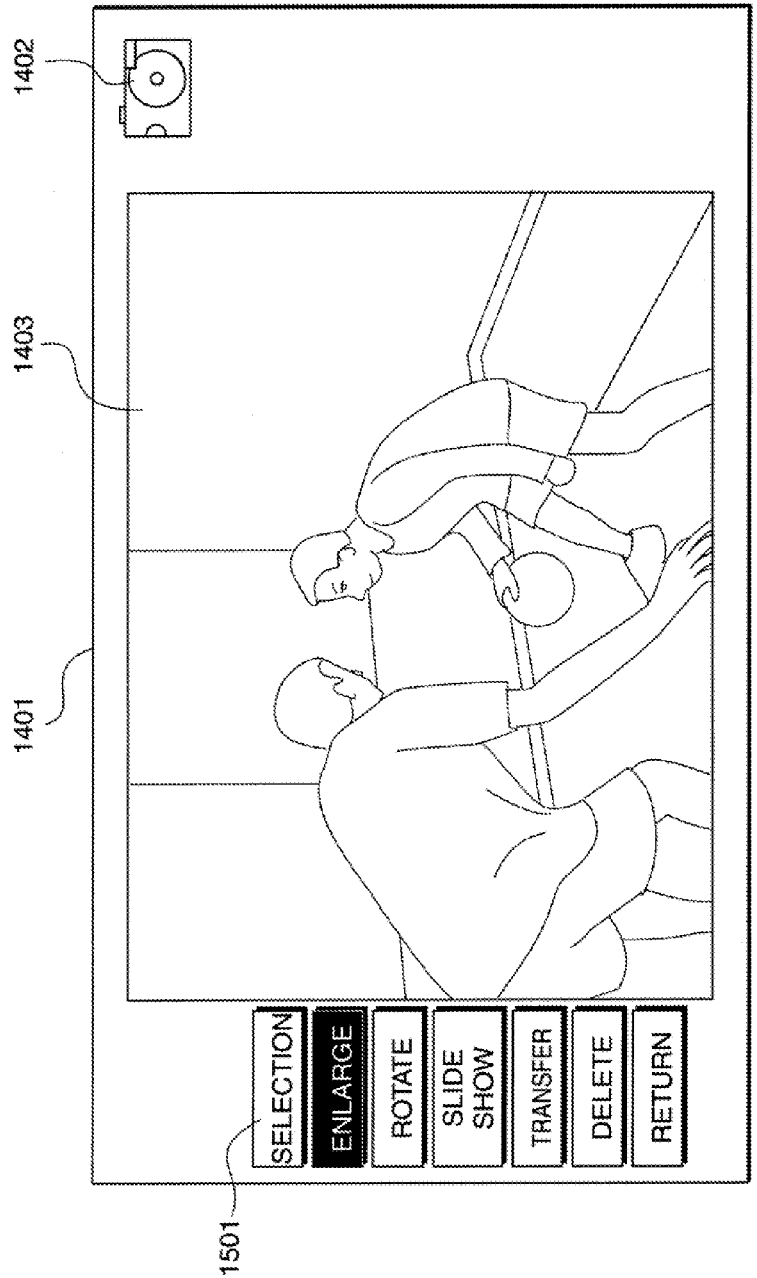
FIG. 47 is a view showing an example of a menu screen displayed on the display screen in FIG. 46.
Figure 48:
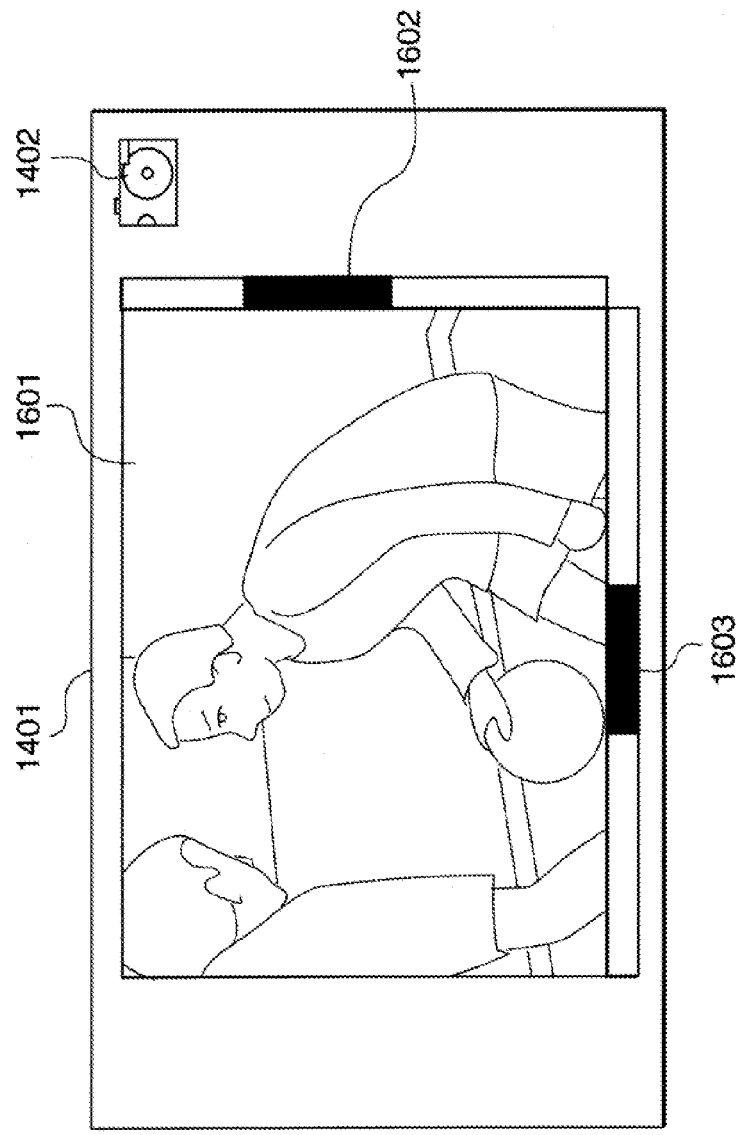
FIG. 48 is a view showing an example of an enlarged display of the recorded image on the display screen in FIG. 46.
Figure 49:
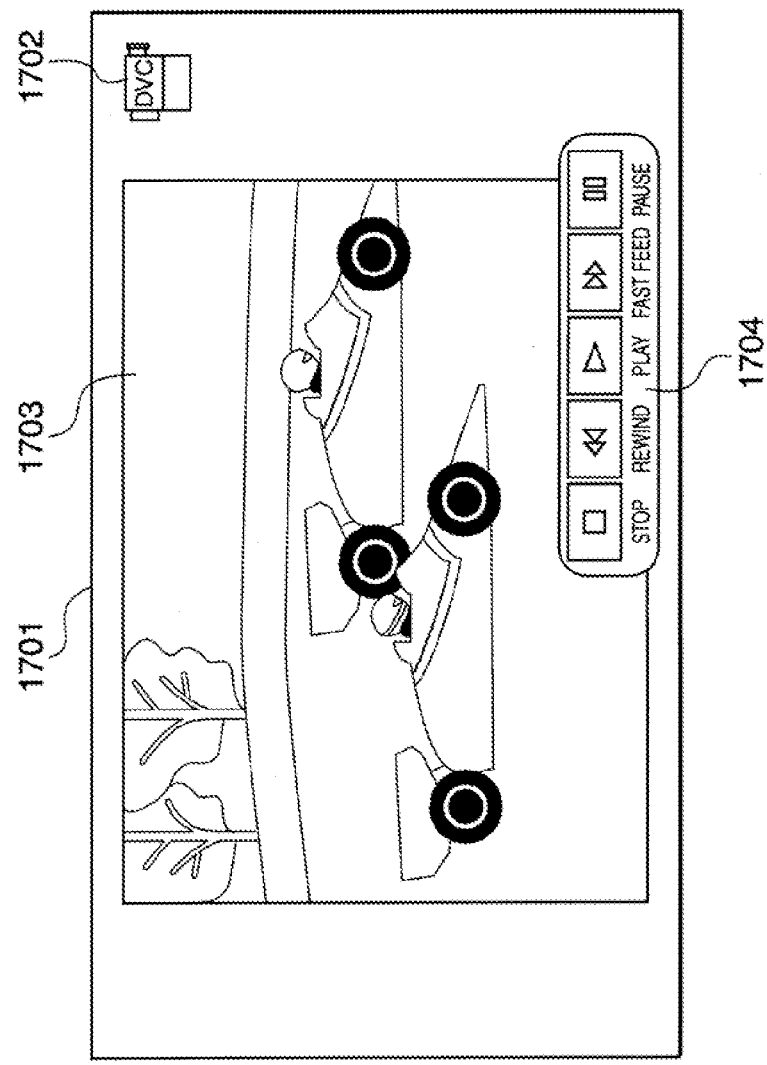
FIG. 49 is a view showing an example of a display screen displayed when a DVC is connected to the DTV in FIG. 43.
Figure 50:
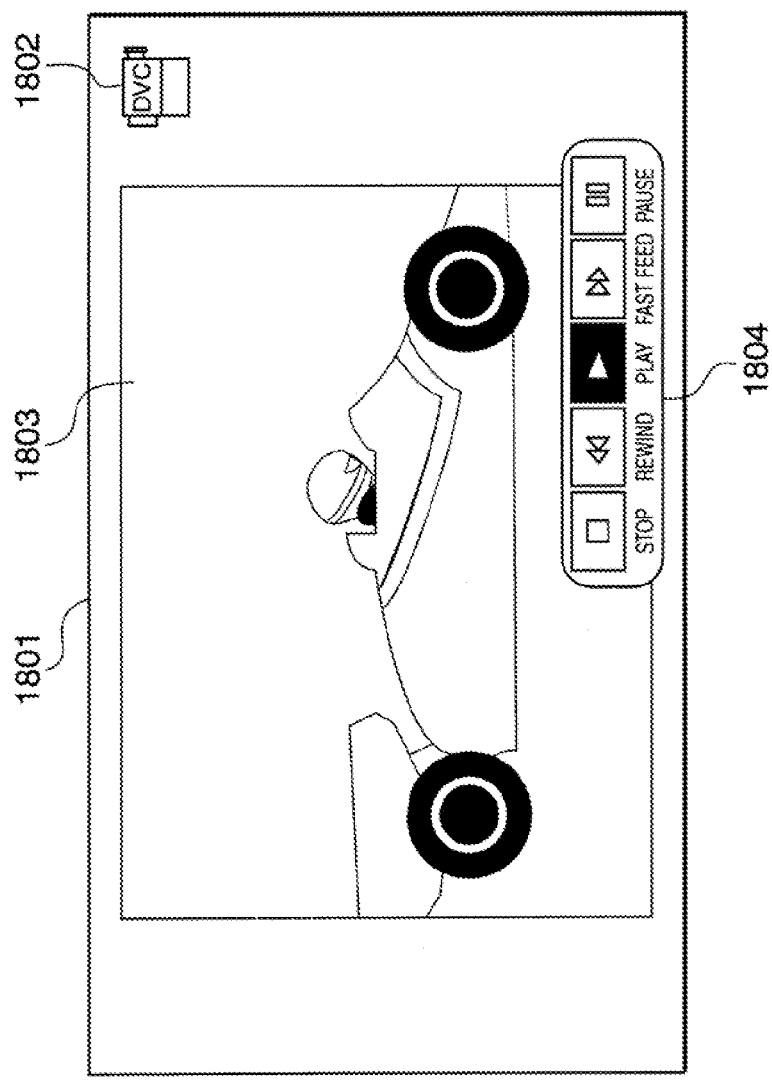
FIG. 50 is a view showing an example of a DVC operating panel displayed on the display screen in FIG. 49.
Figure 51:
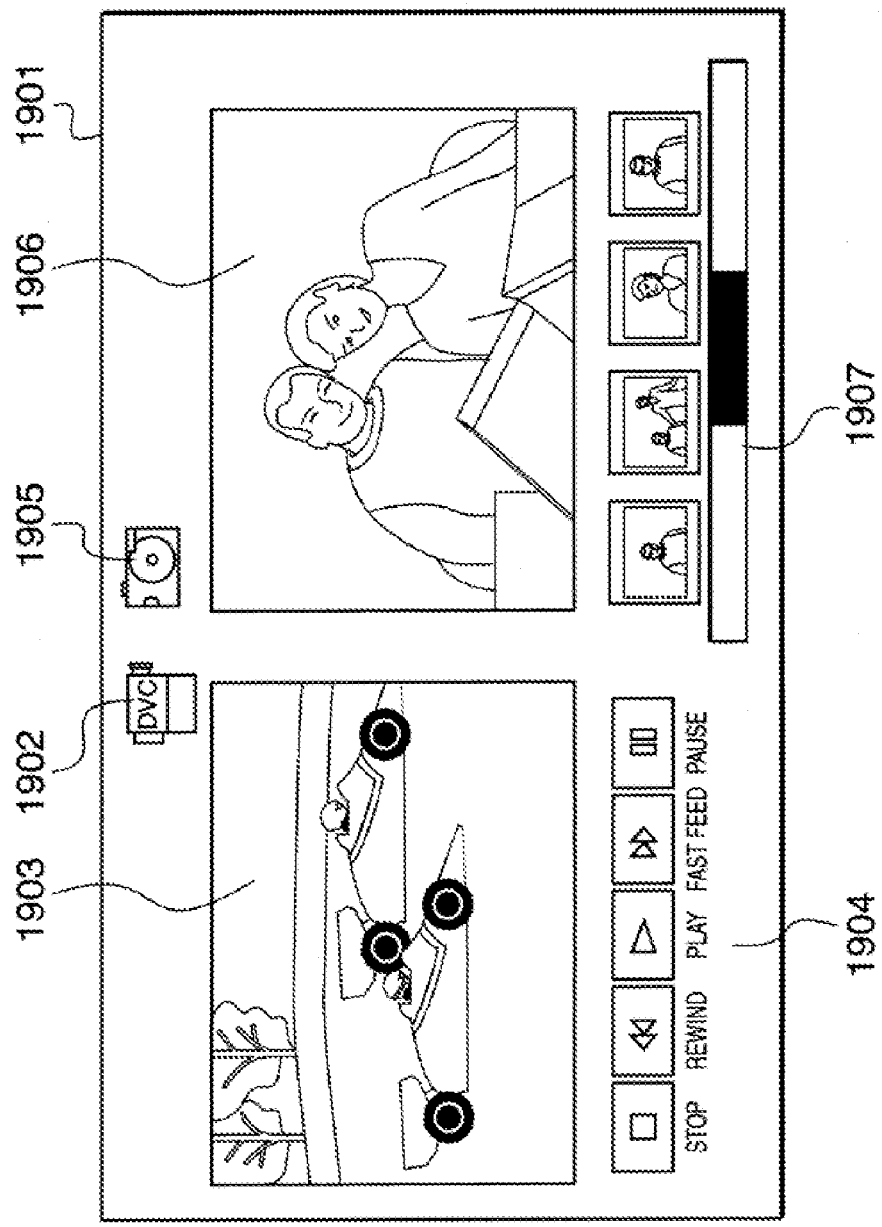
FIG. 51 is a view showing an example of the display of a multiscreen composed of an animated image from the DVC and a still image from the memory card and displayed on the DTV in FIG. 43.

Next, the operation of this DTV will be described with reference to FIGS. 34 to 42. FIG. 34 is a flow chart showing the procedure of a process for detecting a memory card in the DTV in FIG. 33. FIG. 35 is a flow chart showing the procedure of a linking process executed at a step S1107, shown in FIG. 34. FIG. 36 is a flow chart showing the procedure of a link search executed in the DTV in FIG. 33. FIG. 37 is a view showing an example of a display screen displayed when a memory card is inserted into the DTV in FIG. 33. FIG. 38 is a view showing an example of a displayed message indicating that link information is being searched from the DTV in FIG. 33 and created. FIG. 39 is a view showing an example of a screen displayed when an image from a DVC is reproduced using a link application in the DTV in FIG. 33. FIG. 40 is a view showing an example of a screen showing that the DTV in FIG. 33 is searching for an image from the DVC associated with an image recorded in the memory card thereof. FIG. 41 is a view showing an example of a screen displayed when reproduction of an image from the DVC is in pause on the DTV in FIG. 33. FIG. 42 is a view showing an example of a screen displayed after the DTV in FIG. 33 has completed the search for an image from the DVC.

If a DVC is connected to the DTV via the fast digital I/F 1218, and a memory card from a digital camera is inserted into the memory card slot of the memory card I/F 1221 of the DTV when the DTV is reproducing and displaying images while performing various operations, then the DTV detects the insertion of the memory card in response to notification of the interruption of mechanical or electrical hardware to start a memory card detecting process.

In this memory card detecting process, as shown in FIG. 34, first, at a step S1101, it is determined whether or not the memory card inserted into the memory card slot is readable. If the card is not readable, the process proceeds to a step S1109 to display an error message, followed by terminating this process. On the other hand, if the inserted memory card is readable, the process proceeds to a step S1102 to determine whether or not the DTV is reproducing data from another recording medium. If the DTV is not reproducing data from any other recording media, the process proceeds to a step S1110 to start an application for reproducing only image information from the memory card. Then, this process is terminated.

If the DTV is reproducing data from another medium (in this example, it is reproducing images recorded in a DVC), the process proceeds to a step S1103 to display an icon for starting a link application that uses link information. Then, as shown in FIG. 37, a DVC image reproducing screen 2501 is displayed on the monitor 1211 of the DTV. On the screen 2501 are displayed a digital video camera icon 2502, a reproduced image 2503, and an operation panel 2504, as well as the icon 2505 for starting the link application. Then, the process proceeds to a step S1104 to determine whether or not to start the link application. If the link application is not to be started, this process is terminated. On the other hand, if the link application is to be started, the process proceeds to a step 51105 to determine whether or not the image information in the memory card already has link information added thereto. If the image information already has link information added thereto, the process proceeds to a step S1108. If the image information has no link information added thereto, the process proceeds to a step S1106.

At the step S1106, a message is displayed on the monitor 1211, indicating that link information is being searched and created. In this case, for example, the screen displays this message 2601 in a manner being superposed upon the reproduced image 2503, as shown in FIG. 38. Then, the process proceeds to a step S1107 to execute a linking process for creating link information. The details of this linking process will be described later. Then, the process proceeds to the step S1108.

At the step S1108, the link application is started, followed by terminating this process.

Now, the linking process in the above step S1107 will be described with reference to FIG. 35.

In this linking process, as shown in FIG. 35, first, at a step S1201, it is determined whether or not the memory card has image information recorded therein. If the memory card has no image information recorded therein, the process proceeds to a step S1213 to display an error message indicating that the memory card has no image information recorded therein. Then, this process is terminated.

On the other hand, if the memory card has any image information recorded therein, the process proceeds to a step S1202 to determine whether or not a recording tape in the DVC has been rewound up to a leading position thereof. If the recording tape is not at the leading position, the process proceeds to a step S1203 to control the DVC to rewind the recording tape. The process then proceeds to a step S1204. In contrast, if the recording tape is at the leading position, the process directly proceeds to the step S1204.

At the step S1204, scanning of the recording tape is started, and at the next step S1205, photographing date and time data added to the recording tape is obtained. The process proceeds to a step S1206 to scan photographing date and time data added to individual pieces of image information in the memory card based on the photographing date and time data obtained from the recording tape.

Then, the process proceeds to a step S1207 to determine whether or not the DVC and the memory card have the same or similar photographing date and time data. If the DVC and the memory card do not have the same or similar photographing date and time data, the process proceeds to a step S1212 to control the DVC to feed the recording tape by a fixed interval. If the DVC and the memory card have the same or similar photographing date and time data, the process proceeds to a step S1208 to obtain information indicative of the present truck number on the recording tape. At the next step S1209, it is determined whether or not the image information in the memory card has data that is the same as or similar to the above truck number, recorded therein. If the image information has data that is the same as or similar to the above truck number, recorded therein, then the process proceeds to a step S1212 to control feeding of the recording tape. Then, this process is terminated.

On the other hand, if the image information has no data that is the same as or similar to the above truck number, recorded therein, then the process proceeds to a step S1210 to record link mark information as data added to the image information on the memory card detected during the scanning of photographing date and time data. At the next step S1211, data on the obtained truck number is recorded. The process then proceeds to a step S1212 to control feeding of the recording tape. Then, this process is terminated.

Once the linking process is thus completed, the link application is started at the above step 51108. The link application can search the recording tape for image information from a related DVC based on the link information added to the image information in the memory card. While the link application is being run, the DTV uses its own multiscreen function to display a multiscreen 2701 in which still thumbnail images 2706 from the memory card are displayed in one of the screens of the multiscreen 2701, whereas an image reproduced from the DVC is displayed in the other screen 2703, as shown in FIG. 39. Further, a digital camera icon 2705 is displayed in the screen for the still images from the memory card, whereas a digital video camera icon 2702, an operation panel 2704, and an icon 2707 indicative of linkage with the memory card are displayed in the screen for the image reproduced from the DVC.

In this case, the displayed thumbnail images have been detected during the scanning of the link information and are contained in the image information in the memory card, which has related information (link marks and truck numbers) recorded therein. Further, in the screen for the image reproduced from the DVC, the DVC can be operated by operating the operation panel 2704 for the DVC using the remote controller 1220. Further, a panel to be operated by the remote controller 1220 is moved to any of the thumbnail images 2706 by operating the icon 2707 and this thumbnail image 2706. For example, when a thumbnail image 2802 is selected by operating the remote controller 1220, a focus frame appears on the thumbnail image 2802 to indicate that this image has been selected. When the desired thumbnail image has thus been selected, depressing the execution button on the remote controller 1220 changes the screen 2803 for the image reproduced from the DVC, to an icon 2801 indicating that the tape is being searched. Then, the DTV is brought into a link search state in which searching is being made for image information in the recording medium from the DVC which has been associated, by operating the remote controller 1220, with the image information in the memory card corresponding to the thumbnail image 2802.

This link search will be described with reference to FIG. 36.

In the link search, as shown in FIG. 36, first, at a step S1301, it is determined whether or not the DVC matches with a truck search command. If the DVC does not match with this truck search command, then the process proceeds to a step S1311 to display an error message, followed by terminating this process. In contrast, if the DVC matches with the truck search command, the process proceeds to a step S1302 to load truck number information added to the image information in the memory card, into the DVC. At the next step S1303, a truck number search command is transmitted to the DVC, commanding to search for the loaded truck number information.

Then, the process proceeds to a step S1304 to determine whether or not the DVC has searched out the truck number. If the DVC has not searched out the truck number, the process proceeds to a step S1305 to determine whether or not the truck number search is being executed. Then, if the truck number search is not being executed, the process proceeds to a step S1308 to display an error message, followed by terminating this process. On the other hand, if the truck number search is being executed, the process proceeds to a step S1306 to determine whether or not a timeout period has elapsed. If the truck number search has been executing in spite of the elapse of the timeout period, it is determined that this is abnormal. Then, the process proceeds to a step S1307 to display an error message, followed by terminating this process. If the timeout period has not elapsed, the process returns to the above step S1304 to continue the truck number search.

At the above step S1304, if it is determined that the truck number search has been successful, the process proceeds to a step S1309 to wait for the DTV to be brought into a reproduction pause state. While the process is waiting for the DTV to be brought into this reproduction pause state, an image with the corresponding truck number is displayed, and an icon 2902 is displayed, indicating that the process is waiting for the DTV to be brought into the reproduction pause state, as shown in FIG. 41. Once the DTV is brought into the reproduction pause state, the process proceeds to a step S1301 to transmit a reproduction command to the DVC, followed by terminating this process. The transmission of this reproduction command causes the DVC to start reproducing the image 2901 from the corresponding truck number, and the reproduced image 2901 is displayed on the monitor 1211, as shown in FIG. 42.

In the above described manner, in the present embodiment, image information from the memory card of the digital camera and image information from the recording tape of the DVC can be displayed in a manner being associated with each other. Further, a larger amount of image information desired to be viewed can be provided at a time and viewed as more significant information.

Further, in the present embodiment, photographing date and time information is used as associating information on the assumption that images are photographed by different photographing apparatuses during the same time period. However, by using a digital camera and/or a digital video apparatus that records, together with image information, not only photographing date and time information but also photographing location information provided by a GPS device installed therein, two types of image information obtained at completely different dates and times can be viewed with a pleasing remniscence, such as image information obtained when the user traveled to the same place at different times or visited the same place that he had visited before.

Furthermore, in the present embodiment, two types of image information previously stored in the medium are associated with each other. However, one of the types of image information may be a drama or a travelogue program transmitted together with data through any of various broadcastings or communications so that it can be viewed concurrently with images of places that the user visited, thereby making the program more interesting.

Furthermore, in the present embodiment, the buttons on the screen shown in FIG. 37 are operated as a trigger to associate the two types of image information. However, alternatively a searching process for association may be executed as background processing with a low priority when it is detected that the memory card has been inserted into the memory card slot or the DVC has been connected, whereby the association process can be completed in an appropriate time without affecting normal viewing on the DTV. Further, the associated two types of image information can be immediately and simultaneously viewed based on the association.

Furthermore, in the present embodiment, after one piece of associating information has been detected at one position of the recording tape from the DVC, the recording tape is fed by a fixed interval to obtain a position at which the next association is expected to be detected. However, a position of the recording tape where photographing date and time data continuously recorded in the recording tape becomes discontinuous may be detected so that a leading portion of photographing date and time data that follows the position where the data becomes discontinuous may be searched for association. With such an alternative arrangement, individual image information sections (photographed by the DVC) can be associated with each other, while image information from another photographing apparatus can be used as a searching image for individual pieces of image information in the recording tape.

Furthermore, in the present embodiment, only the truck number information is added to image information in the memory card, but unique information may be provided for each recording tape in the DVC, whereby it is possible to prevent erroneous execution of a truck number search on a recording tape that is different from a recording tape from which search for association has been carried out.

Moreover, in the present embodiment, the digital camera link button 2707, shown in FIG. 39, is depressed to move the focus from an operation panel, and one of the thumbnail images shown in FIG. 40 is selected to search for an associated image. However, in the arrangement in FIG. 40, it may be arranged that the right and left cursor buttons of the remote control device are used to select an operation panel for the DVC, and the up and down cursor buttons of the same are used to select a thumbnail image from the digital camera. Subsequently, with any of the thumbnail images thus selected, the digital camera link button on the operation panel may be depressed to search for an image from the DVC associated with the selected thumbnail image. With such an alternative arrangement, operation of right and left buttons on the operation panel make it possible to move to a particular image as is the case with reproduction or fast-feeding operation, thereby enabling fast and easy operations.

Moreover, in the present embodiment, one of the two types of image information is still image information stored in the memory card, whereas the other type is animated image information stored in the recording tape. However, the medium storing image information is not limited to a memory card or a recording tape, but any other media may be used, such as a memory device in the DTV apparatus main body, a fixed or removable hard disk device, or a recording video disk.

In the present embodiment, two types of information are used, and based on results of searching associating information, a position of the first image information at which the second image information is recorded is used to search for a portion of the second image information having the same photographing date and time as or similar to those of the first image information. However, the search may be carried out by reproducing and displaying the second image information from a point a fixed interval before the recorded position of the second image information. With such an alternative arrangement, the user can reliably view points of the second image information that are associated with the first image information and having the same or similar photographing dates and times as or to those of the first image information.

Further, if the second image information is composed of several pieces of information recorded on the recording medium in a manner being discontinuous on a time axis, reproduction and display of the second video information may be started from a leading position of the second image information which is contiguous to the position of the first image information at which the second image information is recorded. With such an alternative arrangement, the second image information associated with the first image information can be viewed as one continuous event.

Furthermore, in the present embodiment, a related image search for a particular portion of the second image information of the two types of image information is specifically designated and executed based on information added to the first vide information. Alternatively, reproduction and display of the first image information may be performed, and during the reproduction and display a part of the reproduced and displayed screen is used or this screen is divided to simultaneously reproduce and display the second image information, whereby significant viewing of a large amount of desired image information can be achieved without cumbersome operations.

It goes without saying that the present invention may be achieved by supplying a system or an apparatus with a storage medium in which the program code of software that realizes the functions (including the flow charts shown in FIGS. 21 to 26 and 34 to 36) of the above described embodiments are recorded, and causing a computer (or CPU or MPU) of the system or apparatus to read out and execute the program code stored in the storage medium.

In this case, the program code itself read out from the storage medium realizes the novel functions of the present invention, so that the storage medium storing the program code also constitutes the present invention.

The storage medium for supplying the program code may be selected from, for example, a floppy disk, hard disk, optical disk, magneto-optical disk, CD-ROM, CD-R, magnetic tape, non-volatile memory, and ROM. Further, the program code may be supplied from a server computer via a communication network.

It also goes without saying that the functions of the above described embodiments may be accomplished not only by executing a program code read out by a computer, but also by causing an operating system (OS) that operates on the computer to perform a part of the whole of the actual operations according to instructions of the program code.

Furthermore, it is to be understood that the program code read out from the storage medium may be written into a memory provided in an expanded board inserted in the computer, or an expanded unit connected to the computer, and a CPU or the like provided in the expanded board or expanded unit may actually perform a part or all of the operations according to the instructions of the program code, so as to accomplish the functions of the above described embodiments.

What is claimed is:

1. An image display system comprising:
   an image reproducing apparatus that captures and reproduces images recorded by a plurality of image recording apparatuses and additional information added to the images;
   a display device that displays each of the reproduced images;
   a detecting device that detects presence or absence of relevancy between the images recorded by the plurality of image recording apparatuses based on the additional information captured by the plurality of image recording apparatuses for reproduction; and
   a control device that controls said display device to display identification information that allows a viewer to recognize that relevancy exists between the images recorded by the plurality of image recording apparatuses when said detecting device detects presence of relevancy therebetween,
   wherein the identification information includes a connecting icon that connects a plurality of device icons corresponding to respective ones of the plurality of image recording apparatuses, and
   wherein said control device controls said display device to display the images recorded by one of the plurality of image recording apparatuses that corresponds to one of the plurality of icons when the one of the plurality of icons is selected by the viewer, and controls said display device to simultaneously display the images recorded by the plurality of image recording apparatuses when the connecting icon is selected by the viewer.

2. An image display system according to claim 1, wherein:
   the plurality of image recording apparatuses include at least one still image recording apparatus and at least one animated image recording apparatus, and
   said control device controls said display device to display, as thumbnail images, still images recorded by the still image recording apparatus so as to correspond to photographed scenes in animated images recorded by the animated image recording apparatus.

3. An image reproducing apparatus that captures and reproduces images recorded by a plurality of image recording apparatuses and additional information added to the images and displays each of the reproduced images on a display device, comprising:
   a detecting device that detects presence or absence of relevancy between the images recorded by the plurality of image recording apparatuses based on the additional information captured by the plurality of image recording apparatuses for reproduction; and
   a control device that controls said display device to display identification information that allows a viewer to recognize that relevancy exists between the images recorded by the plurality of image recording apparatuses when said detecting device detects presence of relevancy therebetween,
   wherein the identification information includes a connecting icon that connects a plurality of device icons corresponding to respective ones of the plurality of image recording apparatuses, and
   wherein said control device controls said display device to display the images recorded by one of the plurality of image recording apparatuses that corresponds to one of the plurality of icons when the one of the plurality of icons is selected by the viewer, and controls said display device to simultaneously display the images recorded by the plurality of image recording apparatuses when the connecting icon is selected by the viewer.

4. An image reproducing apparatus according to claim 3, wherein:
   the plurality of image recording apparatuses include at least one still image recording apparatus and at least one animated image recording apparatus, and
   said control device controls said display device to display, as thumbnail images, still images recorded by the still image recording apparatus so as to correspond to photographed scenes in animated images recorded by the animated image recording apparatus.

5. An image display method of capturing and reproducing images recorded by a plurality of image recording apparatuses and additional information added thereto and displaying each of the reproduced images on a display device, comprising the steps of:
   detecting presence or absence of relevancy between the images recorded by the plurality of image recording apparatuses based on the additional information captured by the plurality of image recording apparatuses for reproduction; and
   controlling said display device to display identification information that allows a viewer to recognize that relevancy exists between the images recorded by the plurality of image recording apparatuses when said detecting device detects presence of relevancy therebetween,
   wherein the identification information includes a connecting icon that connects a plurality of device icons corresponding to respective ones of the plurality of image recording apparatuses, and
   wherein the controlling step controls said display device to display the images recorded by one of the plurality of image recording apparatuses that corresponds to one of the plurality of icons when the one of the plurality of icons is selected by the viewer, and controls said display device to simultaneously display the images recorded by the plurality of image recording apparatuses when the connecting icon is selected by the viewer.

6. An image display method according to claim 5, wherein:

the plurality of image recording apparatuses include at least one still image recording apparatus and at least one animated image recording apparatus, and the controlling step controls said display device to display, as thumbnail images, still images recorded by the still image recording apparatus so as to correspond to photographed scenes in animated images recorded by the animated image recording apparatus.

7. A computer readable storage medium storing a program for constructing an image display system that captures and reproduces images recorded by a plurality of image recording apparatuses and additional information added thereto and displays each of the reproduced images on a display device, said program comprising:

a detecting module for detecting presence or absence of relevancy between the images recorded by the plurality of image recording apparatuses based on the additional information captured by the plurality of image recording apparatuses for reproduction; and a control module for controlling said display device to display identification information that allows a viewer to recognize that relevancy exists between the images recorded by the plurality of image recording apparatuses when said detecting device detects presence of relevancy therebetween, wherein the identification information includes a connecting icon that connects a plurality of device icons corresponding to respective ones of the plurality of image recording apparatuses, and wherein said control module controls said display device to display the images recorded by one of the plurality of image recording apparatuses that corresponds to one of the plurality of icons when the one of the plurality of icons is selected by the viewer, and controls said display device to simultaneously display the images recorded by the plurality of image recording apparatuses when the connecting icon is selected by the viewer.

8. A storage medium according to claim 7, wherein:

the plurality of image recording apparatuses include at least one still image recording apparatus and at least one animated image recording apparatus, and said control module controls said display device to display, as thumbnail images, still images recorded by the still image recording apparatus so as to correspond to photographed scenes in animated images recorded by the animated image recording apparatus.

* * * * *